United States Patent
Tanabe et al.

(10) Patent No.: US 10,293,721 B2
(45) Date of Patent: May 21, 2019

(54) VEHICLE SEAT AND ATTACHMENT MEMBER

(71) Applicant: TS TECH CO., LTD., Asaka-shi, Saitama (JP)

(72) Inventors: Jinichi Tanabe, Tochigi (JP); Hiroshi Baba, Tochigi (JP); Makoto Takeuchi, Tochigi (JP); Hiroshi Izawa, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 135 days.

(21) Appl. No.: 15/410,335

(22) Filed: Jan. 19, 2017

(65) Prior Publication Data

US 2017/0129376 A1    May 11, 2017

Related U.S. Application Data

(62) Division of application No. 14/758,214, filed as application No. PCT/JP2013/084904 on Dec. 26, 2013, now Pat. No. 9,561,773.

(30) Foreign Application Priority Data

Dec. 28, 2012 (JP) ................................ 2012-288619
Dec. 28, 2012 (JP) ................................ 2012-288620
(Continued)

(51) Int. Cl.
*B60R 21/207* (2006.01)
*B60R 21/201* (2011.01)
(Continued)

(52) U.S. Cl.
CPC ......... *B60N 2/5816* (2013.01); *B60N 2/5825* (2013.01); *B60N 2/5841* (2013.01);
(Continued)

(58) Field of Classification Search
CPC . B60R 21/207; B60R 21/201; B60R 21/2176; B60R 2021/23146;
(Continued)

(56) References Cited

U.S. PATENT DOCUMENTS 6,003,939 A    12/1999    Nakai et al.
6,095,602 A     8/2000    Umezawa et al.
(Continued)

FOREIGN PATENT DOCUMENTS

EP    0 856 438 A2    8/1998
GB    2 420 753 A     6/2006
(Continued)

OTHER PUBLICATIONS

Extended European Search Report issued for related application EP 13867600.2, dated Jan. 5, 2016, 7 pages.
(Continued)

*Primary Examiner* — Keith J Frisby
(74) *Attorney, Agent, or Firm* — Drinker Biddle & Reath LLP

(57) ABSTRACT

An airbag module-equipped seat in which the periphery of an attachment portion of a guide member that guides a deployment direction of an airbag has a compact size and the guide member can be attached easily while maintaining satisfactory deployment performance of the airbag. This seat includes an airbag module attached to a side frame, a guide member that guides a deployment direction of the airbag module, and an attachment member for attaching the guide member to the side frame. The side frame has an attachment hole for the attachment member at a position different from a shaft portion for attaching the airbag module. The attachment member has a holding space in which an end of the guide member is held in a detachable manner, and is inserted
(Continued)

into the attachment hole in a state in which the end of the guide member is held in the holding space.

19 Claims, 45 Drawing Sheets

(30) Foreign Application Priority Data

| Apr. 9, 2013 | (JP) | 2013-081097 |
|---|---|---|
| Apr. 18, 2013 | (JP) | 2013-087170 |
| Jul. 16, 2013 | (JP) | 2013-147763 |
| Jul. 16, 2013 | (JP) | 2013-147764 |
| Aug. 2, 2013 | (JP) | 2013-161252 |

(51) Int. Cl.
  *B60N 2/58* (2006.01)
  *F16B 5/06* (2006.01)
  *B60N 2/68* (2006.01)
  *B60R 21/231* (2011.01)
  *B60R 21/16* (2006.01)

(52) U.S. Cl.
  CPC .............. *B60N 2/68* (2013.01); *B60N 2/682* (2013.01); *B60R 21/207* (2013.01); *F16B 5/0692* (2013.01); *B60N 2002/5808* (2013.01); *B60R 21/201* (2013.01); *B60R 2021/161* (2013.01); *B60R 2021/23146* (2013.01); *Y10T 29/482* (2015.01)

(58) Field of Classification Search
  CPC ...... B60R 2021/161; B60R 2021/0006; B60N 2002/5808
  USPC .......................................... 280/730.2, 728.2
  See application file for complete search history.

(56) References Cited

U.S. PATENT DOCUMENTS

| 6,357,789 B1 | 3/2002 | Harada et al. |
|---|---|---|
| 6,439,597 B1 | 8/2002 | Harada et al. |
| 6,450,528 B1 | 9/2002 | Suezawa et al. |
| 7,669,889 B1 | 3/2010 | Gorman et al. |
| 8,328,231 B2 | 12/2012 | Nakamura et al. |
| 8,474,858 B2 | 7/2013 | Urabe et al. |
| 2002/0063452 A1 | 5/2002 | Harada et al. |
| 2005/0046156 A1 | 3/2005 | Yoshikawa et al. |
| 2006/0131848 A1 | 6/2006 | Miyake et al. |
| 2007/0187933 A1 | 8/2007 | Tracht et al. |
| 2008/0073952 A1 | 3/2008 | Tracht et al. |
| 2008/0296941 A1 | 12/2008 | Bederka et al. |
| 2009/0001783 A1 | 1/2009 | Hazlewood et al. |
| 2011/0025034 A1 | 2/2011 | Lim et al. |

FOREIGN PATENT DOCUMENTS

| JP | 09-039711 A | 2/1997 |
|---|---|---|
| JP | H10-076084 A | 3/1998 |
| JP | H10-157550 A | 6/1998 |
| JP | 10-181502 A | 7/1998 |
| JP | 2848482 B2 | 11/1998 |
| JP | 2000-168485 A | 6/2000 |
| JP | 2001-287578 A | 10/2001 |
| JP | 2002-166767 A | 6/2002 |
| JP | 2003-341461 A | 12/2003 |
| JP | 2005-067465 A | 3/2005 |
| JP | 2007-314075 A | 12/2007 |
| JP | 4543270 B2 | 9/2010 |
| JP | 2011-056975 A | 3/2011 |
| JP | 2011-068197 A | 4/2011 |
| JP | 2011-121511 A | 6/2011 |
| JP | 2011-183942 A | 9/2011 |
| JP | 2012-076545 A | 4/2012 |
| JP | 2012-218666 A | 11/2012 |
| JP | 2013-112186 A | 6/2013 |
| JP | 2013-169954 A | 9/2013 |
| JP | 2014-129060 A | 7/2014 |
| WO | 2012/105957 A1 | 8/2012 |
| WO | 2012/176730 A1 | 12/2012 |
| WO | 2013/081020 A1 | 6/2013 |

OTHER PUBLICATIONS

Office Action issued in related application JP 2013-147763, dated May 16, 2017, with machine generated English language translation, 9 pages.

Office Action issued in related application JP 2013-147764, dated May 16, 2017, with machine generated English language translation, 6 pages.

Office Action issued in related application JP 2013-087170, dated Jan. 17, 2017, with machine generated English language translation, 6 pages.

Office Action issued in related application JP 2017-137309, dated May 29, 2018, with machine generated English language translation, 6 pages.

Office Action issued in related application JP 2017-207471, dated Aug. 14, 2018, with machine generated English language translation, 4 pages.

Office Action issued in related application JP 2017-176883, dated Aug. 14, 2018, with machine generated English language translation, 6 pages.

Office Action issued in related application CN 201710749103.1, dated Mar. 1, 2019, with partial English language translation, 5 pages.

Office Action issued in related application JP 2018-073454, dated Apr. 2, 2019, with machine generated English language translation, 6 pages.

VEHICLE SEAT AND ATTACHMENT MEMBER

CROSS REFERENCE TO RELATED APPLICATIONS

This application is a divisional application of U.S. patent application Ser. No. 14/758,214, filed Jun. 26, 2015, now U.S. Pat. No. 9,561,773, which is the National Stage Entry application of PCT Application No. PCT/JP2013/084904, filed Dec. 26, 2013, which claims the priority benefit of the following Japanese Patent Applications:

| Japanese Patent App. No. | Date Filed |
| --- | --- |
| 2012-288619 | Dec. 28, 2012 |
| 2012-288620 | Dec. 28, 2012 |
| 2013-081097 | Apr. 9, 2013 |
| 2013-087170 | Apr. 18, 2013 |
| 2013-147763 | Jul. 16, 2013 |
| 2013-147764 | Jul. 16, 2013 |
| 2013-161252 | Aug. 2, 2013 | the entire content of all being incorporated herein by reference.

BACKGROUND

Disclosed herein is an airbag module-equipped seat, and particularly, an airbag module-equipped seat in which a guide member that guides a deployment direction of an airbag is attached to a side frame.

Conventionally, a seat in which an airbag module is attached to a side frame of a seat back frame has been proposed as an airbag module-equipped seat. In this airbag module-equipped seat, respective terminals of a trim cover and terminals of one side of two stay clothes are sewn together to form a breaking portion of the trim cover. The two stay clothes are pulled toward the inner side of the trim cover from the breaking portion to wrap the airbag module so that the entire seat back including the airbag module is covered with the trim cover (for example, see Japanese Patent Document No. 4543270 ("the '270 Document")).

In the '270 Document, two listing wires are provided in a portion of the side frame on the opposite side of the airbag module to be entangled in a ring shape. The terminals of the two stay clothes pulled toward both sides of the airbag module from the breaking portion are extended to the two listing wires to wrap the airbag module and are attached to the listing wires.

According to the invention of the '270 Document, since the airbag module can be wrapped directly by the stay clothes and the stay clothes can be reliably pulled and attached to the listing wires provided at the stay clothes at the ends, the inflation pressure of the airbag can be efficiently concentrated on the sewn seam serving as the breaking portion of the trim cover by the stay clothes. Thus, satisfactory deployment performance of the airbag can be obtained.

However, in the invention of the '270 Document, since the listing wires are provided to be entangled in a ring shape, the structure of the listing wires is complex and the attaching process is also complex. Moreover, since the listing wires are required to attach the stay clothes to the side frame, the size of the periphery of the side frame increases. Thus, a more compact configuration is demanded.

Moreover, in the invention of the '270 Document, there is a concern that the stay cloth may make contact with the side frame at the periphery of the attachment position during normal usage or inflation of the airbag.

SUMMARY

Various embodiments of the present invention have been made in view of the problems of the conventional art, and an object thereof is to provide an airbag module-equipped seat in which the periphery of an attachment portion of a guide member that guides a deployment direction of an airbag has a compact size and the guide member can be attached easily while maintaining satisfactory deployment performance of the airbag.

Another object is to provide an airbag module-equipped seat in which the contact between a side frame and a guide member that guides the deployment direction of an airbag is suppressed.

Still another object is to provide an airbag module-equipped seat in which an end of a stay cloth attached to an attachment member is restricted from moving within a stay cloth attachment portion in an attachment member.

Still another object is to provide an airbag module-equipped seat which is a vehicle seat in which a guide member that guides the deployment direction of a side airbag is sewn to a wedge portion of a skin material and in which the sewn portion of the guide member is suppressed from being visible through the skin material and thus having an influence on the appearance.

Still another object is to provide an airbag module-equipped seat which is a vehicle seat having a side airbag only in one of a pair of right and left side portions and in which an appearance of a wedge portion is suppressed from being bilaterally asymmetrical on a side in which a guide member that guides the deployment direction of the airbag is sewn and on a side in which the guide member is not sewn.

Still another object is to provide an attachment member to which a guide member can be attached easily and an airbag module-equipped seat which prevents an assembly error of an attachment member to provide high manufacturing efficiency.

Still another object is to provide an airbag module-equipped seat in which the supporting rigidity of an attachment member between a seat frame and a guide member that guides the deployment direction of an airbag is improved.

Still another object is to provide an airbag module-equipped seat in which an attachment state of a guide member of the deployment direction of a side airbag module can be observed from a back surface side of a seat during assembling of an airbag module and the like.

Still another object is to provide a method for mounting an airbag module-equipped seat in which the workability of attaching a guide member that guides the deployment direction of an airbag is improved.

The problems are solved by an airbag module-equipped seat according to various embodiments of the present invention. The airbag module-equipped seat is a seat having an airbag module for storing an airbag therein, including: a side frame that extends along a side portion of the seat; the airbag module attached to the side frame; a guide member that guides a deployment direction of the airbag module; and an attachment member for attaching the guide member to the side frame, wherein the side frame has an attachment hole for the attachment member at a position different from a shaft portion for attaching the airbag module, the attachment member has a holding space in which an end of the guide member is held in a detachable manner, and the attachment member is inserted into the attachment hole in a state in which the end of the guide member is held in the holding space.

In this regard, the attachment member has the holding space in which an end of the guide member is held in a detachable manner, and the attachment member is inserted into the attachment hole in a state in which the end of the guide member is held in the holding space. Thus, the guide member can be attached to the side frame side with a compact configuration.

In this case, the attachment hole may be formed in a position closer to a front side of the seat than the shaft portion.

Due to such a configuration, an outer-side guide member that is pulled toward the rear side of the side frame from the breaking portion on the seat skin can be connected to the side frame side easily and with satisfactory durability.

In this case, the attachment member may include a hole contacting portion having an outer shape following a shape of the attachment hole and a protruding portion that protrudes outward from the hole contacting portion, and at least a portion of the protruding portion may extend from the airbag module side toward the side frame side and may be pressed by another member.

Due to such a configuration, the supporting rigidity when tensile force is applied to the guide member during deployment of the airbag module can be improved with a simple and compact configuration.

Moreover, the attachment member can be pressed toward the side frame side using an existing member of the airbag module side as the other member. In this case, the supporting rigidity when tensile force is applied to the guide member during deployment of the airbag module can be improved with a small number of components.

In this case, the other member may press at least a portion of a region of the attachment member surrounded by the attachment hole from the airbag module side.

Due to such a configuration, by pressing the region in which the attachment member and the side frame are connected from the airbag module side, it is possible to improve the supporting rigidity of the attachment member.

In this case, the end of the guide member may be disposed closer to an inner side of the seat than the side frame.

Due to such a configuration, the holding space that holds the end of the guide member does not protrude toward the airbag module side, and there is less limitation on the attachment position of the attachment member.

In this case, the attachment member may include: a restricting portion connected to the attachment hole to restrict movement of the attachment member from the attachment hole; and a planar protruding portion that protrudes from one end of the restricting portion, and at least a portion of the protruding portion may be sandwiched between the side frame and the guide member.

Due to such a configuration, the movement of the attachment member from the attachment hole is restricted, and the fabric member can be suppressed from making contact with the frame.

In this case, the restricting portion may include at least an upper wall and a lower wall that cover an upper side and a lower side of the holding space and make contact with an inner surface of the attachment hole.

Due to such a configuration, the guide member held in the holding space can be suppressed from being removed from the upper end and the lower end of the holding space during working or the like, and the movement of the attachment member in the up and down direction can be restricted.

In this case, the restricting portion may be formed by a continuous wall that makes contact with an inner surface of the attachment hole, and the continuous wall may form the holding space therein.

Due to such a configuration, the guide member can be held in the holding space with the aid of the continuous wall and the movement of the attachment member from the attachment hole can be restricted. Thus, the attachment member can be formed in a compact size.

In this case, a partition wall that partitions the holding space into a plurality of divided spaces may be provided on an inner surface of the continuous wall, and the plurality of divided spaces may communicate with each other to form a continuous passage for the guide member.

Due to such a configuration, the guide member can be passed through the plurality of divided spaces sequentially to be stored in the holding space, and the guide member can be rarely removed from the holding space.

In this case, the airbag module-equipped seat may further include a seat frame; a cushion pad supported by the seat frame; and a skin material that covers the airbag module and the cushion pad, wherein a pair of terminals of the skin material may be attached to an end of the guide member fixed to one of the pair of terminals to form a breaking portion that serves as a starting point of breaking of the skin material during deployment of the airbag and faces the cushion pad, and contact pressure that the cushion pad receives from the skin material and the guide member in the breaking portion may be designed so that the contact pressure on the terminal to which the guide member is fixed is lower than the contact pressure on the terminal to which the guide member is not fixed.

Even when the end of the guide member is fixed to only one of the terminals of the pair of skin materials, since the contact pressure that the cushion pad receives from the skin material and the guide member in the breaking portion may be designed so that the contact pressure on the terminal to which the guide member is fixed is lower than the contact pressure on the terminal to which the guide member is not fixed, the breaking portion on which the guide member is fixed will not protrude toward the front surface of the skin material by the distance corresponding to the guide member and will not be visible from the outside. As a result, the appearances of the sewn portion of the pair skin materials on the side where the airbag module is provided and the side where the airbag module is not provided will not be different and a mismatch in the right and left appearances can be suppressed.

In this case, the attachment member may be fitted into the attachment hole, a misassembly suppressing portion may be provided to suppress an assembly error of assembling the attachment member with the attachment hole, and the misassembly suppressing portion may be formed at least in a portion of the inner surface of the attachment hole that faces the attachment member or a portion of the attachment member that faces the inner surface of the attachment hole.

According to this configuration, when the attachment member is attached to the attachment hole in a wrong direction, the portion of the attachment member facing the inner surface of the attachment hole interferes with the inner surface of the attachment hole and the attachment member is not fitted into the attachment hole. Thus, an assembly error is prevented in advance. Thus, even when an operator does not check the direction of the attachment member, it is not necessary to reassemble the attachment member, and thus, it is easy to attach the attachment member to the attachment hole. Therefore, it is possible to provide an airbag module-equipped seat which provides high manufacturing efficiency.

The side frame may include an attachment portion to which the attachment member is attached and a step formed to surround the attachment portion.

Due to such a configuration, it is possible to improve the supporting rigidity of the periphery of the attachment portion to which the attachment member is attached. Since the guide member that guides the deployment direction of the airbag is attached to the attachment member, force is temporarily applied to the attachment member during inflation of the airbag. However, since a step is formed in the side frame to surround the attachment portion, the force generated during inflation of the airbag can be stably received.

In this case, a region of the side frame surrounded by the step may form a recess that is depressed deeper toward an inner side in the seat width direction than other portions of the side frame.

Due to such a configuration, a portion of the attachment member can be received in the recess, and the attachment member can be disposed in a compact space.

In this case, the airbag module-equipped seat may further include: a seat back frame having the side frame; and a cushion pad mounted on the seat back frame, wherein at least a portion of the attachment member may be exposed to a back surface of a front pad portion of the cushion pad that covers a front surface of the seat back frame and a region surrounded by a seat inner-side surface of the side frame.

Due to such a configuration, when seen from the rear side of the seat back frame in a state in which the cushion pad is mounted on the seat back frame, the attachment member can be observed from the back surface side of the seat back. Thus, whether the guide member and the attachment member are attached properly can be easily observed with the naked eyes during attachment of the airbag module and the like.

In this case, a method for mounting the airbag module-equipped seat according to an embodiment, wherein the airbag module-equipped seat further includes a seat back frame having the side frame, a cushion pad mounted on the seat back frame, and a trim cover that covers the cushion pad, and one end of the guide member being fixed to a breaking portion which is formed more fragile than the other portions of the trim cover, and the other end being connected to the side frame, the method may include: a guide member connecting procedure of connecting the other end of the guide member to the side frame; and an airbag module attaching procedure of attaching the airbag module to the side frame.

This method includes the guide member connecting procedure of connecting the other end of the guide member to the side frame, and the airbag module attaching procedure of attaching the airbag module to the side frame. Thus, since the airbag module is attached after the other end of the guide member is connected to the side frame, the workability of attaching the guide member is improved. That is, unlike the case of attaching the airbag module first, the airbag module does not become an obstacle during attachment of the guide member, and thus, it is easy to attach the guide member.

BRIEF DESCRIPTION OF THE DRAWINGS

Various embodiments of the invention are illustrated in the following drawings.

DETAILED DESCRIPTION

Hereinafter, embodiments of the present invention will be described with reference to the drawings. Furthermore, the members and the arrangement to be described below do not limit the present invention, and may be modified into various forms according to the spirit of the present invention.

In the present Specification, a front to back direction of a seat is a front to back direction when seen from an occupant in a state in which the occupant sits on the seat and will be referred to simply as a front to back direction. Moreover, an up and down direction is the up and down direction of the seat.

First Embodiment

A vehicle seat S as an airbag module-equipped seat according to the present embodiment will be described with reference to FIGS. 1 to 13.

Figure 1:
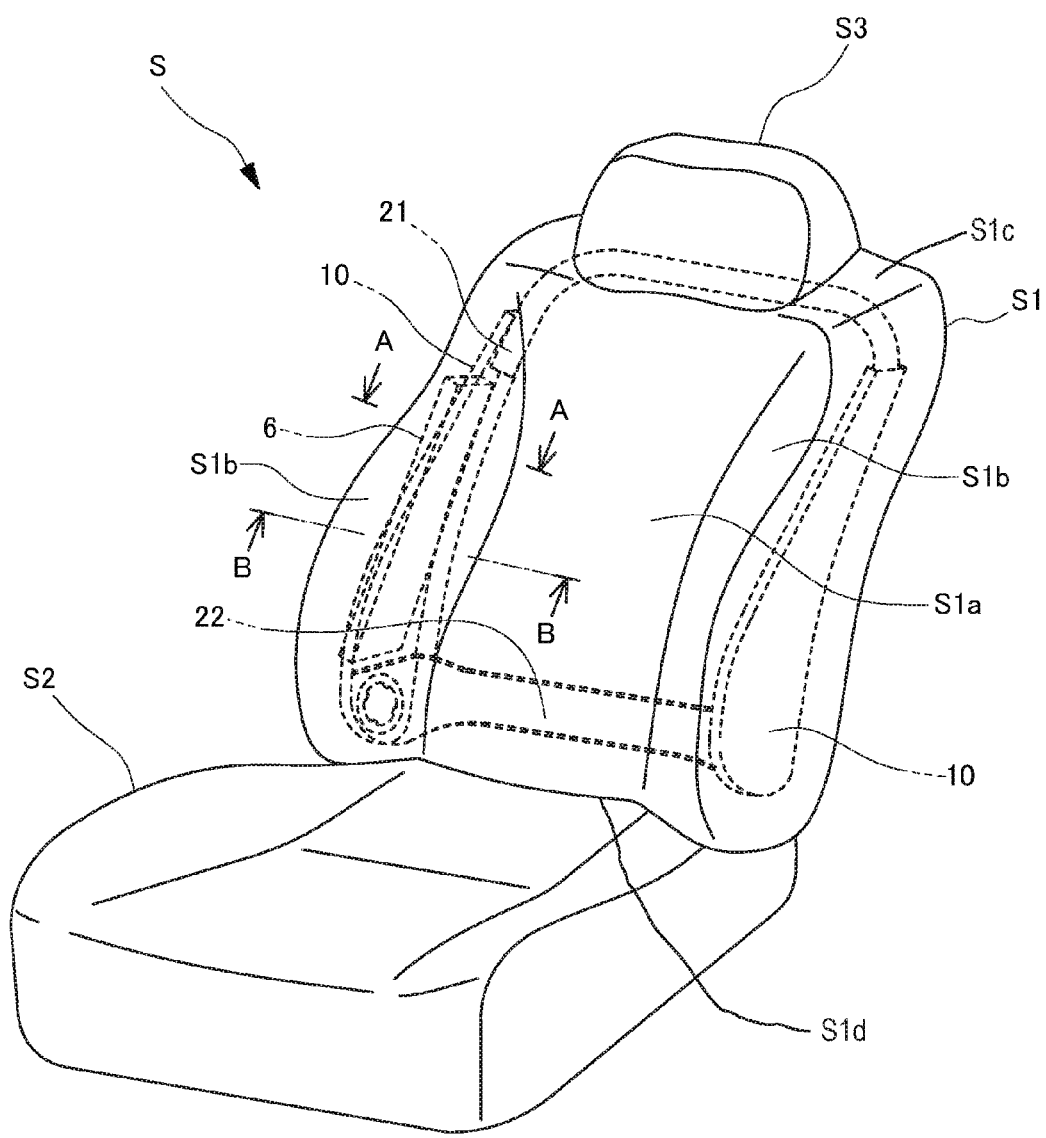
FIG. 1 is an external perspective view of an airbag module-equipped seat according to an embodiment of the present invention.

As illustrated in FIG. 1, the vehicle seat S includes a seat back S1, a seating portion S2, and a headrest S3.

The seat back S1 includes a front section S1a with which the back of an occupant makes contact, a pair of lateral sections S1b that protrude toward the front side on the lateral side of the seat from both right and left ends of the front section S1a to support the sides of the occupant from the lateral sides, an upper section S1c that is positioned above the front section S1a and the pair of lateral sections S1b to form an upper end of the seat back S1, a lower section S1d that is positioned below the front section S1a and the pair of lateral sections S1b to form a lower end of the seat back S1, and a rear section disposed on the back surface side of the seat back S1.

Figure 2:
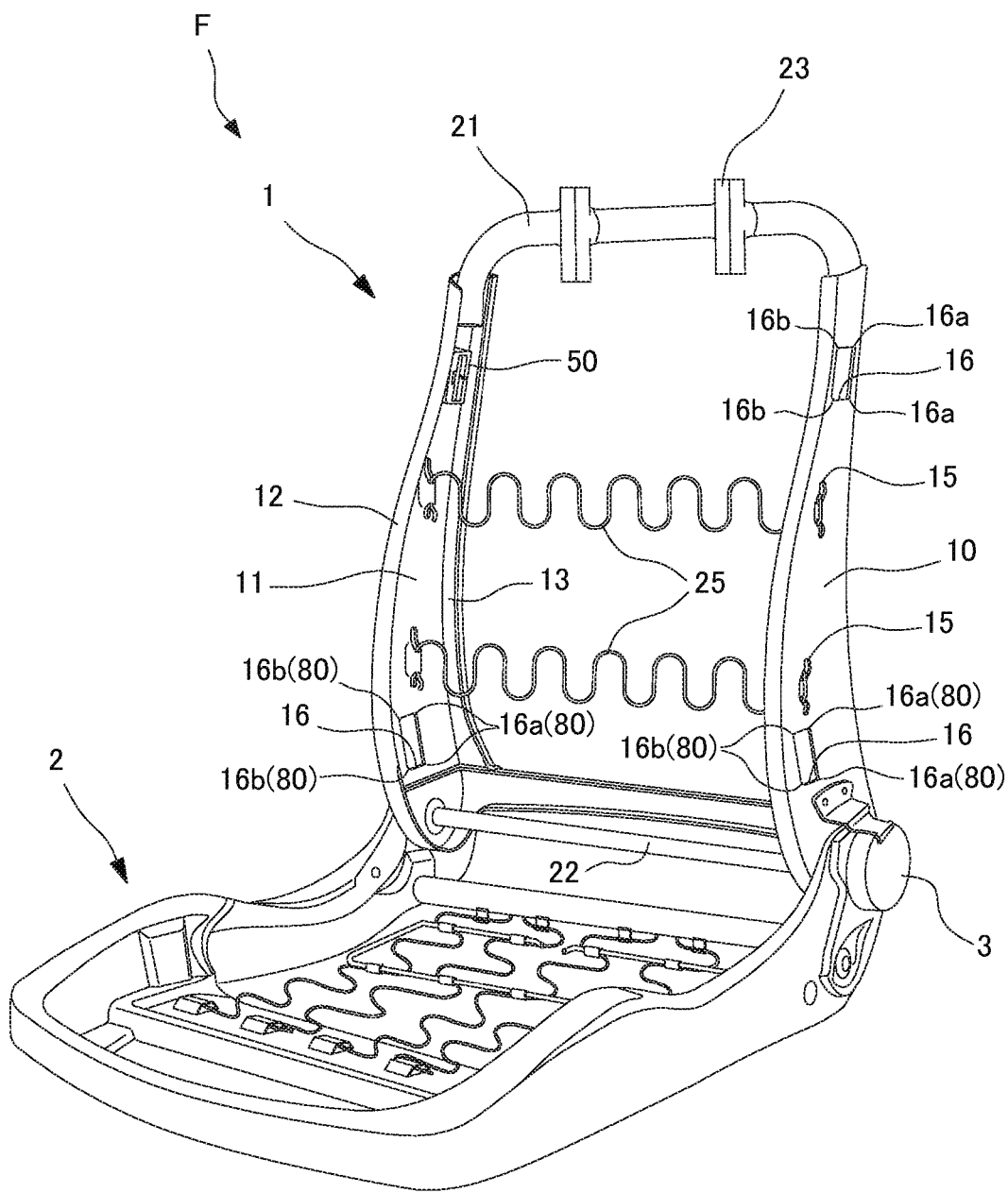
FIG. 2 is a perspective view of a seat frame of the airbag module-equipped seat according to an embodiment of the present invention.

A seat frame F as illustrated in FIG. 2 is provided in the vehicle seat S. The seat frame F includes a seat back frame 1 which is a frame of the seat back S1 and a seating frame 2 which is a frame of the seating portion S2. The seating frame 2 and the seat back frame 1 are connected by a reclining mechanism 3. A cushion and a trim cover are provided on the outer side of the seat back frame 1 and the seating frame 2 whereby the seat back S1 and the seating portion S2 are formed.

Figure 3:
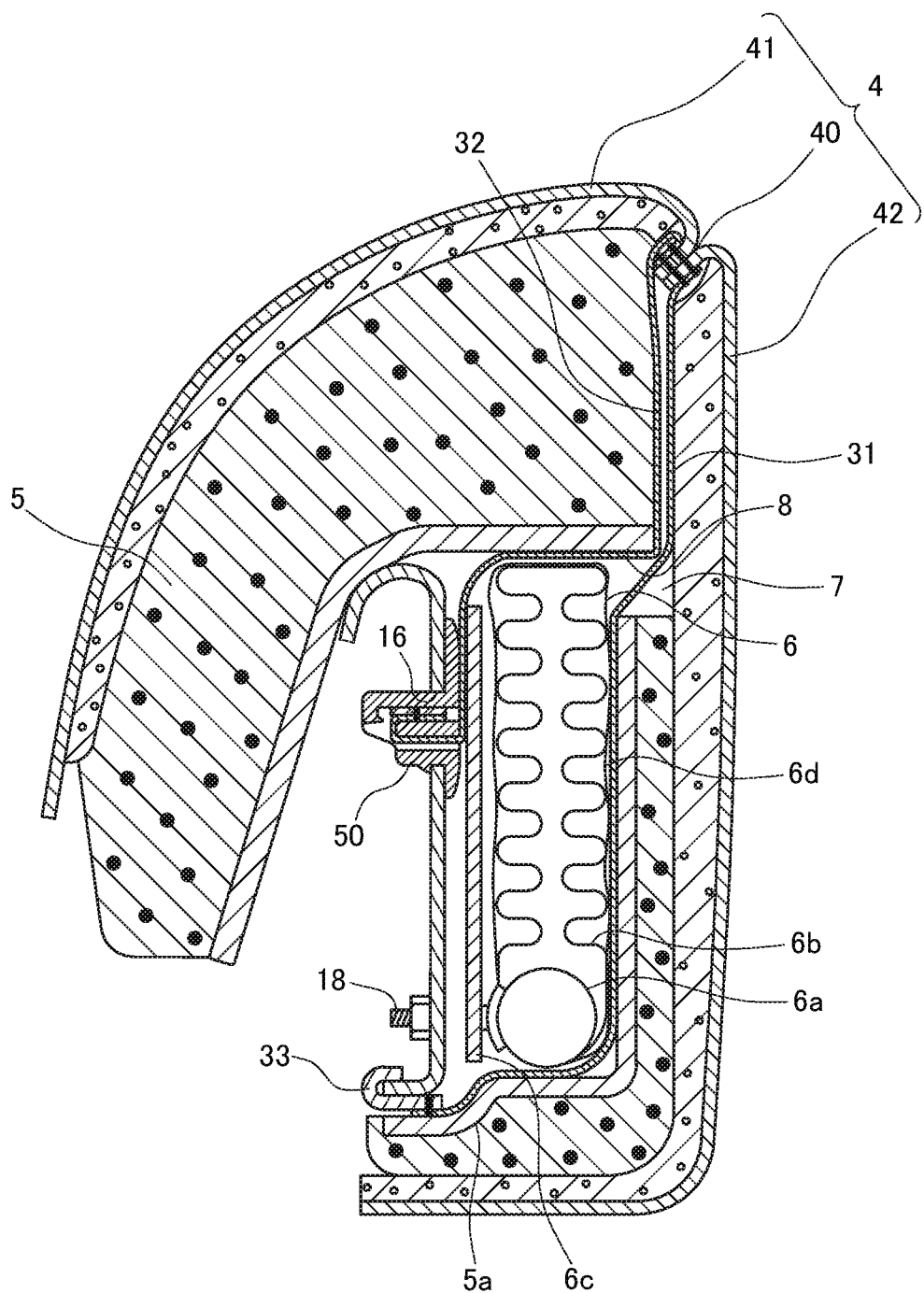
FIG. 3 is a cross-sectional view along line A-A in FIG. 1 and is an explanatory diagram illustrating a state in which a stay cloth is connected to a side frame using an attachment member according to an embodiment of the present invention.

As illustrated in FIGS. 1 to 3, the seat back S1 includes the seat back frame 1, a cushion pad 5 placed on the seat back frame 1, a trim cover 4 that covers the seat back frame 1 and the cushion pad 5 or 5a, and a stay cloth 32 having one end sewn to a breaking portion 40 of the trim cover 4 as its main components.

As illustrated in FIGS. 1 and 2, the seat back frame 1 is formed in a frame shape and includes side frames 10 disposed to be separated from each other in the right and left direction and to extend in the up to down direction, an upper frame 21 that connects the upper ends of the side frames 10, and a lower frame 22 that connects the lower ends of the side frames 10.

Pillar supporting portions 23 are provided in the upper frame 21, and a headrest frame (not illustrated) is attached to the pillar supporting portions 23. A cushion member is provided on the outer side of the headrest frame whereby the headrest S3 is formed.

The side frame 10 is molded by pressing a metal plate and is formed from an approximately plate member that is curved so that the width increases as it advances from the upper side toward the lower side. As illustrated in FIG. 2, the side frame 10 includes a side plate 11 having an approximately flat-plate shape, a front edge 12 formed by folding a front end of the side plate 11 inwardly in a U-shape, and a rear edge 13 formed by bending a rear end of the side plate 11 inwardly in an L-shape.

A locking portion 15 having a locking hole at which both ends of a pair of bridging members 25 as an occupant supporting member formed of an S-spring that supports the occupant from the rear side are locked and a pair of attachment holes 16 for attaching an attachment member 50 are formed in the side frame 10.

The attachment hole 16 is formed in a portion of the side plate 11 close to the front edge 12 as a vertically long rectangular hole following an inclination of the front edge 12.

The side frame includes the attachment hole 16 for the attachment member 50, formed at a position different from a shaft portion of a bolt 18 for attaching an airbag module 6. Thus, it is not necessary to support the stay cloth 32 using the shaft portion of the bolt 18 and form a hole directly in the stay cloth 32 itself. Therefore, it is possible to improve the durability of the connecting portions between the stay cloth 32 and the side frame 10. Moreover, since the attachment of the airbag module 6 to the side frame 10 and the connection of the stay cloth 32 to the side frame 10 are realized at different positions, it is possible to simplify the attachment structure. Moreover, the connection structure of the stay cloth 32 to the side frame 10 has no influence on the attachment of the airbag module 6.

In the present embodiment, the attachment hole 16 for attachment of the inner-side stay cloth 32 is formed at the position of the side frame 10 close to the front edge 12 only. However, when both the inner-side stay cloth 32 and the outer-side stay cloth 31 are attached to the side frame 10 using the attachment member 50, the attachment hole 16 for attachment of the outer-side stay cloth 31 may be formed at the position close to the rear edge 13.

A pair of attachment holes 16 are formed close to the upper and lower ends of the side plate 11 and are formed on the upper and lower sides of the locking portion 15 so that the locking portion 15 of the bridging member 25 is disposed between the attachment holes 16. In this manner, the attachment holes 16 are formed at different positions in the up and down direction rather than being arranged in line with the locking portion 15 in the horizontal direction. With this configuration, it is possible to improve the workability of the attachment of the bridging member 25 and the attachment member 50 and to suppress a decrease in rigidity of the side frame 10 at the attachment position of the bridging member 25 or the attachment member 50.

A small-width portion having a small width in the front to back direction of the side frame 10 has lower rigidity than a large-width portion having a large width in the front to back direction disposed on the lower side of the side frame 10. However, since the upper attachment hole 16 is disposed in a portion of the small-width portion of the side frame 10 close to the upper frame 21, it is possible to reinforce the rigidity.

As illustrated in FIG. 3, the airbag module 6 is fixed to a surface of the side frame 10 on the outer side of the seat.

The airbag module 6 of the present embodiment is configured as a caseless airbag module which does not have a module case. As illustrated in FIG. 3, the airbag module 6 includes an inflator 6a, a folded airbag 6b, a retainer 6c that holds the inflator 6a, and a wrapping material 6d that wraps the airbag 6b.

The periphery of the inflator 6a is fixed to the retainer 6c and the side frame 10 by a bolt 18 provided to stand toward the inner side of the seat S. The inflator 6a may be fixed to the side frame 10 by an inflator attachment member other than the bolt.

The inflator 6a is arranged in the airbag 6b and the airbag 6b is deployed toward the front side of the seat S by gas discharged from the inflator 6a.

The airbag 6b is held in a folded state by the wrapping material 6d formed of a fabric bag or the like, and the wrapping material 6d is configured to tear easily when the airbag 6b is deployed.

In the present embodiment, although the airbag module 6 is configured as a caseless airbag module, the present invention is not limited to this, and the airbag module 6 may be configured to have a module case.

As illustrated in FIG. 3, an opening 8 for storing the airbag module 6 is formed in the cushion pad 5, and the opening 8 forms a space 7.

Figure 4:
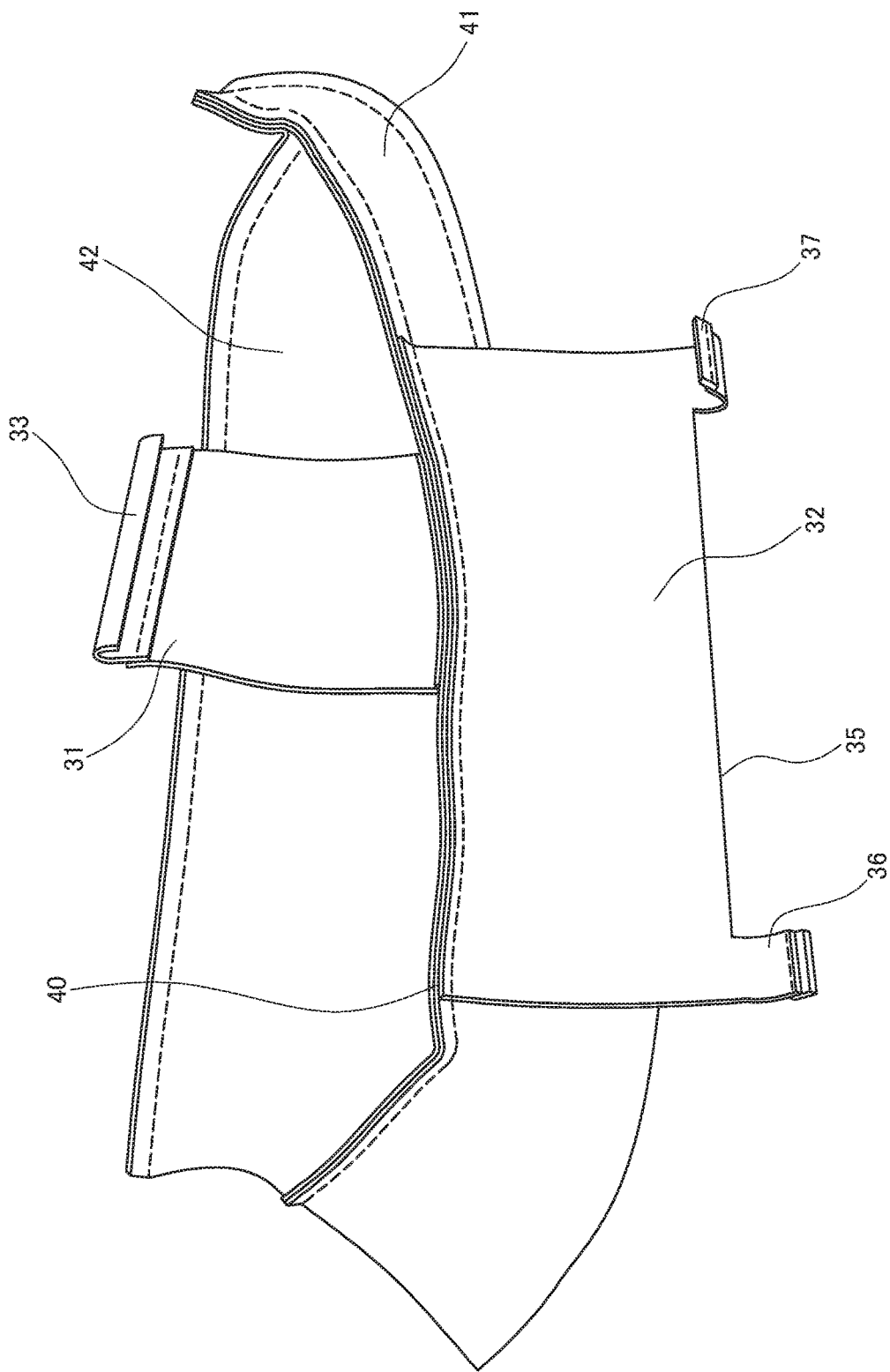
FIG. 4 is an explanatory perspective view diagram illustrating a state in which a trim cover according to an embodiment of the present invention and a stay cloth are sewn together in a breaking portion.

The trim cover 4 is formed of a well-known material, and, as illustrated in FIGS. 3 and 4, is sewn in a bag form by sewing a front wedge portion 41 that covers the right and left bank surface from the center of the seat surface and a lateral wedge portion 42 that extends from a peripheral side surface to reach the back surface and sewing a rear wedge portion (not illustrated) to an end of the lateral wedge portion 42 on the opposite side of the front wedge portion 41.

A breaking portion 40 is formed at the protruding apexes of the bank portions of the front wedge portion 41 and the lateral wedge portion 42. In the breaking portion 40, the ends of the front wedge portion 41 and the lateral wedge portion 42 are sewn together so that the ends can be broken with tensile force generated by inflation of the airbag while maintaining strength suitable for general usage.

As illustrated in FIG. 4, stay clothes 31 and 32 are sewn together in the breaking portion 40.

The stay cloth 32 is formed from a cloth-shaped material having small elasticity and performs the role of transmitting stress generated by inflation of the airbag to the breaking portion 40. The stay clothes 31 and 32 correspond to a guide member described in the embodiments.

As illustrated in FIG. 4, the stay cloth 32 is formed of an approximately rectangular cloth. A plurality of attachment portions 36 for attachment of trim plates 37 is provided on both ends of a side 35 that faces the breaking portion 40 to protrude in a rectangular shape.

The trim plate 37 is a rectangular plate member formed of a rigid resin. The trim plate 37 is used to maintain the shape of a terminal of the attachment portion 36 of the stay cloth 32. Since the trim plate 37 is fixed to the terminal of the stay cloth 32, the workability when inserting the terminal of the stay cloth 32 into the holding space 59 is improved. In the present embodiment, although the trim plate 37 is fixed to the attachment portion 36 of the stay cloth 32, the present invention is not limited to this. For example, the trim plate 37 may not be used, and the terminal of the attachment portion 36 of the stay cloth 32 may be folded or rolled a plurality of number of times and sewn together, which may be flattened by pressing and inserted into the holding space 59 of the attachment member 50.

As illustrated in FIG. 3, the stay cloth 32 is pulled from the breaking portion 40 into the space 7. The trim plate 37 fixed to the attachment portion 36 of the stay cloth 32 is locked at the attachment hole 16 of the side frame 10 using the attachment member 50.

Moreover, as illustrated in FIG. 3, a locking hook 33 is sewn and fixed to the other end of the stay cloth 31. The stay cloth 31 is pulled into a space formed between the airbag module 6 and the cushion pad 5a disposed on the rear side of the airbag module 6, and the locking hook 33 is locked at the rear edge 13 of the side frame 10.

When the attachment member 50 is also used for attachment of the outer-side stay cloth 31, the trim plate 37 is sewn and fixed to the end of the stay cloth 31. The attachment hole 16 is formed in a portion of the side frame 10 close to the rear edge 13, and the stay cloth 31 is attached to the attachment hole 16 by the attachment member 50 similarly to the inner-side stay cloth 32.

Since a configuration of attaching the stay cloth 31 to the side frame 10 using the attachment member 50 is the same as the configuration of attaching the stay cloth 32 except that the stay cloth is attached by reversing the front to back direction of the seat, the description thereof will not be repeated.

Figure 5:
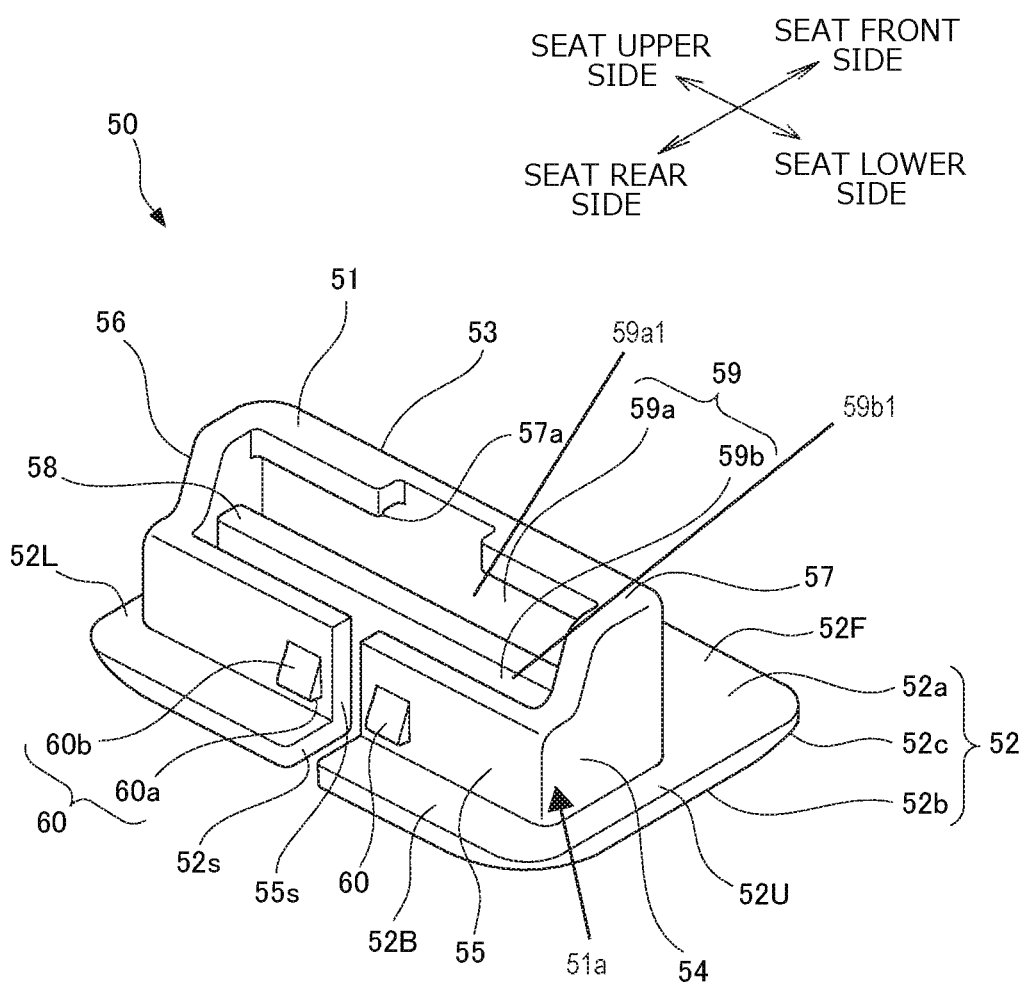
FIG. 5 is a perspective view of the attachment member according to an embodiment of the present invention.
Figure 7:
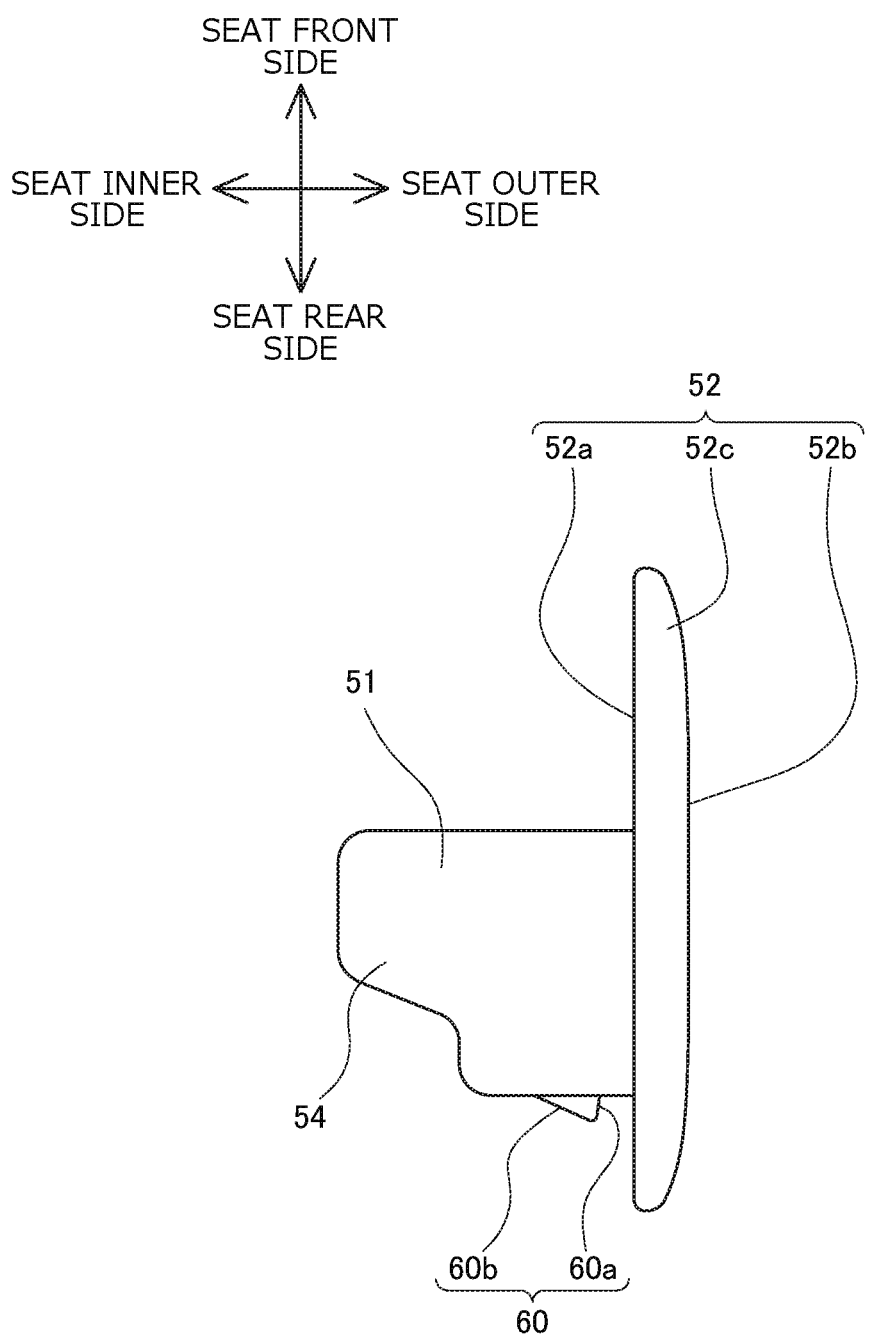
FIG. 7 is a side view of the attachment member according to an embodiment of the present invention.
Figure 8:
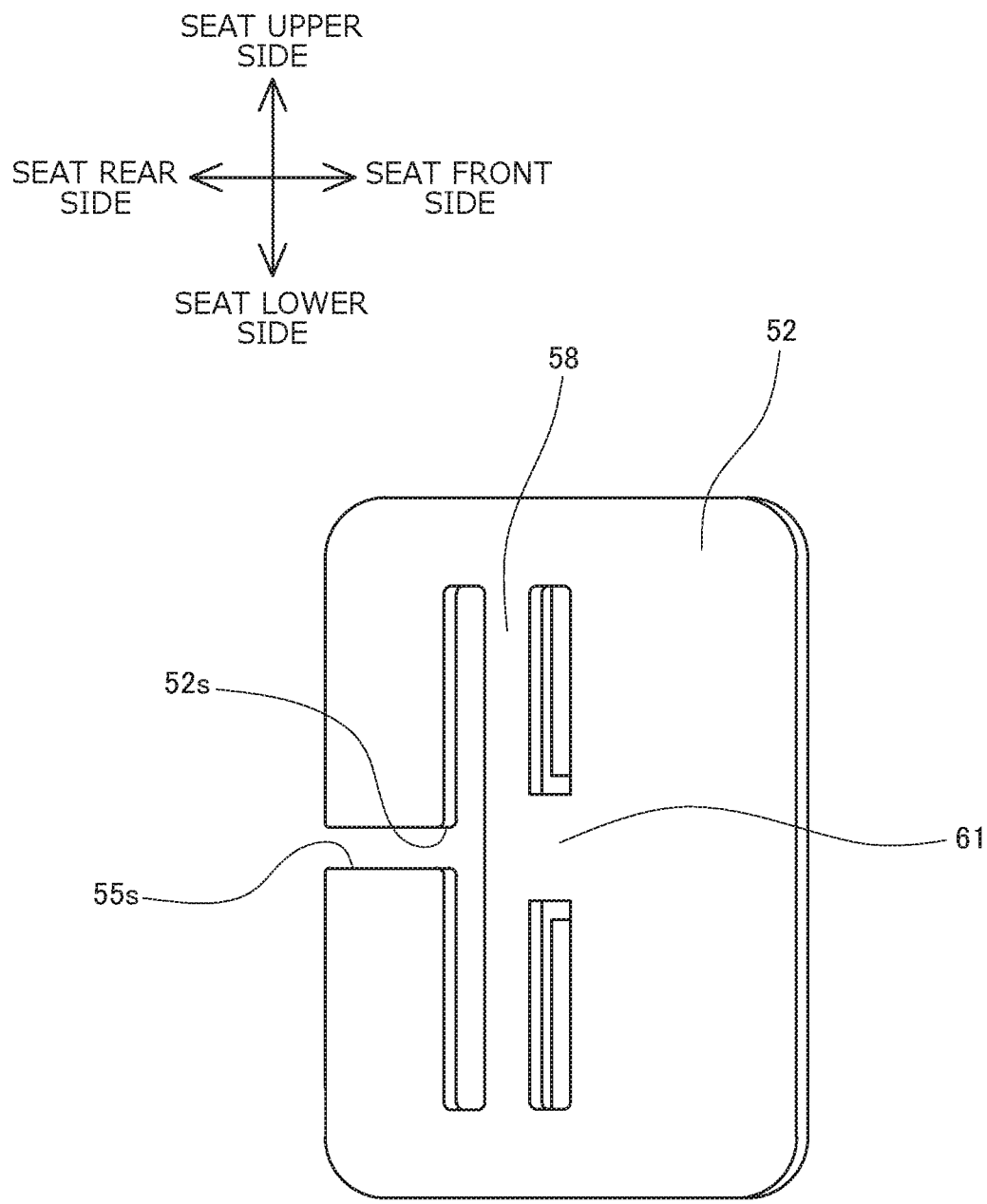
FIG. 8 is a bottom view of the attachment member according to an embodiment of the present invention.

The attachment member 50 is integrally molded with a rigid resin. As illustrated in FIGS. 5 and 7, the attachment member 50 includes a holding portion 51 having such a shape that one side of a hollow rectangular prism is notched and a planar flange portion 52 that is continuous from the notched side of the holding portion 51 and protrudes in all directions. The flange portion 52 corresponds to a protruding portion described in the embodiments.

The holding portion 51 includes a front wall 53, a horizontal wall 54, a rear wall 55, a horizontal wall 56, a top wall 57 erected vertically toward the rear side from an end of the front wall 53 on the opposite side of the flange portion 52, and a partition wall 58 that bridges the horizontal walls 54 and 56 and is parallel to the front wall 53 and the rear wall 55.

The space surrounded by the front wall 53, the horizontal wall 54, the rear wall 55, the horizontal wall 56, and the top wall 57 is the holding space 59 in which the trim plate 37 is locked. The holding space 59 is divided into a front space 59a and a rear space 59b by the partition wall 58.

Moreover, when the attachment member 50 is attached to the side frame 10 on the right side of the seat S, the horizontal wall 54 is positioned on the upper side and the horizontal wall 56 is positioned on the lower side. When the attachment member 50 is attached to the side frame 10 on the left side of the seat S, the horizontal wall 54 is positioned on the lower side and the horizontal wall 56 is positioned on the upper side.

As illustrated in FIGS. 5 and 7, the horizontal walls 54 and 56 are formed in an approximately L-shape in which one corner of a rectangle is notched.

Figure 6:
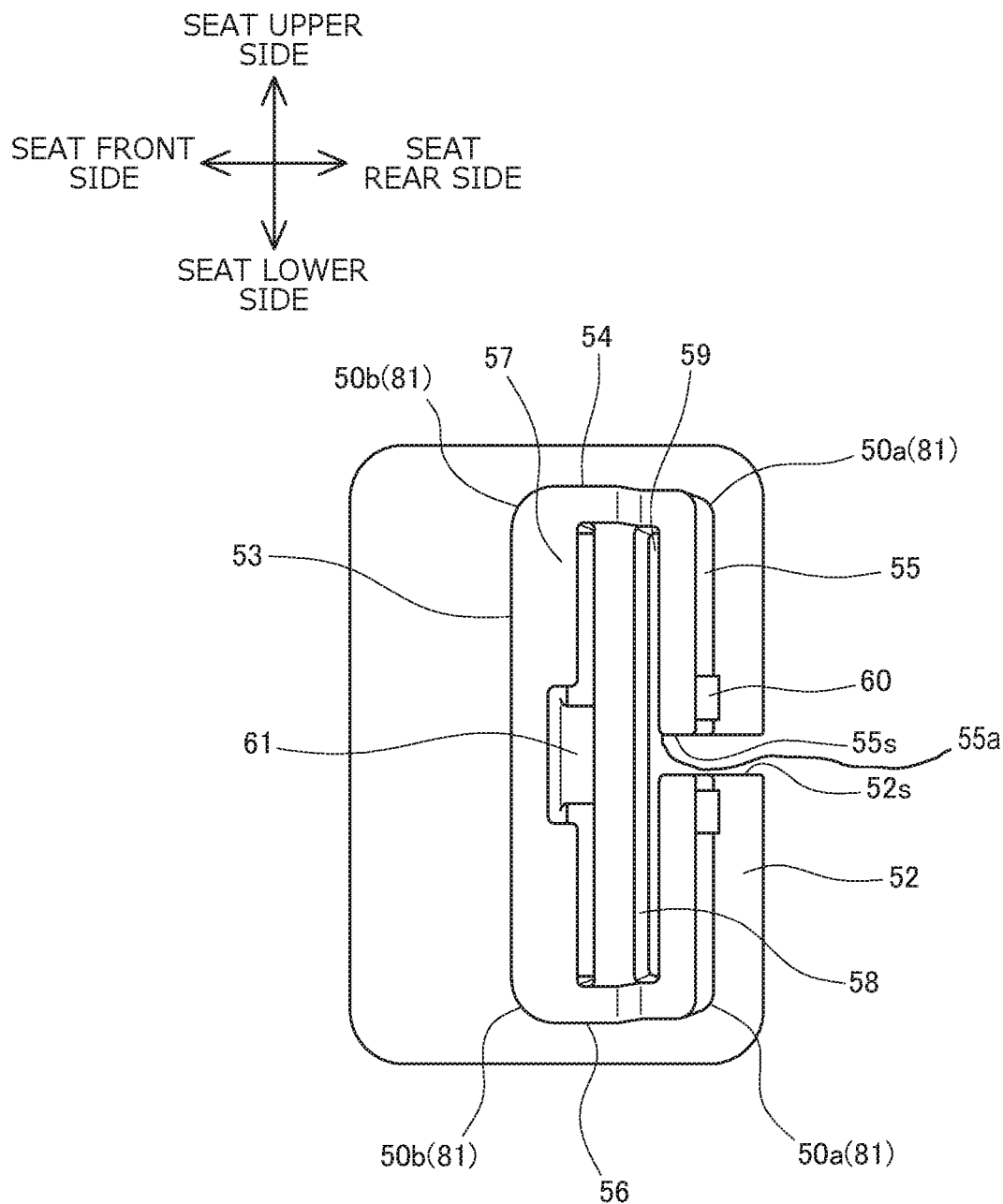
FIG. 6 is a plan view of the attachment member according to an embodiment of the present invention.

Moreover, as illustrated in FIGS. 5 and 6, the top wall 57 is formed in such a shape that the center in the up and down direction of the top wall 57 is notched to be recessed up to the front wall 53.

The notched portions of the horizontal walls 54 and 56 and the top wall 57 form an approximately T-shaped opening, and the stay cloth 32 and the trim plate 37 that are locked inside the holding space 59 can be observed through the opening. Moreover, with this opening, the attachment member 50 can be molded without using a core by splitting the mold from the two directions of the holding portion 51 side and the flange portion 52 side.

A slit 55s is formed at the center in the up and down direction of the rear wall 55. This slit 55s is continuous to a slit 52s formed at the center of the rear portion of the flange portion 52. These slits 55s and 52s divide the rear wall 55 and the rear portion of the flange portion 52 into two parts at the center. The slits 55s and 52s are used for inserting the stay cloth 32 into the holding space 59.

As illustrated in FIGS. 5 to 7, projections 60 are formed on the outer surface of the rear wall 55 on the rear side of the seat with the slit 55s interposed.

The projection 60 has an approximately triangular prism shape having a surface 60a that is disposed close to the flange portion 52 and has an angle close to the right angle with respect to the rear wall 55 and a surface 60b that is disposed on the opposite side of the flange portion 52 and has a small acute angle with respect to the rear wall 55. The distance between the surface 60a and the flange portion 52 is the same as or slightly larger than the thickness of the side frame 10 in the attachment hole 16. The surface 60a is a surface that faces the flange portion 52 and the edge of the attachment hole 16 is interposed between the surface 60a and the flange portion 52 so that removal of the attachment member 50 from the attachment hole 16 can be suppressed.

A thick portion of the holding portion 51 disposed between the projection 60 and the flange portion 52 close to the flange portion 52 corresponds to a hole contacting portion described in the embodiments.

The ends of the partition wall 58 and the front wall 53 on the outer side of the seat are connected by a bridge portion 61. The bridge portion 61 is provided as a short strip of board at the center in the up and down direction of the partition wall 58 and the front wall 53 and forms the same surface as the surface of the flange portion 52. The width of the bridge portion 61 in the up and down direction of the seat is smaller than the width of the notch portion formed at the center of the top wall 57 so that the attachment member 50 can be molded by splitting the mold from two directions of the holding portion 51 side and the flange portion 52 side. The bridge portion 61 performs the role of a stopper that prevents the ends of the trim plate 37 and the stay cloth 32 inserted in the holding space 59 from being removed from the holding space 59.

A projection 57a that protrudes toward the front space 59a is formed at the distal end of the inner surface of the top wall 57 close to the rear wall 55. This projection 57a performs the role of a stopper that suppresses the trim plate 37 inserted in the front space 59a from being pulled out of the front space 59a upon receiving force that causes the trim plate 37 to be pulled out of the front space 59a via the stay cloth 32 during inflation of the airbag 6b.

The projection 57a has a surface that is disposed on the outer side of the front space 59a and is formed as a flat surface that is continuous from the distal end of the top wall 57 and a surface that is disposed close to the front space 59a and has an approximately L-shaped hooked step. Although the trim plate 37 can be inserted into the front space 59*a* by the force of a person's hand, when a force that causes the trim plate 37 to be pulled out of the front space 59*a* is applied, the end of the trim plate 37 is locked at the step. As a result, the trim plate 37 is not easily pulled out of the front space 59*a*.

The flange portion 52 has a flat plate shape having a contacting surface 52*a* that makes contact with the side frame 10 and a pressing surface 52*b* on the rear side of the contacting surface 52*a*. The contacting surface 52*a* is a flat surface and the pressing surface 52*b* has a peripheral edge portion that forms a curved surface 52*c* that is curved toward the contacting surface 52*a* so that the end of the pressing surface 52*b* crosses the end of the contacting surface 52*a*.

A front portion of the flange portion 52 disposed closer to the front side than the holding portion 51 is longer than a rear portion disposed closer to the rear side than the holding portion 51. Thus, when the flange portion 52 is assembled with the side frame 10, it is possible to suppress the stay cloth 32 from making contact with the boundary portion between the front edge 12 and the side plate 11 of the side frame 10 and from being damaged.

Figure 9:
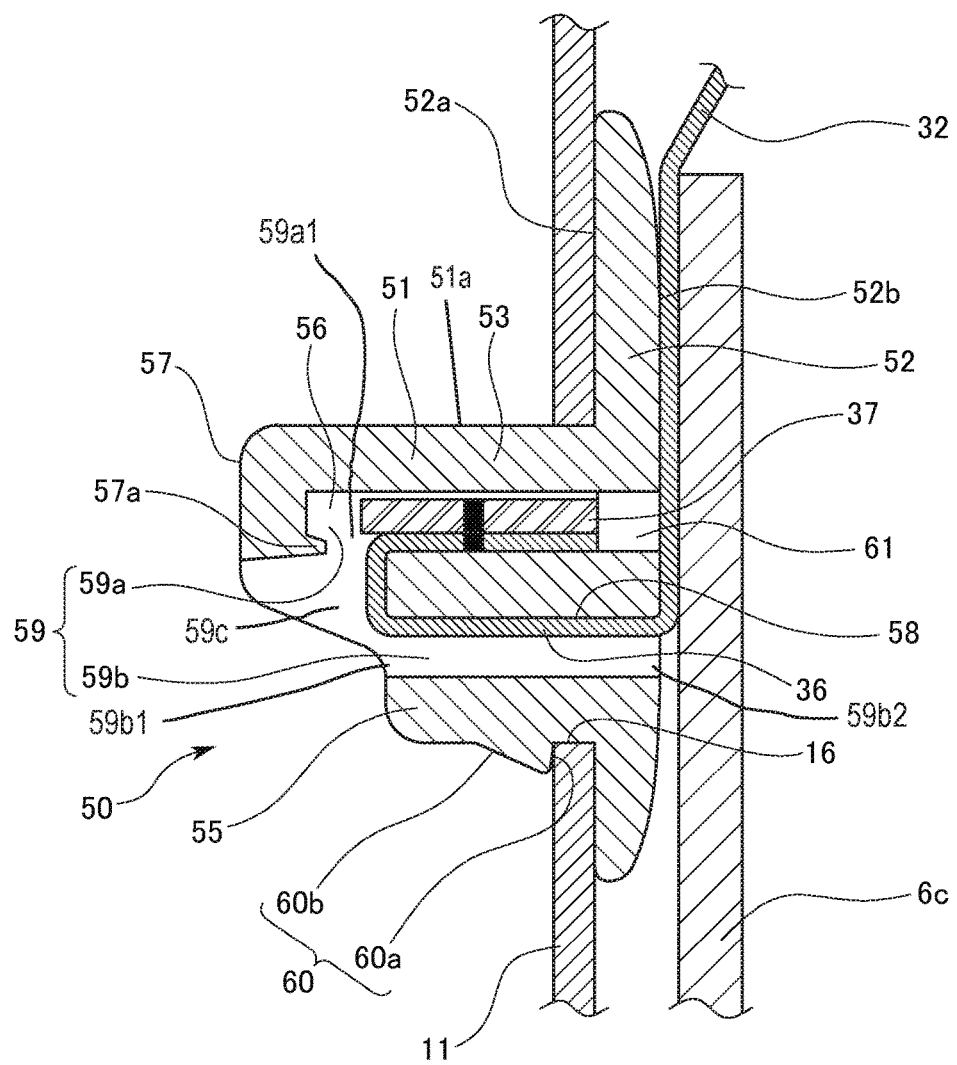
FIG. 9 is an explanatory cross-sectional view illustrating a state in which a stay cloth is connected to a side frame using the attachment member according to an embodiment of the present invention.

FIG. 9 illustrates a cross-sectional view of a state in which the end of the stay cloth 32 is attached to the side plate 11 of the side frame 10 using the attachment member 50.

The attachment member 50 is inserted into the attachment hole 16 in a state in which the long portion of the flange portion 52 is on the front side and the outer surface of the holding portion 51 close to the flange portion 52 is in contact with the inner surface of the attachment hole 16 of the side frame 10. In this case, the edge of the rear portion of the attachment hole 16 is interposed between the flange portion 52 and the projection 60.

In this manner, since the attachment member 50 is inserted into the attachment hole 16, the attachment position of the attachment member 50 in the up and down direction and the front to back direction can be easily restricted by the contacting surface of the attachment member 50 and the attachment hole 16. Moreover, the stay cloth 32 is suppressed from making contact with the end of the side frame 10 according to the pulling direction of the stay cloth 32.

The trim plate 37 is held in the front space 59*a* in a state in which the trim plate 37 is sewn to the end of the stay cloth 32 and faces the front surface of the partition wall 58. The trim plate 37 and the end of the stay cloth 32 are in contact with a surface of the bridge portion 61 on the inner side of the seat.

In this manner, the trim plate 37 having higher rigidity than the stay cloth 32 is fixed to the end of the stay cloth 32, and the attachment member 50 is inserted into the attachment hole 16 in a state in which the trim plate 37 is held in the holding space 59. Thus, the durability of the stay cloth 32 when the stay cloth 32 receives tensile force generated by inflation of the airbag 6*b* can be improved as compared to when a hole is formed in the stay cloth 32 itself and a shaft on the side frame side is inserted into the hole to fix the stay cloth 32.

Figure 10:
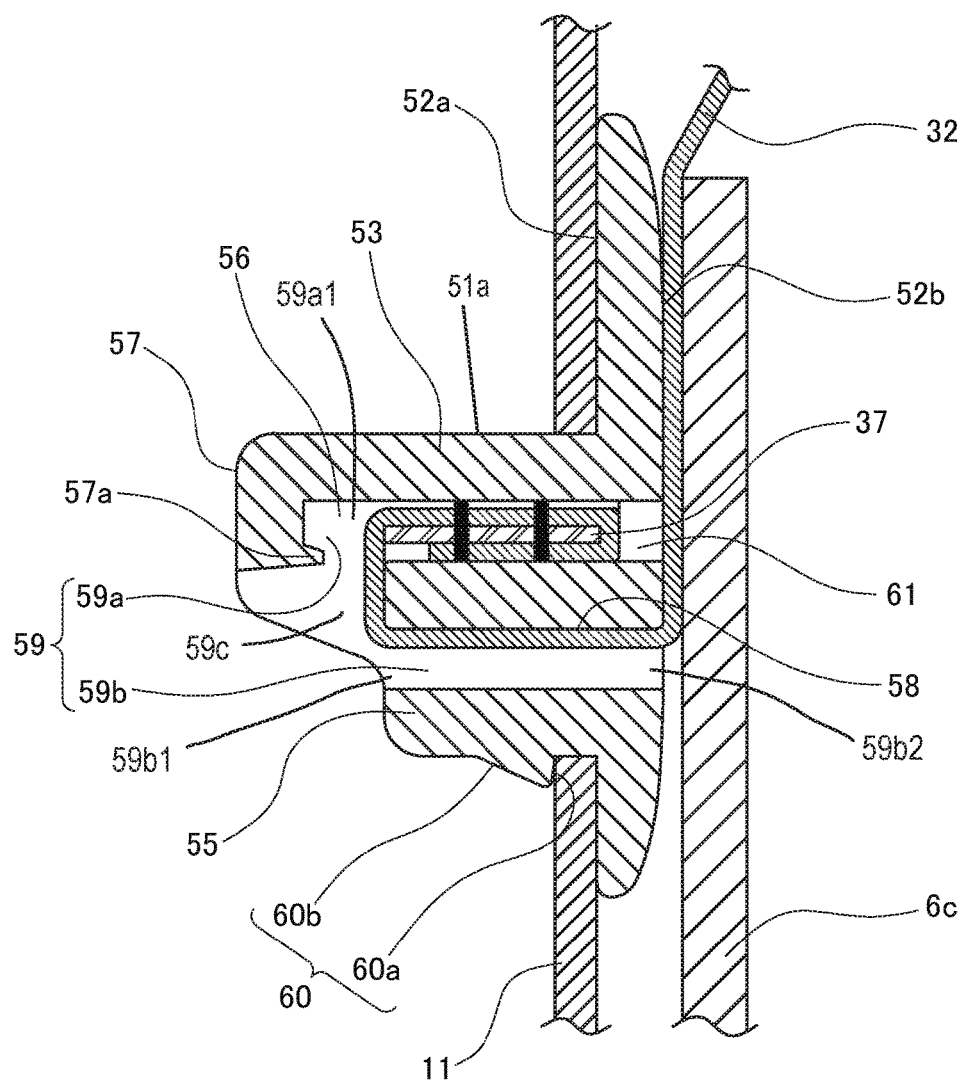
FIG. 10 is an explanatory cross-sectional view illustrating a state in which a stay cloth is connected to a side frame using the attachment member according to an embodiment of the present invention and illustrates an example in which a method of attaching the stay cloth to the attachment member is changed.

Although the trim plate 37 faces the inner surface of the front wall 53 in FIG. 9, the stay cloth 32 may be folded to match the width of the trim plate 37 as in FIG. 10 so that the trim plate 37 is sandwiched by the folded stay clothes 32 in the front space 59*a* and both surfaces of the trim plate 37 are in contact with the stay clothes 32. In this case, the stay cloth 32 makes contact with the inner surface of the front wall 53.

The stay cloth 32 passes between the partition wall 58 and the top wall 57 to enter the rear space 59*b* and passes through the opening of the rear space 59*b* close to the flange portion 52 to be drawn to the outer side of the attachment member 50.

The flange portion 52 is disposed so that the contacting surface 52*a* is in contact with the side plate 11. Moreover, the pressing surface 52*b* of the flange portion 52 is pressed by the retainer 6*c* in a state in which the stay cloth 32 is sandwiched between the pressing surface 52*b* and the retainer 6*c*.

In the present embodiment, although approximately the entire surface of the pressing surface 52*b* is pressed toward the side plate 11 by the retainer 6*c*, the present invention is not limited to this, and at least a portion of the pressing surface 52*b* may be pressed by the retainer 6*c*.

When a portion of the pressing surface 52*b* close to the front side of the seat is pressed, since the stay cloth 32 as well as the pressing surface 52*b* is pressed, it is possible to suppress the tensile force generated by inflation of the airbag 6*b* from being transmitted to the attachment member 50 efficiently. As a result, the inflating force of the airbag 6*b* can be transmitted to the breaking portion 40 by the stay cloth 32 smoothly.

Moreover, in the present embodiment, although the pressing surface 52*b* is pressed by the retainer 6*c*, the pressing surface 52*b* may be pressed by the inflator 6*a* or the airbag 6*b*. When the airbag 6*b* is disposed in contact with the pressing surface 52*b*, although the pressing surface 52*b* does not receive the pressing force from the airbag 6*b* in a normal usage mode, the pressing surface 52*b* is pressed toward the side plate 11 when the airbag 6*b* is inflated.

Moreover, when the airbag 6*b* is stored in a module case, the pressing surface 52*b* may be pressed by the module case. Moreover, a dedicated member for pressing the pressing surface 52*b* may be provided.

The procedure of attaching the end of the stay cloth 32 to the side frame 10 will be described.

First, the end of the attachment portion 36 of the stay cloth 32 to which the trim plate 37 is sewn is locked at the attachment member 50.

Attachment of the stay cloth 32 to the attachment member 50 is performed in the following procedure. One of the two sides of the attachment portion 36 vertical to the trim plate 37 is inserted into the rear space 59*b* through the slits 55*s* and 52*s*. In this case, the trim plate 37 faces the rear wall 55 side and the end of the attachment portion 36 faces the front wall 53 side.

Subsequently, the other one of the two sides of the attachment portion 36 vertical to the trim plate 37 is inserted into the rear space 59*b* through the slits 55*s* and 52*s* to realize a state in which the attachment portion 36 passes through the rear space 59*b*.

Subsequently, the trim plate 37 is inverted by 180°, the end of the attachment portion 36 is bent toward the front space 59*a*, the trim plate 37 is inserted into the front space 59*a* from the gap between the partition wall 58 and the top wall 57, and the trim plate 37 is pushed until the distal end of the trim plate 37 makes contact with the bridge portion 61. In this way, connection of the stay cloth 32 and the attachment member 50 is completed.

Subsequently, the attachment member 50 is inserted into the attachment hole 16 from the seat outer side of the side frame 10, and the attachment member 50 is pushed until the rear-side edge of the attachment hole 16 of the side plate 11 is interposed between the flange portion 52 and the projection 60.

In this case, specifically, as described above, when the attachment member 50 is pushed toward the attachment hole 16 side, the projection 60 makes contact with the inner surface of the attachment hole 16 so that force directed toward the front wall 53 side is applied to the rear wall 55. With this force, the rear wall 55 is bent and the holding portion 51 can be inserted into the attachment hole 16. Further, when the attachment member 50 is inserted up to such a position that the projection 60 moves beyond the inner surface of the attachment hole 16, bending of the rear wall 55 disappears and the attachment member 50 is fitted into the attachment hole 16.

The airbag module 6 is assembled from the outer side of the seat. In this case, the airbag module 6 is fixed by the bolt 18 in a state in which the retainer 6c presses at least a portion of the flange portion 52.

After that, the cushion pads 5a are disposed on the outer side of the airbag module 6 and the cushion pads 5a are covered by the trim cover 4 to form the seat.

Figure 11:
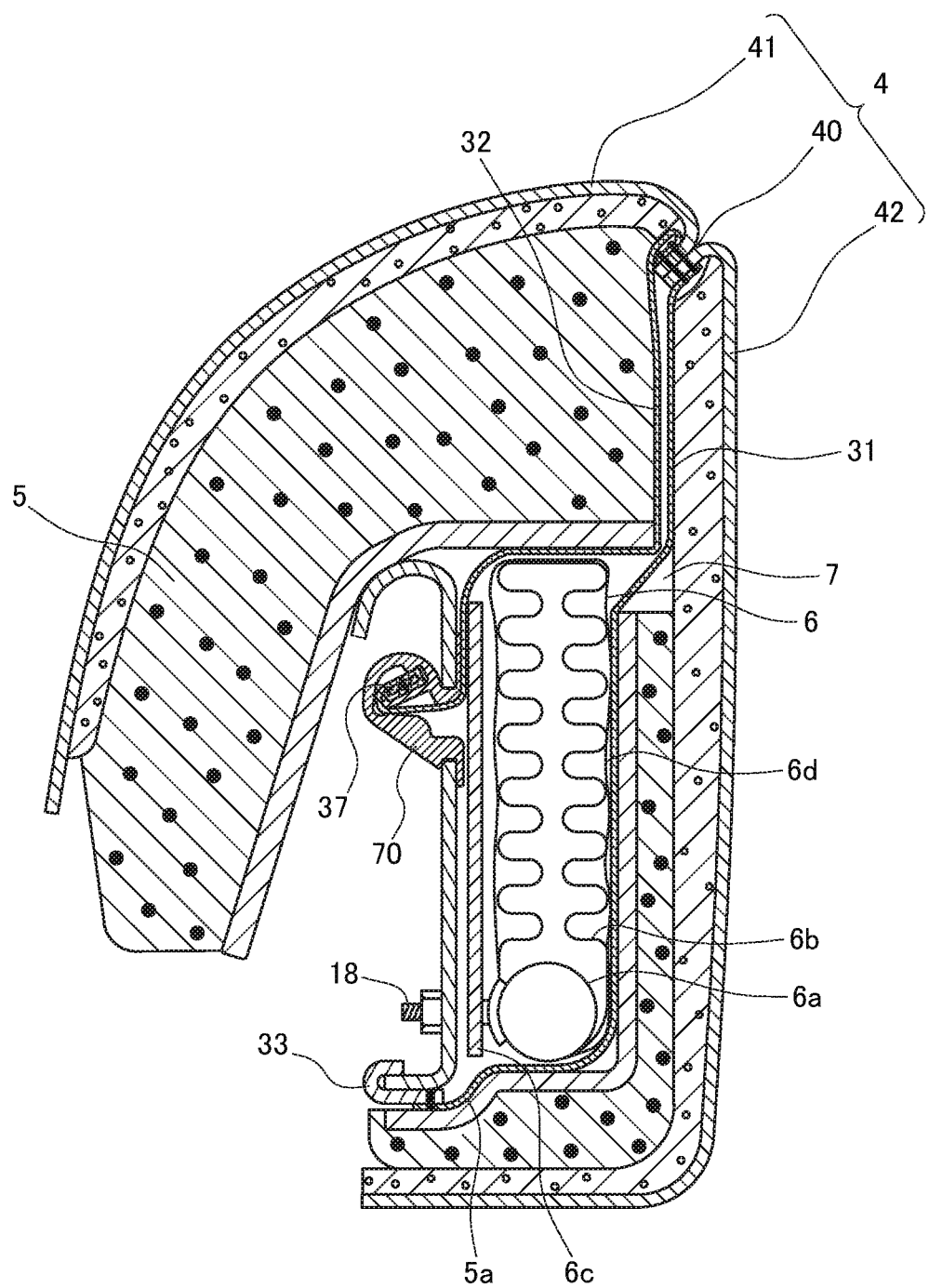
FIG. 11 is a cross-sectional view along line A-A in FIG. 1 and is an explanatory diagram illustrating a state in which a stay cloth is connected to a side frame using an attachment member according to another embodiment of the present invention.
Figure 12:
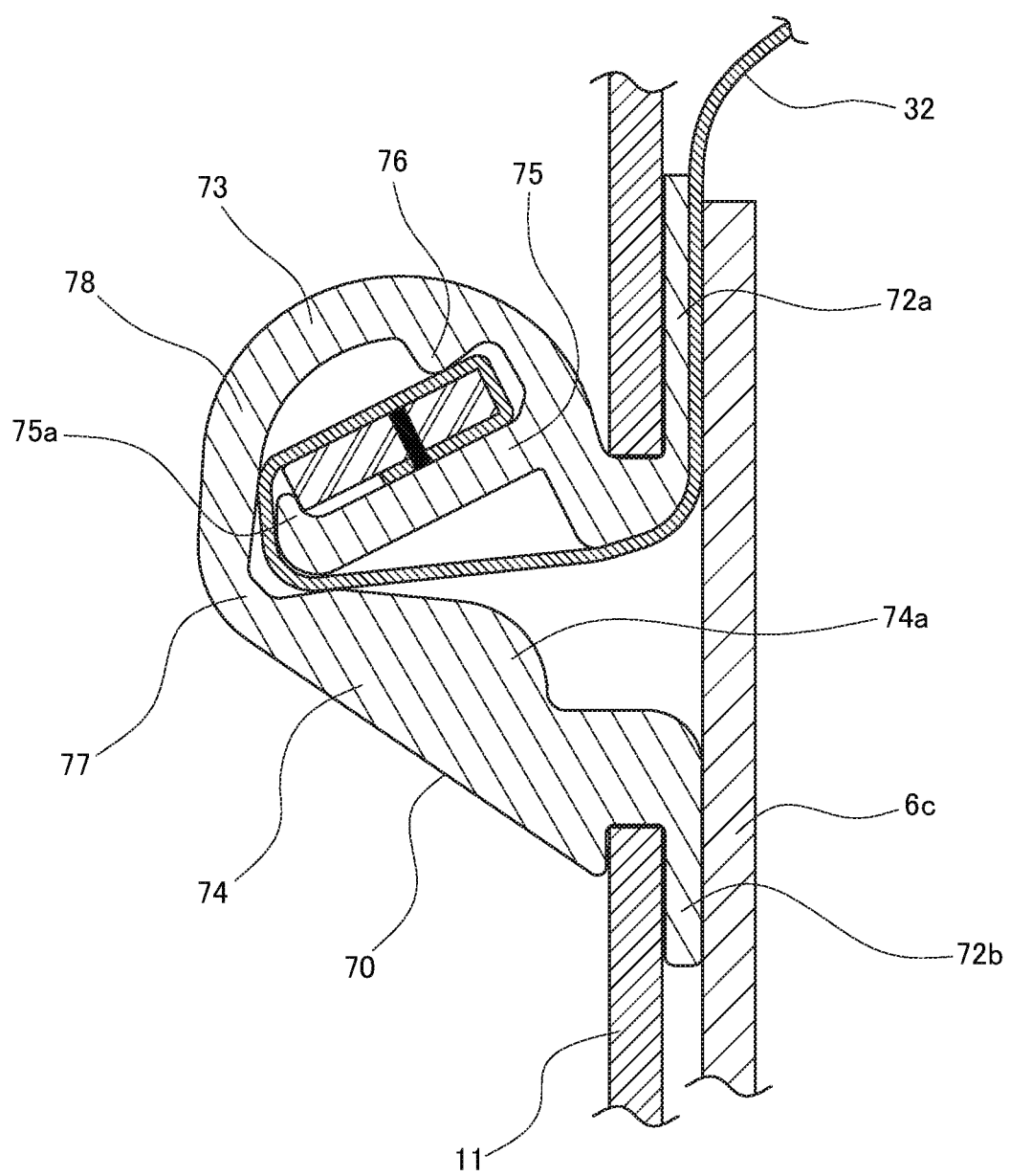
FIG. 12 is an explanatory cross-sectional view illustrating a state in which a stay cloth is connected to a side frame using an attachment member according to another embodiment of the present invention.
Figure 13:
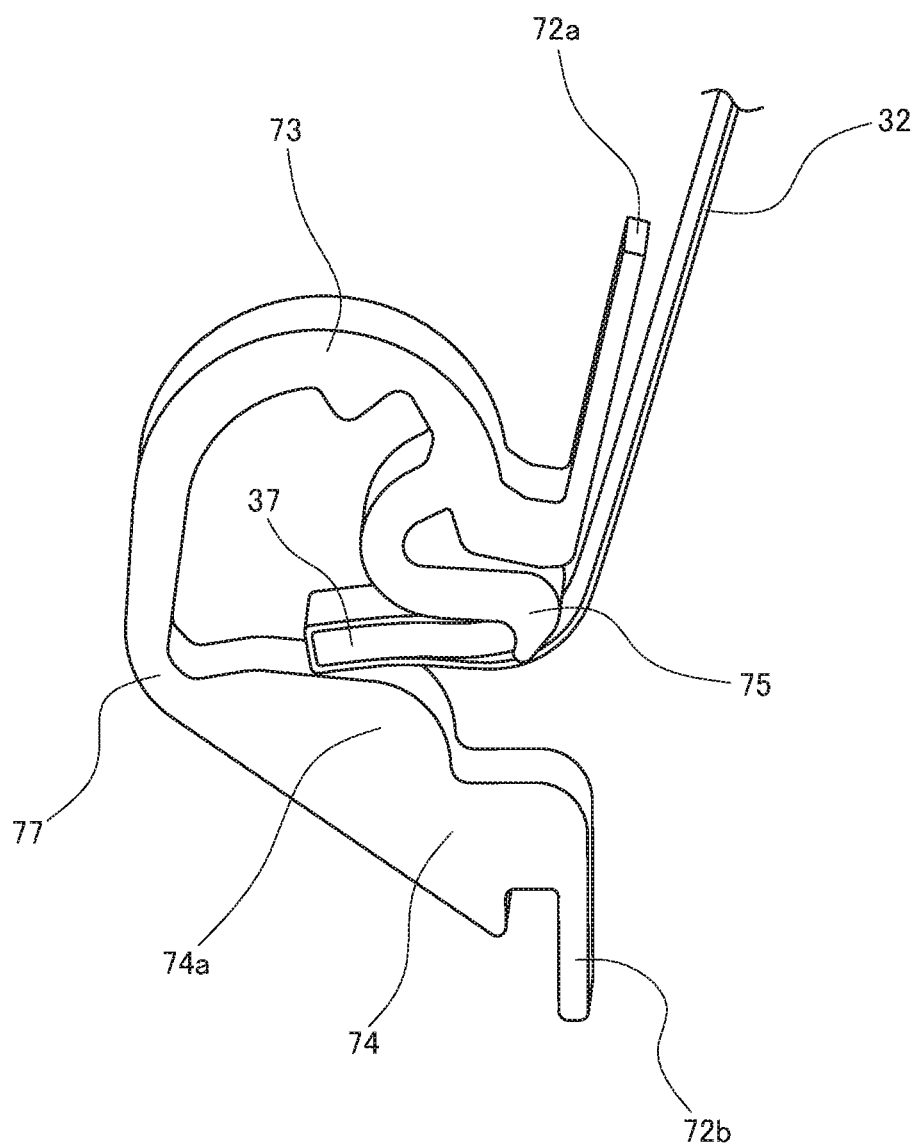
FIG. 13 is an explanatory perspective view diagram illustrating a state in which tensile force is applied to a stay cloth connected to a side frame using an attachment member according to another embodiment of the present invention.

FIGS. 11 to 13 illustrates another embodiment of the attachment member of the present invention.

An attachment member 70 of the present embodiment is integrally molded from a rigid resin. As illustrated in FIG. 12, the attachment member 70 includes a holding portion 78 formed of an approximately cylindrical form having open upper and lower ends and a pair of planar flange portions 72a and 72b formed continuously from both sides of a slit formed on a side wall surface of the holding portion 78 along the up and down direction. The flange portions 72a and 72b correspond to a protruding portion described in the embodiments.

The holding portion 78 includes a holding wall 73 formed continuously from one flange portion 72a and having an approximately semicircular cylindrical form, a contacting wall 74 formed continuously between the holding wall 73 and the other flange portion 72b, and a planar locking portion 75 standing toward the inner side from a position between the flange portion 72a and the inner surface of the holding wall 73.

The holding wall 73 has an approximately semicircular cylindrical form and a projection 76 having a surface approximately parallel to the locking portion 75 is formed on an inner surface of the holding wall 73 at a position separated from the locking portion 75 by a distance slightly larger than the thickness of the trim plate 37.

A thin hinge portion 77 is disposed between the holding wall 73 and the contacting wall 74. The hinge portion 77 allows the attachment member 70 to be easily attached to the attachment hole 16 since the angle between the holding wall 73 and the contacting wall 74 decreases when the attachment member 70 is pushed into the attachment hole 16.

The locking portion 75 is formed of a planar member that extends toward the hinge portion 77 from the position between the holding wall 73 and the flange portion 72a. A space at least having a size corresponding to the thickness of the stay cloth 32 is formed between the hinge portion 77 and the distal end of the locking portion 75.

A projection 75a protruding vertically toward the holding wall 73 in a hook shape is formed on the distal end of the locking portion 75.

The contacting wall 74 has such a shape that the outer surface is approximately flat and the inner surface bulges in an approximately M-shape in a cross-sectional view.

As illustrated in FIG. 13, when tensile force is applied to the stay cloth 32 during deployment of the airbag 6b, the locking portion 75 is pressed by the trim plate 37 so that the distal end of the locking portion 75 is moved between the flange portions 72a and 72b. In this case, the trim plate 37 makes contact with an inner bulging portion 74a of the M-shaped bulging surface disposed close to the hinge portion 77 so that the trim plate 37 is suppressed from being removed from the locking portion 75. As a result, inflating force of the airbag 6b can be transmitted to the breaking portion 40 smoothly by the stay cloth 32.

The attachment member 70, the side frame 10, and the other configuration of the airbag module 6 are the same as the attachment member 50, the side frame 10, and the airbag module 6 illustrated in FIGS. 1 to 10, and the description thereof will not be repeated.

Second Embodiment

A vehicle seat S as an airbag module-equipped seat according to another embodiment of the present invention will be described with reference to FIGS. 1, 3, 4, and 14 to 19.

In the present embodiment, an example in which a stay cloth 32 as a fabric member is connected to a side frame 10 as a frame using an attachment member 150 will be described. However, the present invention is not limited to this, and a fabric member may be connected to a frame provided in the vehicle seat S using the attachment member 150.

In the present embodiment, although the stay cloth 32 which is a guide member that guides the deployment direction of an airbag is described as an example of the fabric member, the fabric member is not limited to this.

Figure 14:
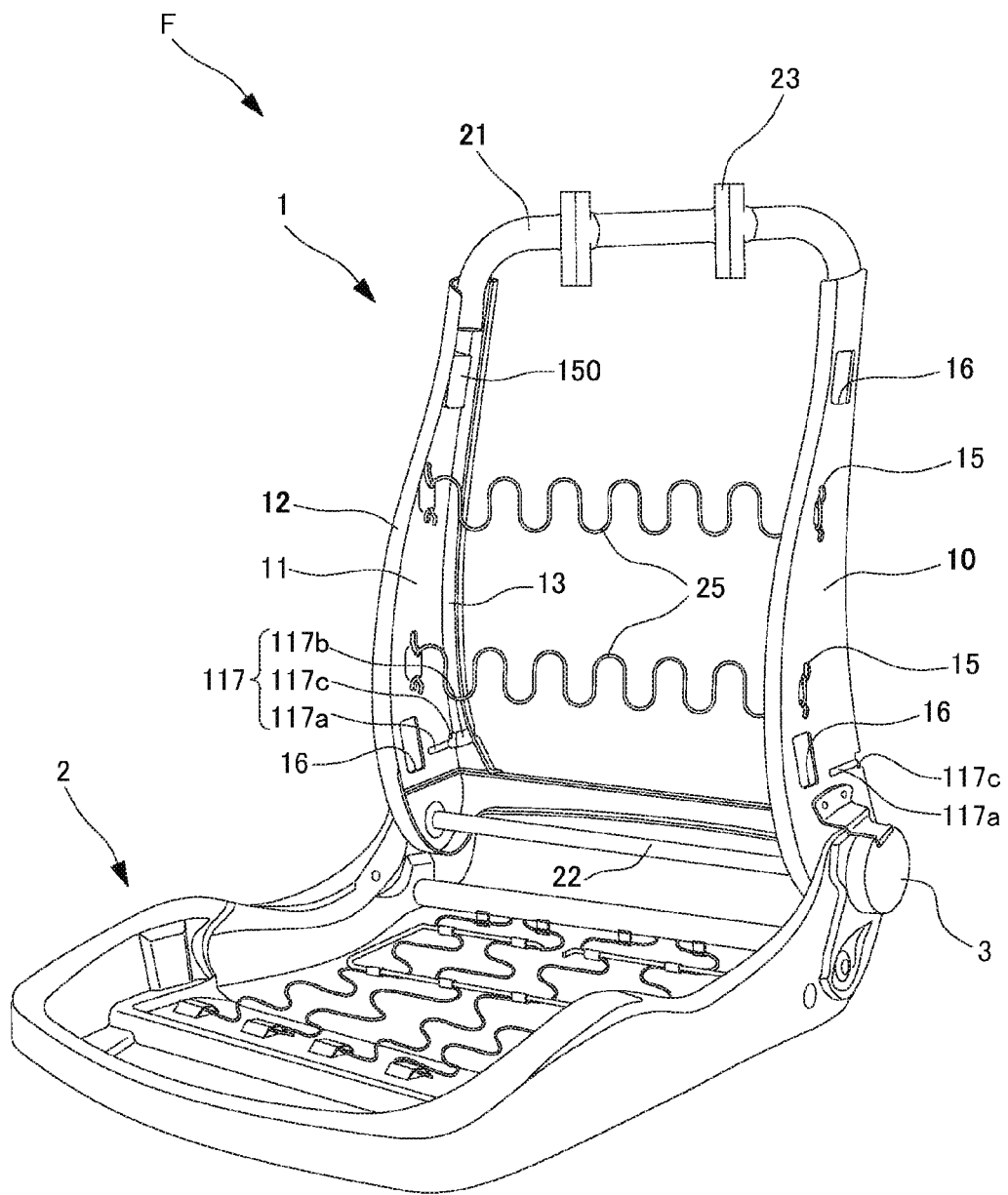
FIG. 14 is a perspective view of a seat frame of a vehicle seat according to an embodiment of the present invention.

In the vehicle seat S, a fragile portion 117 is formed at the same height as the attachment hole 16 of the side frame 10 and at a position located closer to the rear side of the seat than the attachment hole 16 as illustrated in FIG. 14.

The fragile portions 117 are formed in both right and left side frames 10 in a bilaterally symmetrical manner.

The fragile portion 117 includes a bead 117a formed in the side plate 11, a curved portion 117b that is formed in the rear edge 13 to protrude at the same height as the bead 117a, and a hole 117c formed between a rear end of the bead 117a and an end of the curved portion 117b on the outer side of the seat.

The center of the bead 117a in the up and down direction of the seat is curved to protrude outward from the lateral side of the seat. The bead 117a extends approximately horizontally from a position close to the center of the side plate 11 toward a position near the rear end of the side plate 11.

The curved portion 117b is formed so that a portion of the rear edge 13 having approximately the same height as the bead 117a is curved so that the center of the portion in the up and down direction of the seat protrudes toward the front side of the seat. Moreover, the curved portion 117b is formed to extend from an outer end of the rear edge 13 in the seat width direction to reach the inner end in the seat width direction so that the inner end side in the seat width direction is positioned slightly above the outer end. The width of the curved portion 117b in the up and down direction of the seat and the height of the side frame 10 in the thickness direction are larger than the bead 117a.

The hole 117c is formed in a corner portion between the bead 117a and the curved portion 117b on the rear outer side of the side frame 10 at which the side plate 11 crosses the rear edge 13.

Since the fragile portion 117 is formed in such a manner, in the event of a rear end collision, the side plate 11 is first guided to the bead 117a and the hole 117b that protrude toward the outer lateral side of the seat and starts to be open outward along the bead 117a. Subsequently, with the outward opening of the side plate 11 as a trigger, the rear edge 13 buckles along the curved portion 117b so that a portion of the curved portion 117b disposed above the rear edge 13 faces the rear side.

Since the side frame 10 includes such a fragile portion 117, it is possible to suppress the complex deformation of the side frame 10 due to the occurrence of complex input load such as bending, compression, and stretching in the event of a rear end collision or the like and to realize a stable deformation mode.

Moreover, as illustrated in FIG. 14, the attachment hole 16 is formed in a portion of the side plate 11 at the same height as the fragile portion 117 disposed closer to the front side of the seat than the fragile portion 117.

With this configuration, since the attachment hole 16 is formed along the deformation direction of the bead 117a that is deformed first in the event of a rear end collision, the attachment hole does not interfere with the deformation of the bead 117a but the attachment hole works in association with the buckling. Thus, the performance of mitigating the impact of a rear end collision is improved.

Moreover, since the attachment hole 16 is formed at a position on the rear side of the fragile portion 117 serving as the starting point of the buckling, at which the amount of deformation during the buckling is small, the attachment hole 16 is rarely influenced by the stress during the buckling. As a result, since the stress during the rear end collision concentrates on the fragile portion 117, it is possible to suppress the load of the rear end collision from having influence on the portion of the attachment member 150 attached to the attachment hole 16 in the event of the rear end collision.

Figure 15:
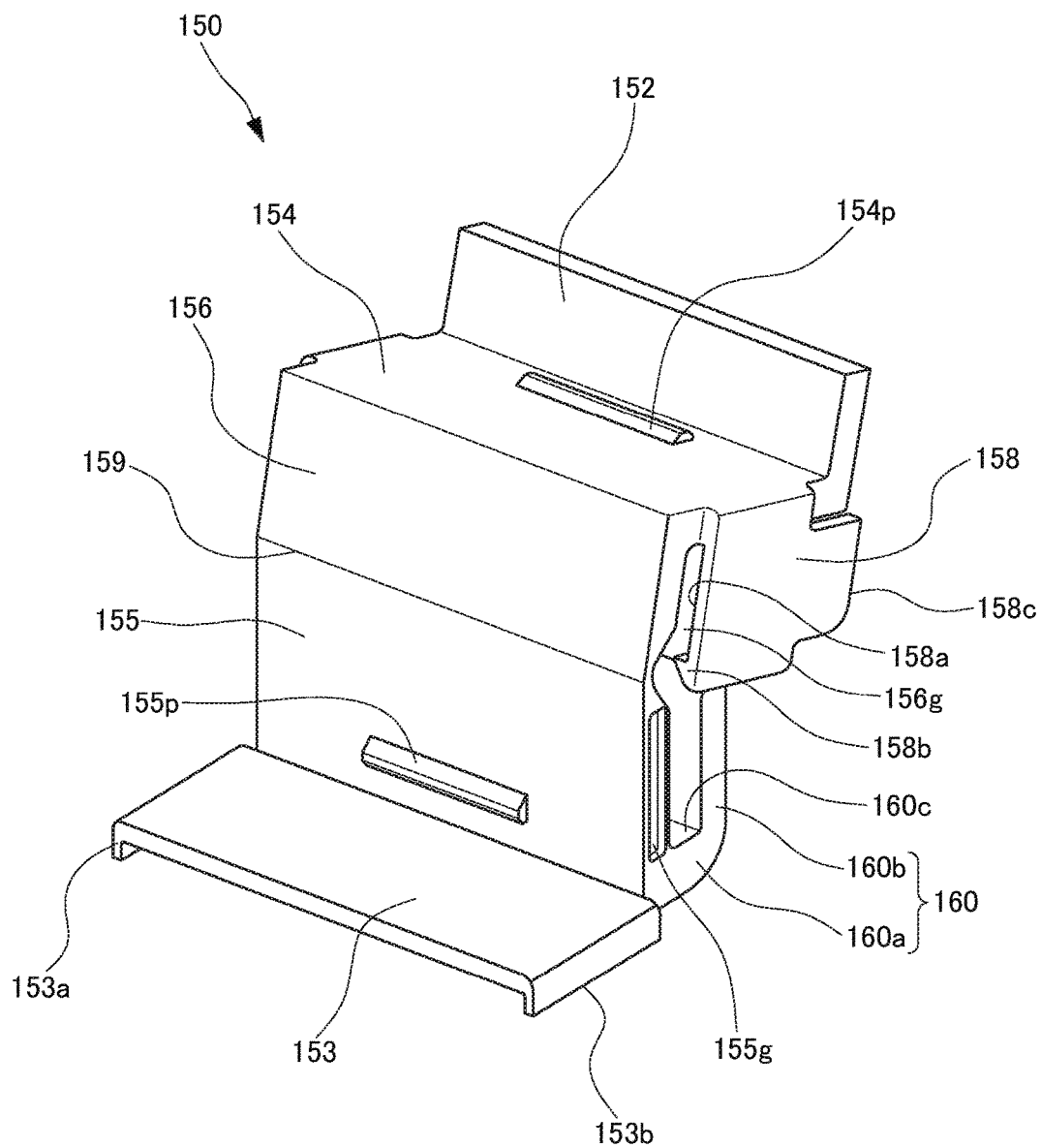
FIG. 15 is a perspective view illustrating a deployed state of an attachment member according to an embodiment of the present invention.
Figure 16:
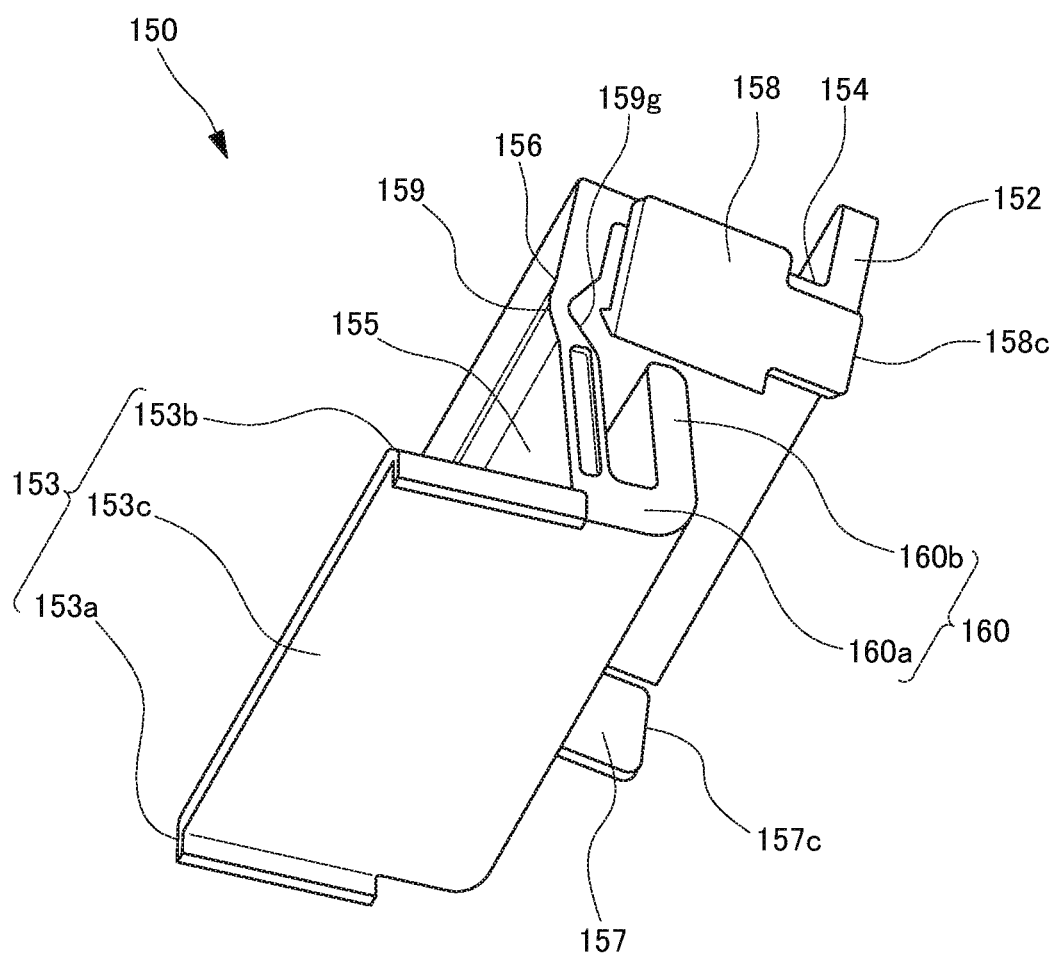
FIG. 16 is a perspective view illustrating a deployed state of the attachment member according to an embodiment of the present invention and is a view seen from another angle.

The attachment member 150 is integrally molded with a rigid resin and is molded in its deployed state as illustrated in FIGS. 15 and 16. The attachment member 150 is bent to a bent state when being attached to the side frame 10 as illustrated in FIG. 17.

Figure 17:
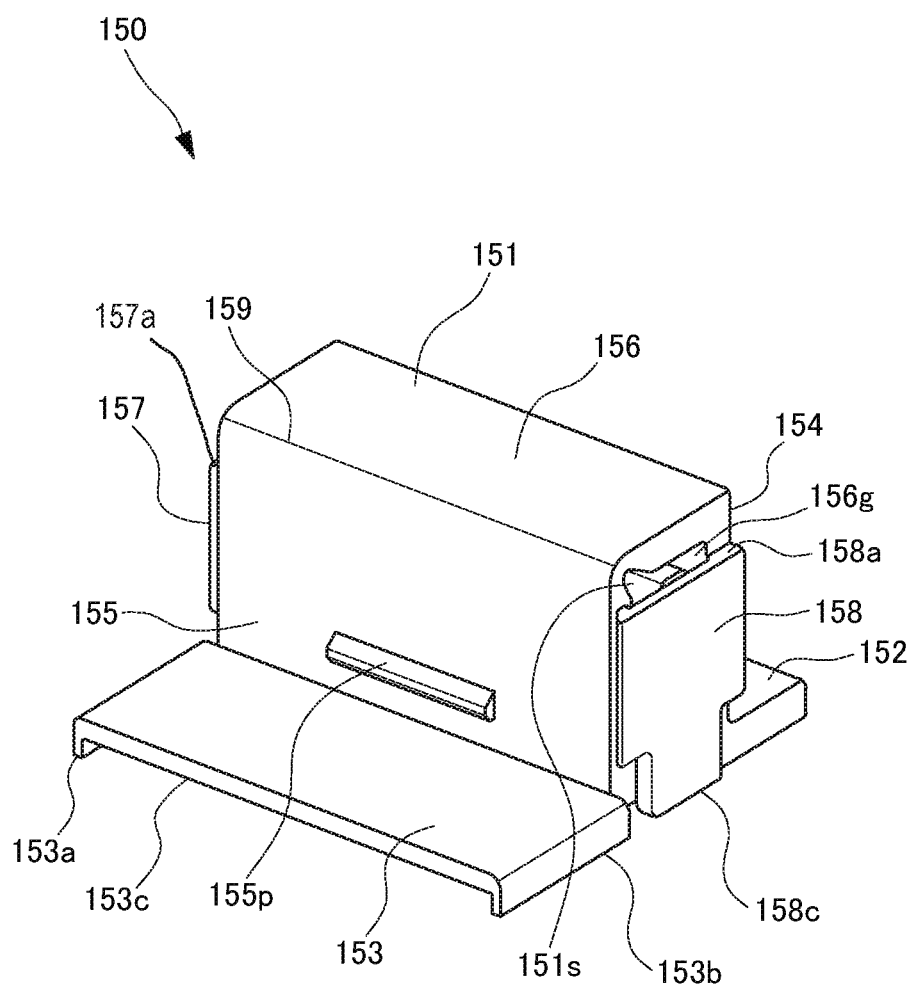
FIG. 17 is a perspective view illustrating a bent state of the attachment member according to an embodiment of the present invention.

In the bent state of FIG. 17, the attachment member 150 includes a holding portion 151 formed of an approximately hollow rectangular prism and approximately planar flange portions 152 and 153 that are continuous from two sides of one surface of the holding portion 151 respectively and protrude toward the outer side.

The holding portion 151 is formed of an approximately hollow rectangular prism in which, in the bent state of the attachment member during assembling of the stay cloth 32, the end of the stay cloth 32 to which the trim plate 37 is fixed is held in a bent state. The holding portion 151 includes a stationary wall 154 with which the large-width surface on the end side of the stay cloth 32 makes contact, a movable wall 155 as a hinge wall parallel to the stationary wall 154 during assembling, a top wall 156 that connects one set of ends of the stationary wall 154 and the movable wall 155, and lid portions 157 and 158 that block both ends of a groove-shaped space 151s surrounded by the stationary wall 154, the top wall 156, and the movable wall 155 during assembling as its main components.

The stationary wall 154 is formed of an approximately rectangular planar member, one of the longer sides thereof is continuous to the rectangular planar flange portion 152 that stands vertically in an L-shape from the stationary wall 154, and the other longer side is continuous to the rectangular planar top wall 156 that stands vertically in an L-shape from the stationary wall 154 on the opposite side of the flange portion 152.

Figure 18:
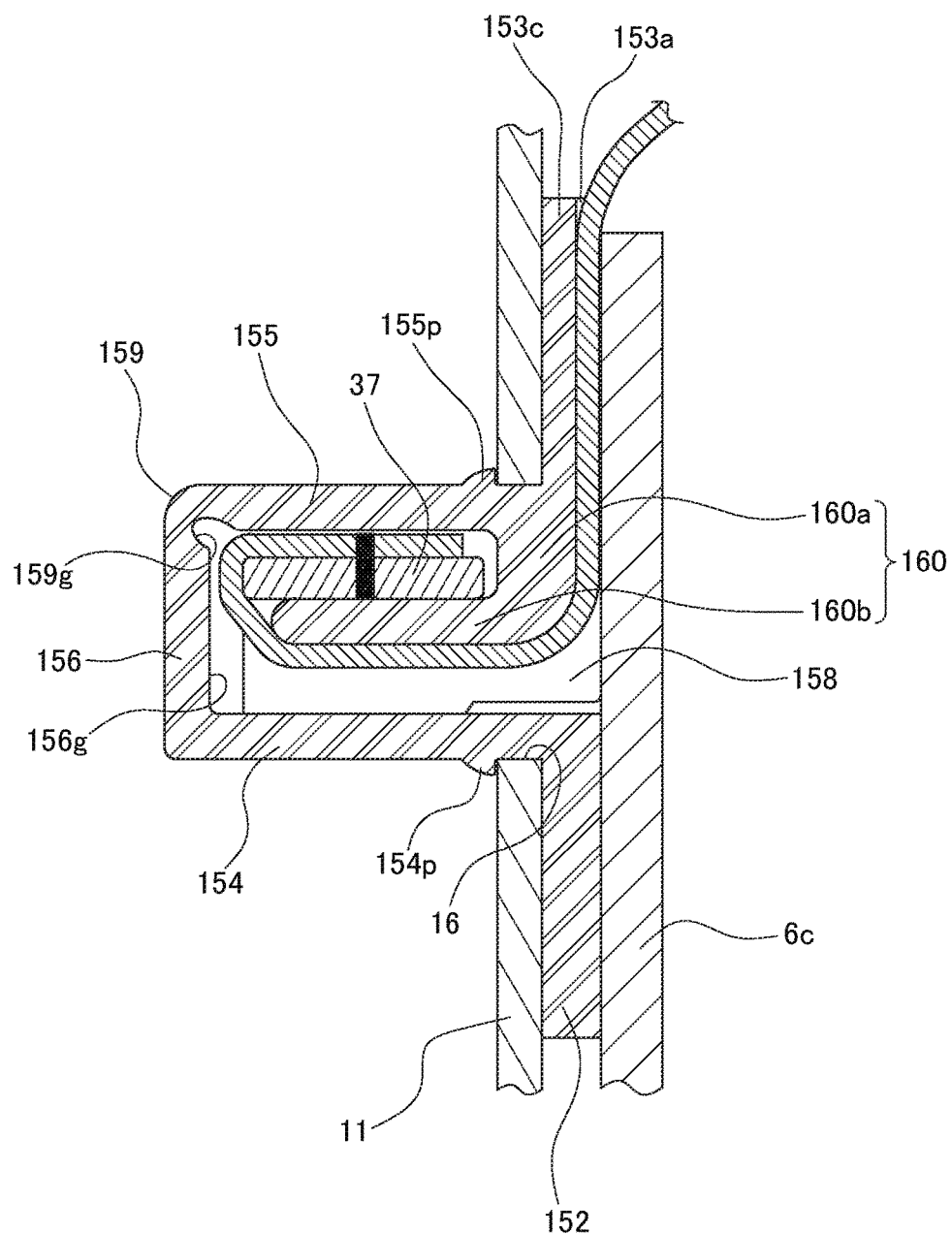
FIG. 18 is an explanatory cross-sectional view illustrating a state in which a stay cloth is connected to a side frame using an attachment member according to an embodiment of the present invention.

As illustrated in FIG. 18, a claw 154p that interposes the side plate 11 in cooperation with the flange portion 152 is formed at a position on the outer surface of the stationary wall 154 on the opposite side of the space 151s, separated by the thickness of the side plate 11 from the end of the outer surface of the stationary wall 154 continuous to the flange portion 152. The claw 154p is formed at the center in the width direction of the stationary wall 154 to be separated from both ends in the width direction of the stationary wall 154.

The side of the top wall 156 on the opposite side of the stationary wall 154 is continuous to the movable wall 155 with a thin hinge portion 159 interposed.

The hinge portion 159 has a small thickness because a smooth recess 159g is formed on the inner surface close to the space 151s side. The top wall 156 and the movable wall 155 have approximately the same thickness and the hinge portion 159 is thin. Thus, in the deployed state illustrated in FIGS. 15 and 16 during molding, the portion extending from the top wall 156 to the movable wall 155 via the hinge portion 159 form an approximately flat surface. However, in the bent state illustrated in FIG. 17 during assembling, the top wall 156 and the movable wall 155 are bent at the hinge portion 159 disposed therebetween to form an L-shape in a cross-section in which both are approximately vertical to each other.

The movable wall 155 is formed of an approximately rectangular planar member, one of the longer sides (the fixed end of the movable wall 155) thereof is continuous to the hinge portion 159, and the other longer side (the free end of the movable wall 155) is continuous to the rectangular planar flange portion 153 that stands vertically in an L-shape from the movable wall 155.

The movable wall 155 has a recessed groove 155g formed an end-side surface of two sides other than the sides continuous to the top wall 156 and the flange portion 153 among the four sides.

As illustrated in FIG. 18, a claw 155p that interposes the side plate 11 in cooperation with the flange portion 153 is formed at a position on the outer surface of the movable wall 155 on the opposite side of the space 151s, separated by the thickness of the side plate 11 from the end of the outer surface of the movable wall 155 continuous to the flange portion 153. The claw 155p is formed at the center in the width direction of the movable wall 155 to be separated from both ends in the width direction of the movable wall 155.

A partition wall 160 that divides the space 151s is formed to be integrated with an end of the inner surface of the movable wall 155 close to the space 151s side on the opposite side of the hinge portion 159.

As illustrated in FIG. 18, the partition wall 160 includes a connecting portion 160a that stands vertically from the inner surface of the movable wall 155 and a partition wall portion 160b in which a portion of the connecting portion 160a on the opposite side of the movable wall 155 is curved toward the top wall 156 to be parallel to the movable wall 155.

Among the four sides of the stationary wall 154, two sides where the top wall 156 and the flange portion 152 are not formed are continuous to the planar lid portions 157 and 158 that stand toward the same side as the top wall 156 vertically to the stationary wall 154 and the top wall 156.

The lid portions 157 and 158 have one side continuous to the stationary wall 154, and the top sides 157a and 158a located closer to the top wall 156 among the sides that neighbor the side continuous to the stationary wall 154 are disposed at a position separated by a predetermined distance from the top wall 156 to be parallel to the top wall 156. Thus, a slit-shaped monitoring window 156g is formed between the top wall 156 and the top sides 157a and 158a so that the inside of the space 151s can be observed from the outside of the attachment member 150 through the monitoring window 156g.

As illustrated in FIG. 15, projections 157b and 158b that extend in a direction parallel to the stationary wall 154 vertically to the top wall 156 are formed on an inner surface of the end of the sides of the lid portions 157 and 158 facing the side continuous to the stationary wall 154. The projections 157b and 158b are locked at the pair of recessed grooves 155g formed in the movable wall 155 in the bent state, whereby the movable wall 155 can be aligned with respect to the stationary wall 154.

Figure 19:
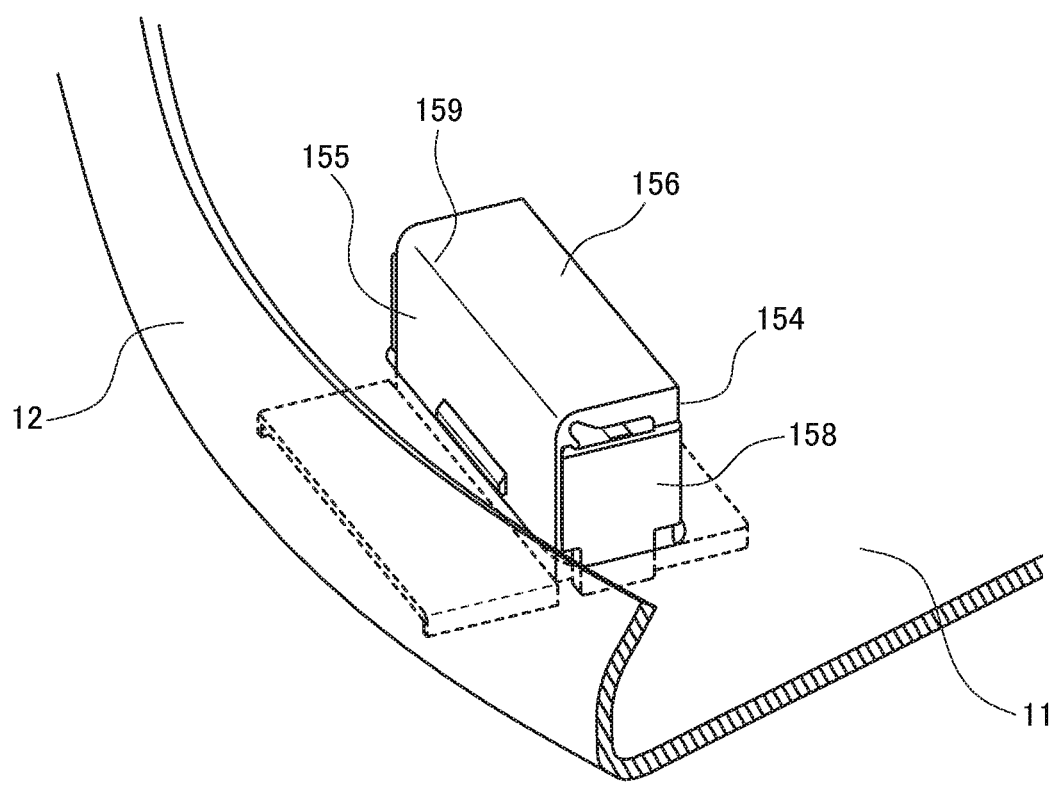
FIG. 19 is an explanatory perspective view illustrating a state in which an attachment member according to an embodiment of the present invention is connected to a side frame.

Moreover, when the attachment member 150 is assembled with the side plate 11 as illustrated in FIGS. 18 and 19, the projections 157b and 158b are fitted further deeply into the recessed grooves 155g and the locking state is further strengthened.

As illustrated in FIGS. 15 to 17, the ends of bottom sides 157c and 158c of the lid portions 157 and 158 facing the top sides 157a and 158a disposed close to the stationary wall 154 side and on the opposite side of the stationary wall 154 are notched in a rectangular shape and are bent at the hinge portion 159. Thus, the workability when deforming the attachment member 150 in the bent state is improved.

In the present embodiment, during assembling of the attachment member 150, the stationary wall 154 and the movable wall 155 extend approximately in the up and down direction and the lid portions extend approximately in the horizontal direction. Thus, the stationary wall 154 and the movable wall 155 restrict the position approximately in the horizontal direction or the right and left direction close to the end of the stay cloth 32 and the lid portions 157 and 158 restricts the position in the up and down direction close to the end of the stay cloth 32.

The flange portions 152 and 153 as a hooking portion are formed of an approximately rectangular planar member and stand vertically from the short sides of the stationary wall 154 and the movable wall 155, respectively, on the opposite side of the top wall 156. The flange portion 153 on the side (that is, the side close to the movable wall 155) in which the stay cloth 32 having the end held in the space 151s is pulled out has guide walls 153a and 153b that stand on the ends of two sides adjacent to the side continuous to the movable wall 155 along the extending directions of these two sides and that are formed over the entire length in the extension direction of the flange portion 153.

The height of the guide walls 153a and 153b is the same as the thickness of the flange portion 152, and the thickness of the flange body 153c in the region sandwiched by the guide walls 153a and 153b is smaller than the height of the guide walls 153a and 153b by at least the thickness of one stay cloth.

As illustrated in FIGS. 15 and 16, the flange portion 152, the stationary wall 154, the top wall 156, the movable wall 155, and the flange body 153c of the attachment member 150 have the same width, and the lid portions 157 and 158 and the guide walls 153a and 153b protrude in the width direction.

Moreover, the flange portion 152 and the flange body 153c have a smaller thickness than the other portions.

The attachment member 150 is fixed so that the angle between the flange portion 152 and the stationary wall 154, the angle between the stationary wall 154 and the top wall 156, and the angle between the movable wall 155 and the flange portion are the right angles, respectively. Moreover, the angle between the top wall 156 and the movable wall 155 is variable between approximately the horizontal angle and approximately the right angle due to the hinge portion 159. Thus, the attachment member 150 can be switched between the deployed state of FIGS. 15 and 16 and the bent state of FIG. 17.

The procedure of attaching the end of the stay cloth 32 to the side frame 10 using the attachment member 150 will be described.

First, the end of the attachment portion 36 of the stay cloth 32 to which the trim plate 37 is sewn is locked at the attachment member 150.

The attachment of the stay cloth 32 to the attachment member 150 is performed in the following procedure. In the deployed state illustrated in FIGS. 15 and 16, a lateral end 160c of a groove between the movable wall 155 and the partition wall 160 is exposed from the lid portions 157 and 158. The trim plate 37 to which the stay cloth 32 is sewn is inserted into the exposed groove between the partition wall 160 and the movable wall 155 of the attachment member 150 through the lateral end 160c, and the trim plate 37 is slid so that the entire trim plate 37 is pushed into the groove between the movable wall 155 and the partition wall 160.

Subsequently, a portion of the stay cloth 32 disposed adjacent to the trim plate 37 is pulled into a region between the partition wall portion 160b and the stationary wall 154 while passing through the end of the partition wall portion 160b from the groove between the movable wall 155 and the partition wall 160.

Subsequently, the movable wall 155 and the top wall 156 are bent at the hinge portion 159 so that the angle between the walls becomes approximately the right angle and the projections 157b and 158b are locked at the pair of recessed grooves 155g. In this case, the attachment member 150 is in the bent state illustrated in FIG. 17.

Subsequently, the attachment member 150 is inserted into the attachment hole 16 from the side of the side frame 10 on the outer side of the seat, and as illustrated in FIGS. 18 and 19, the attachment member 150 is pushed until the front and rear edges of the attachment hole 16 of the side plate 11 are interposed between the flange portion 153 and the claw 155p and between the flange portion 153 and the claw 154p, respectively.

In this case, as illustrated in FIG. 19, the lid portions 157 and 158 receive the pressing force from the edges of the attachment hole 16 so that the engagement between the projections 157b and 158b and the recessed grooves 155g is strengthened further. Moreover, the outer surface of the movable wall 155 receives the pressing force from the edges of the attachment hole 16 and the inner surface thereof receives the pressing force from the trim plate 37 and the stay cloth 32 so that the engagement between the recessed grooves 155g and the projections 157b and 158b is strengthened further. As a result, the attachment member 150 is stably maintained in the bent state.

The airbag module 6 is assembled from the outer side of the seat. In this case, the airbag module 6 is fixed by the bolt 18 in a state in which the retainer 6c presses at least a portion of the flange portion 152.

After that, the cushion pads 5a are disposed on the outer side of the airbag module 6 and the cushion pads 5a are covered by the trim cover 4 to form the seat.

In the present embodiment, the position in the thickness direction of the end of the stay cloth 32 is restricted by the stationary wall 154 and the movable wall 155, and the position in the width direction of the end of the stay cloth 32 is restricted by the lid portions 157 and 158. Conversely, the position in the thickness direction of the end of the stay cloth 32 may be restricted by the lid portions and the position in the width direction of the end of the stay cloth 32 may be restricted by the stationary wall and the movable wall.

The other configuration of the present embodiment is the same as that of the first embodiment, and description thereof will not be repeated.

Third Embodiment

A vehicle seat S as an airbag module-equipped seat according to still another embodiment of the present invention will be described with reference to FIGS. 1, 2, 5, 8, and 20 to 25.

In the vehicle seat S, the cushion pad 5 is formed of a urethane foam which is a well-known vehicle seat material. The cushion pad 5 is formed by integrally molding a resin foam to form the shape of a seat surface that includes the portions other than the rear side of the lateral surface and the back surface of the seat back frame 1, that is, the front section S1*a* with which the back of an occupant makes contact, the front part of the lateral section S1*b* in which the sides of the occupant is positioned, and the upper section S1*c* and the lower section S1*d* of the seat back S1.

Figure 20:
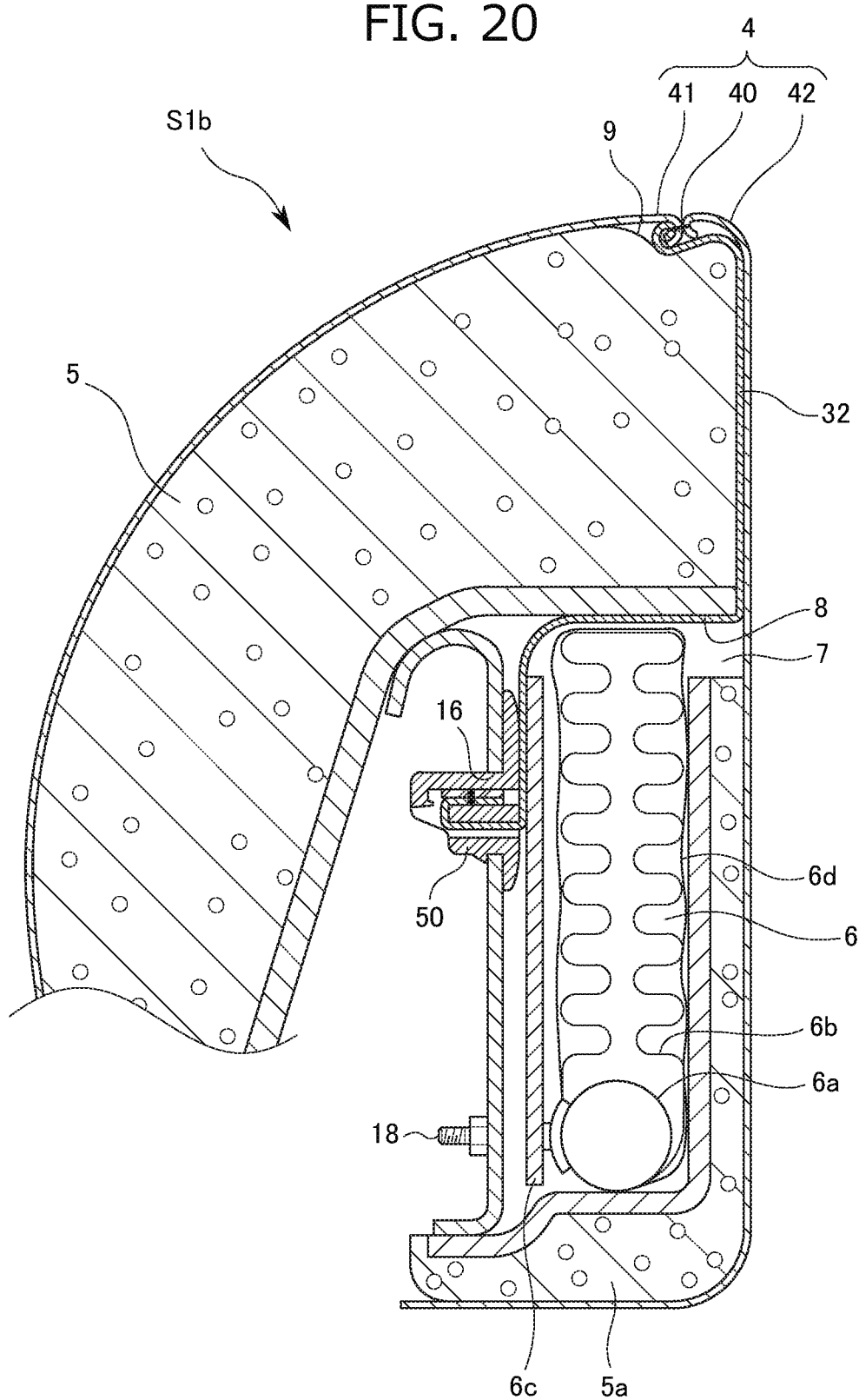
FIG. 20 is a cross-sectional view along line A-A in FIG. 1.

As illustrated in FIG. 20, an opening 8 for storing the airbag module 6 is formed in the lateral section S1*b* of the cushion pad 5, and the opening 8 forms a space 7.

As illustrated in FIGS. 20 and 5, the cushion pad 5 has a groove 9 that is formed at a position slightly closer to the inner side than the seat-side end of the lateral section S1*b* of the seat back S1.

The groove 9 is formed at a position following the extension direction of a sewn portion 44 when the groove 9 is covered with the trim cover 4 to be continuous in the up and down direction of the seat at a position located slightly closer to the inner side of the seat than the seat-side end of the lateral section S1*b*. Among the portions of the groove 9 facing the sewn portion 44, only the portion that faces the portion in which the stay cloth 32 is sewn is deep.

Although FIG. 20 illustrates a state in which the airbag module 6 is disposed in the space 7, a cushion material (not illustrated) formed in the shape of the space 7 is fitted into one of the pair of lateral sections S1*b* in which the airbag module 6 is not disposed.

The cushion pad 5 has such a shape that is bilaterally symmetrical about a vertical section that includes the groove 9 and passes through the center in the seat width direction. With this configuration, the same cushion pad 5 can be used for both vehicles having the steering wheel on the right and left sides.

Figure 21:
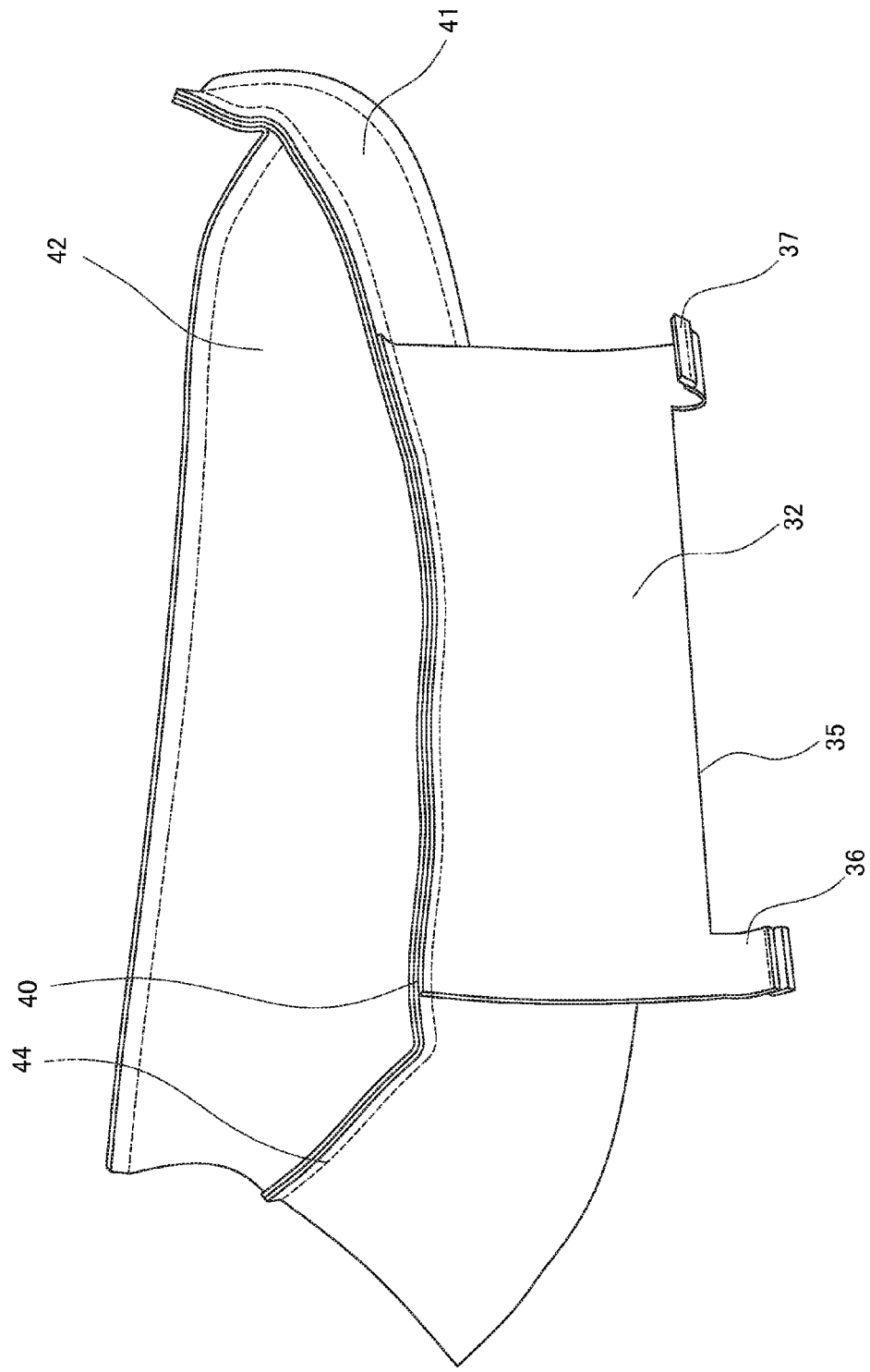
FIG. 21 is an explanatory perspective view diagram illustrating a state in which a trim cover according to an embodiment of the present invention and a stay cloth are sewn together in a breaking portion.

The trim cover 4 is formed from an existing material and is formed as an integrated fabric member by stacking three layers including a skin layer (not illustrated), a foam material layer formed from a polyurethane foam or the like, and a film as a barrier layer and bonding the layers each other. As illustrated in FIGS. 20 and 21, the trim cover 4 is sewn in a bag form by sewing a front wedge portion 41 that covers the right and left bank surface from the center of the seat surface and a lateral wedge portion 42 that extends from a peripheral side surface to reach the back surface using the sewn portion 44 and sewing a rear wedge portion (not illustrated) to an end of the lateral wedge portion 42 on the opposite side of the front wedge portion 41.

The sewn portion 44 is formed at the protruding apexes of the bank portions of the front wedge portion 41 and the lateral wedge portion 42, and the breaking portion 40 is formed in a portion of the sewn portion 44 in the up and down direction of the seat.

As illustrated in FIG. 21, the stay cloth 32 is sewn together in the breaking portion 40.

The stay cloth 32 is formed from a cloth-shaped material having small elasticity. The stay cloth 32 is an inner-side stay cloth that is pulled into the side of the airbag module 6 on the inner side of the seat from the breaking portion 40 while passing through the front side of the airbag module 6. The stay cloth 32 performs the role of transmitting stress generated by inflation of the airbag to the breaking portion 40 and protecting the cushion pad 5 disposed on the sides of the airbag module 6 close to the front and inner sides of the seat.

In the present embodiment, the outer-side stay cloth is not provided but the inner-side stay cloth 32 only is provided. Thus, the size of the sewn portion formed by sewing in the breaking portion 40 decreases and the groove 9 can be made narrower and shallower. As a result, it is possible to suppress the shape of the groove 9 and the breaking portion 40 from having influence on the appearance of the trim cover 4.

FIG. 20 illustrates a cross-sectional view of a state in which the end of the stay cloth 32 is attached to the side plate 11 of the side frame 10 using the attachment member 50.

FIG. 21 illustrates a positional relation between the breaking portion 40 and the groove 9 of the cushion pad 5 in the assembled state of the seat back S1.

Figure 22:
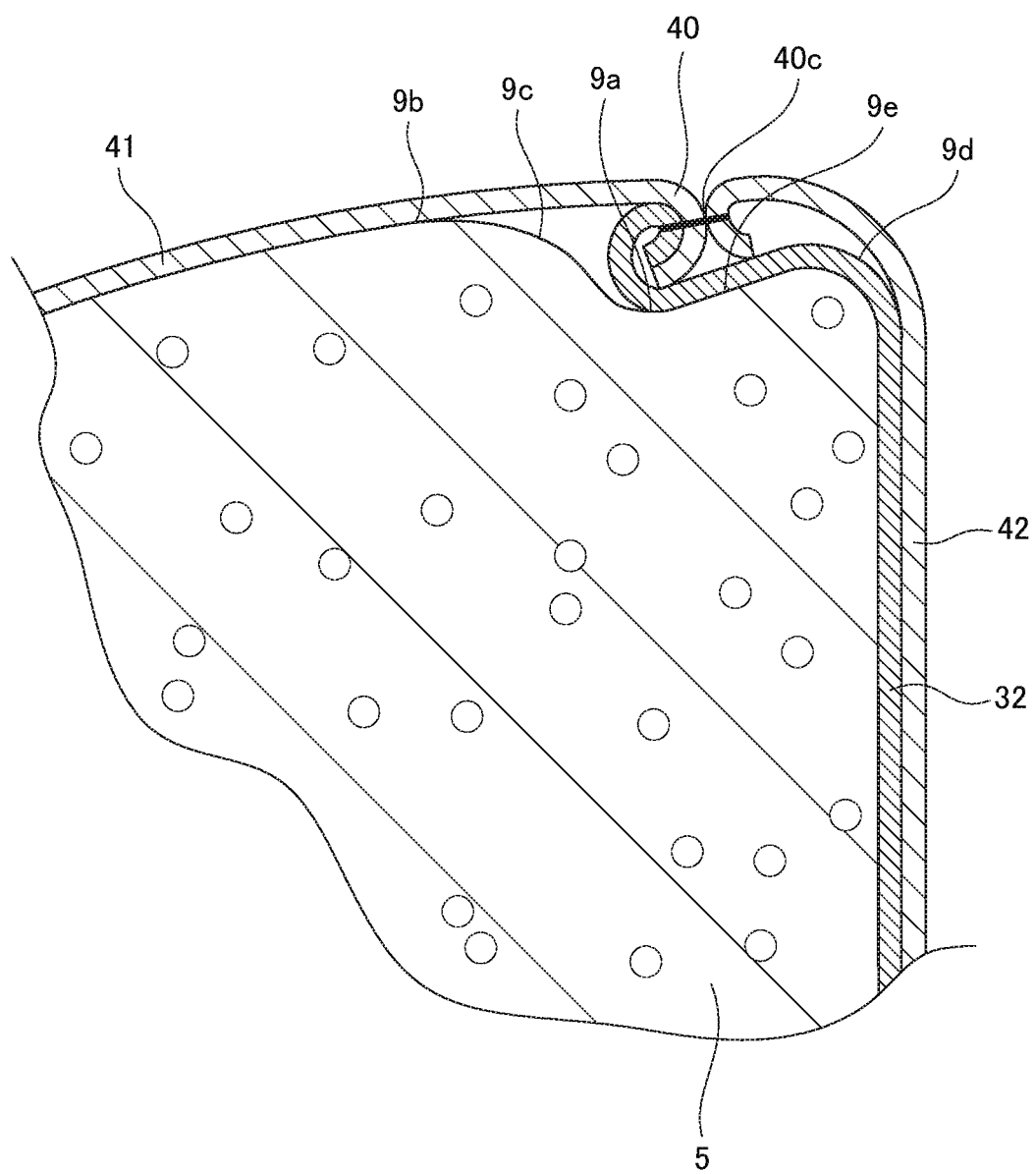
FIG. 22 is an explanatory cross-sectional view illustrating a positional relation between a groove and a breaking portion according to an embodiment of the present invention.

FIG. 22 illustrates a cross-section of a plan vertical to the extension direction of the groove 9. The groove 9 includes a bottom portion 9*a* that is the deepest in the direction vertical to the extension direction, an inclined surface 9*c* as an inclined surface that is formed more on the inner side in the seat width direction than the bottom portion 9*a* and is gently inclined continuously to connect the bottom portion 9*a* and an inner end 9*b* of the groove 9 in the seat width direction, and an inclined surface 9*e* as an inclined surface that is gently inclined continuously to connect the bottom portion 9*a* and an outer end 9*d* of the groove 9 in the seat width direction.

As illustrated in FIG. 22, the bottom portion 9*a* is a flat portion that extends vertically to the extension direction of the groove 9.

Since only a region of the groove 9 facing the portion to which the stay cloth 32 is sewn is deep, the bottom portion 9*a* is shallow in portions other than the region facing the portion to which the stay cloth 32 is sewn.

In the assembled state of the seat back S1, a portion in which the front wedge portion 41 and the lateral wedge portion 42 are sewn to make contact with each other is defined as the center 40*c* of the breaking portion 40. The center 40*c* is shifted closer to the outer side in the seat width direction, to which the stay cloth is not attached, than the position facing the bottom portion 9*a* which is the center of the groove 9 and faces the inclined surface 9*e*. Thus, the end of the stay cloth 32 and the end of the front wedge portion 41 to which the stay cloth 32 is sewn face the bottom portion 9*a*.

The groove 9 may be formed in such a curved shape that the groove 9 is convex toward the opposite side of the front surface of the cushion pad 5 rather than the shape in which the inclined surface 9*c* that the side to which the stay cloth 32 is attached faces is planar. Moreover, the groove 9 may be formed such that the inclined surface 9*c* that the side to which the stay cloth 32 is attached faces is longer than the other inclined surface 9*e*.

In the present embodiment, the groove 9 is formed in a position of the front surface of the cushion pad 5 facing the breaking portion 40. However, instead of forming the groove 9, the portion of the front surface of the cushion pad 5 to which the end of the front wedge portion 41 and the end of the stay cloth 32 face may have lower hardness than the portion that the end of the lateral wedge portion 42 faces. By doing so, the contact pressure that the cushion pad 5 receives from the end of the lateral wedge portion 42 of the breaking portion 40 becomes lower than the contact pressure that the cushion pad 5 receives from the end of the front wedge portion 41 and the end of the stay cloth 32. Specifically, a cushion pad having low hardness may be provided in the portion of the front surface of the cushion pad 5 that the end of the front wedge portion 41 and the end of the stay cloth 32 face.

Figure 23:
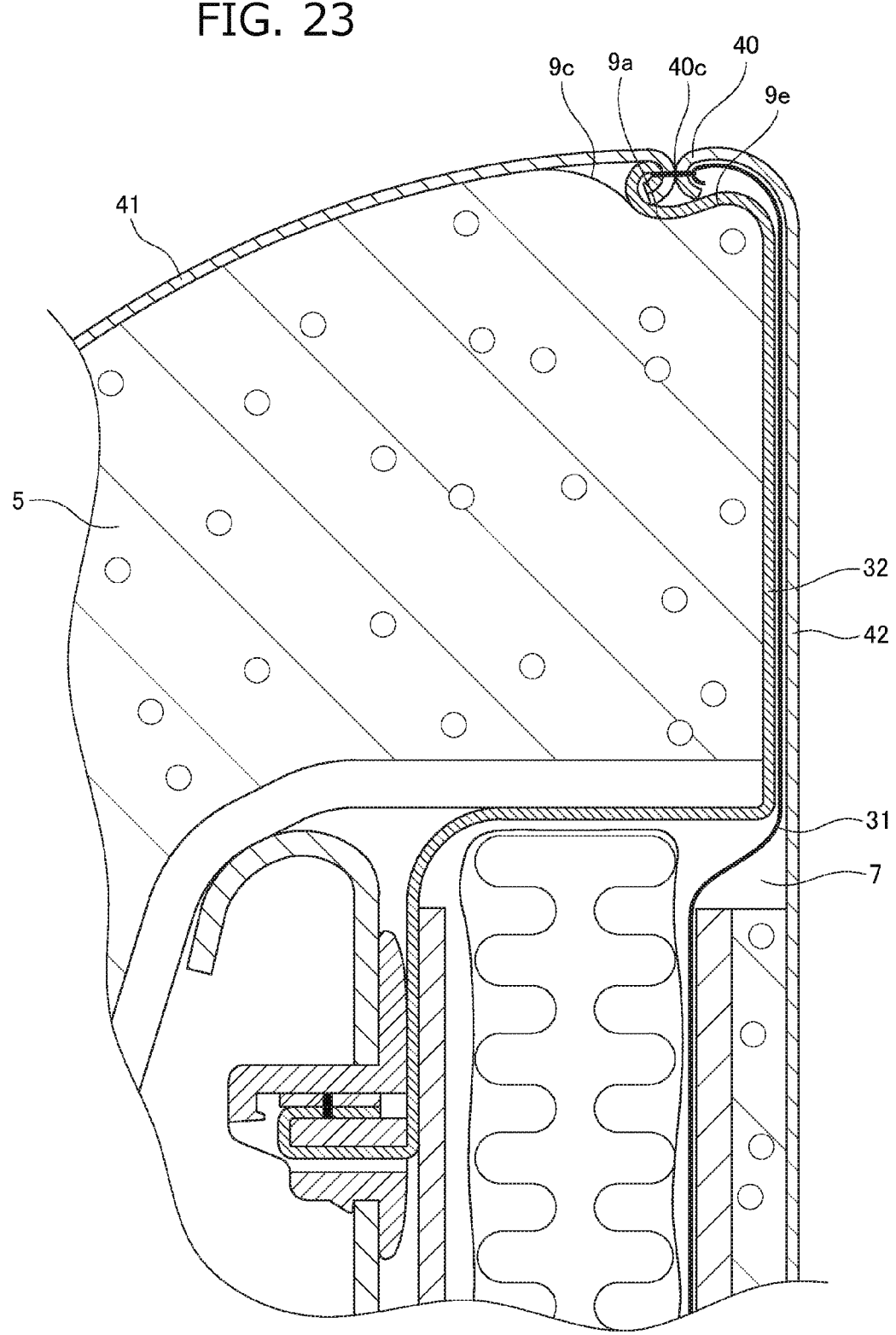
FIG. 23 is an explanatory cross-sectional view illustrating a positional relation between a groove and a breaking portion according to a modified example of the present invention.

In the present embodiment, the inner-side stay cloth 32 is provided on the front wedge portion 41 side only. However, as a modified example, as illustrated in FIG. 23, an outer-side stay cloth 31 thinner than the inner-side stay cloth 32 may be provided in addition to the inner-side stay cloth 32.

The outer-side stay cloth 31 of this example is sewn to a surface of the breaking portion 40 close to the end of the lateral wedge portion 42 on the opposite side of the front wedge portion 41. A J-hook (not illustrated) for locking the rear edge 13 of the side frame 10 is fixed to the end of the stay cloth 31 on the opposite side of the breaking portion 40.

The stay cloth 31 is pulled into the space 7 from the breaking portion 40 while passing between the cushion pad 5 and the lateral wedge portion 42 and passes between the airbag module 6 and the cushion pad 5a to be fixed by the J-hook (not illustrated) being locked at the rear edge 13 of the side frame 10.

In the assembled state of the seat back S1, the center 40c of the breaking portion 40 is shifted closer to the outer side in the seat width direction which is close to the lateral wedge portion 42 side in which the thinner stay cloth 31 is sewn than the position facing the bottom portion 9a which is the center of the groove 9 and faces the inclined surface 9e. Thus, the end of the thicker stay cloth 32 and the end of the front wedge portion 41 to which the stay cloth 32 is sewn face the bottom portion 9a.

Figure 24:
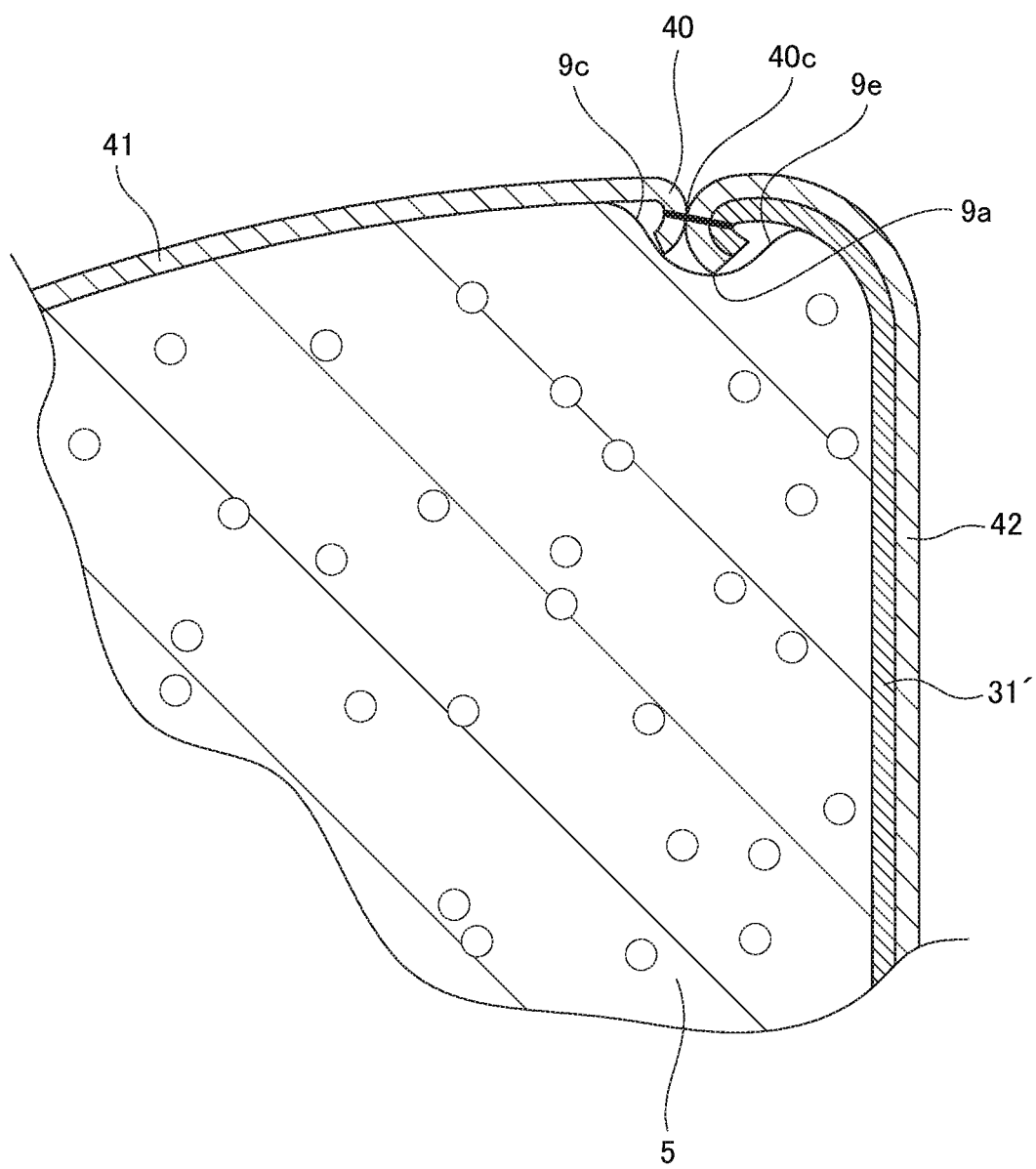
FIG. 24 is an explanatory cross-sectional view illustrating a positional relation between a groove and a breaking portion according to another modified example of the present invention.

As another modified example of an embodiment of the present invention, as illustrated in FIG. 24, the inner-side stay cloth may not be provided and an outer-side stay cloth 31' only may be provided.

The outer-side stay cloth 31' of this example has the same configuration as the stay cloth 31 of FIG. 23 except that the outer-side stay cloth 31' is thicker than the stay cloth 31 of FIG. 23.

In the assembled state of the seat back S1, the center 40c of the breaking portion 40 is shifted closer to the inner side in the seat width direction in which the stay cloth is not attached than the position facing the bottom portion 9a which is the center of the groove 9 and faces the inclined surface 9c. Thus, the end of the stay cloth 31' and the end of the lateral wedge portion 42 to which the stay cloth 31' is sewn face the bottom portion 9a.

Figure 25:
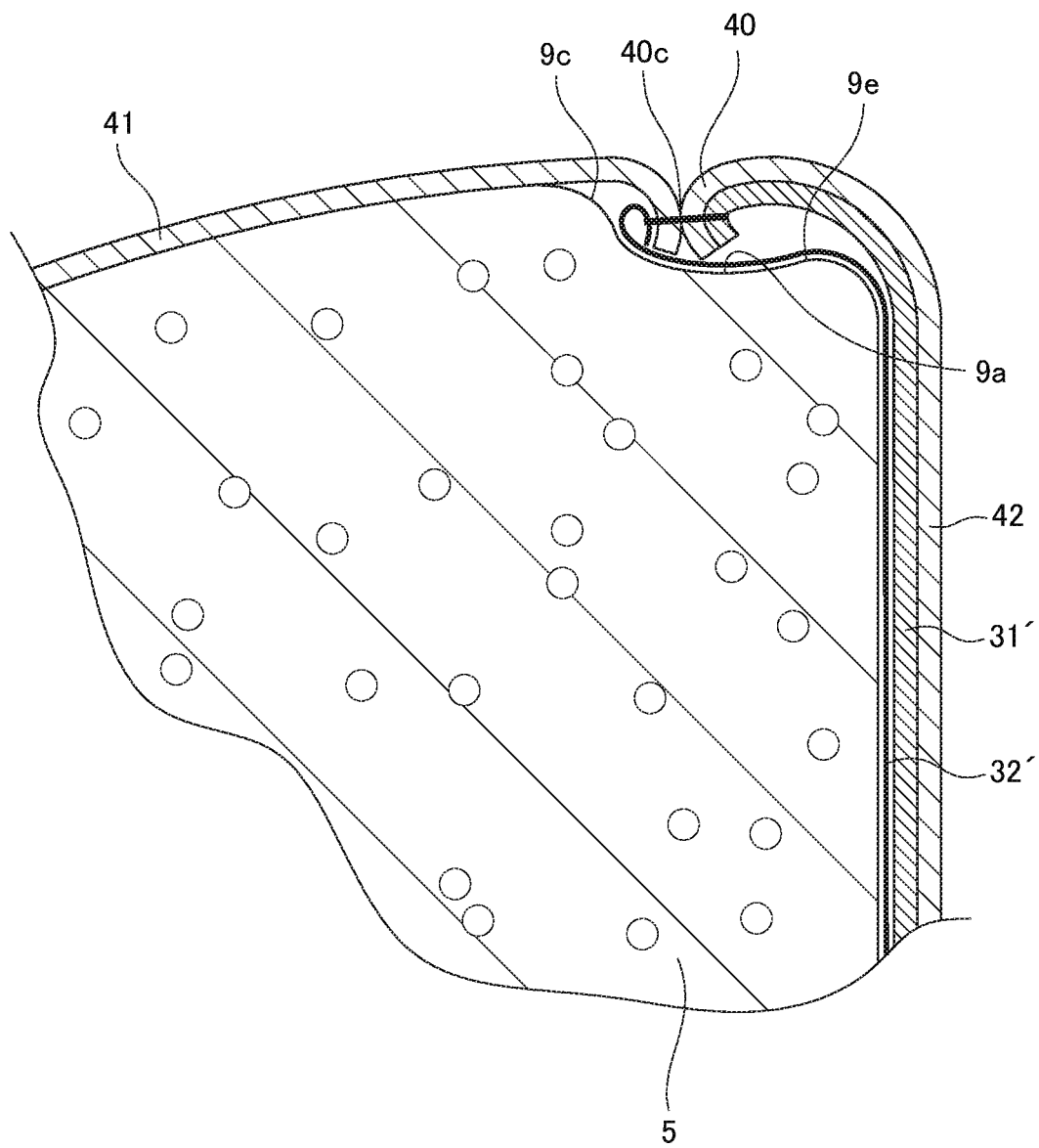
FIG. 25 is an explanatory cross-sectional view illustrating a positional relation between a groove and a breaking portion according to still another modified example of the present invention.

As still another modified example of an embodiment of the present invention, as illustrated in FIG. 25, the outer-side stay cloth 31' and an inner-side stay cloth 32' thinner than the outer-side stay cloth 31' may be provided.

The outer-side stay cloth 31' of this example has the same configuration as the stay cloth 31' of FIG. 24. Moreover, the inner-side stay cloth 32' of this example has the same configuration as the stay cloth 32 of FIG. 23 except that the inner-side stay cloth 32' is thinner than the stay cloth 32.

In the assembled state of the seat back S1, the center 40c of the breaking portion 40 is shifted closer to the inner side in the seat width direction which is close to the front wedge portion 41 in which the thinner stay cloth 32' is sewn than the position facing the bottom portion 9a which is the center of the groove 9 and faces the inclined surface 9c. Thus, the end of the thicker stay cloth 31' and the end of the lateral wedge portion 42 to which the stay cloth 31' is sewn face the bottom portion 9a.

The other configuration of the present embodiment is the same as that of the first and second embodiments, and description thereof will not be repeated.

Fourth Embodiment

A vehicle seat S as an airbag module-equipped seat according to still another embodiment of the present invention will be described with reference to FIGS. 1 to 10.

In the vehicle seat S as the airbag module-equipped seat according to the present embodiment, the attachment hole 16 of FIG. 2 is a vertically long approximately rectangular hole having two chamfered rear corner portions 16a and two chamfered front corner portions 16b each provided in the front to back direction of the seat. The attachment hole 16 is formed in a portion of the side plate 11 close to the front edge 12 along the inclination of the front edge 12. For example, the length of the longer side of the attachment hole 16 is 33 mm and the length of the shorter side is 11 mm.

The radius of curvature of the front corner portion 16b is larger than the radius of curvature of the rear corner portion 16a. For example, the ratio of the radius of curvature of the front corner portion 16b to that of the rear corner portion 16a is between 2:1 and 3:1. More specifically, the radius of curvature of the front corner portion 16b is 2.5 mm and the radius of curvature of the rear corner portion 16a is 1 mm. Further, the attachment member 50 of FIGS. 3 and 5 to 8 which is fitted into the attachment hole 16 has a chamfered rear corner portion 50a and a chamfered front corner portion 50b having the shapes corresponding to the rear corner portion 16a and the front corner portion 16b, respectively. For example, the ratio of the radius of curvature of the front corner portion 50b to that of the rear corner portion 50a is between 2:1 and 3:1 and corresponds to the ratio of the rear corner portion 16a to the front corner portion 16b. More specifically, the radius of curvature of the front corner portion 50b is 2.5 mm and the radius of curvature of the rear corner portion 50a is 1 mm.

Since the attachment hole 16 and the attachment member 50 are formed in this manner, when the attachment member 50 described later is fitted into the attachment hole 16, the direction of the attachment member 50 is restricted and an assembly error is prevented in advance. That is, the front corner portion 16b and the rear corner portion 16a function as a misassembly suppressing portion 80 that suppresses an error in assembly of the attachment member 50 described later to the attachment hole 16.

Moreover, it has been described that the radius of curvature of the front corner portion 16b is larger than that of the rear corner portion 16a. However, the radius of curvature of any one of the corner portions of the inner surface of the attachment hole 16 may be different from that of the other corner portions so that the attachment member 50 having a portion having the shape corresponding to the attachment hole 16 and facing the inner surface can be assembled with the attachment hole 16. In this case, the same effect can be obtained.

For example, the corner portion having a different radius of curvature, of the inner surface of the attachment hole 16 may only need to restrict the attachment direction of the attachment member 50 and may be formed at respective positions in the up and down direction or the oblique direction of the seat without being limited to the front to back direction of the seat.

The front wall 53 extends from the flange portion 52 described later by standing approximately at the right angle (an inclination of approximately 85° to approximately 90°). Moreover, the front wall 53 may extend in steps so that the thickness decreases by approximately 0.5 mm whenever it advances approximately 5 mm from the flange portion 52 toward the rear wall 55 rather than standing and extending in a planar manner from the flange portion 52.

According to the holding portion 51 having the front wall 53 including a plurality of steps, when the holding portion 51 is inserted into the attachment hole 16, the side having a smaller outer shape and a smaller thickness is first inserted into the attachment hole 16. Thus, the holding portion 51 can be easily inserted than the holding portion 51 that is formed vertically from the flange portion 52.

On the other hand, in a state in which the attachment member 50 is attached to the attachment hole 16, since the front wall 53 makes contact with the inner surface of the attachment hole 16 approximately vertically, the rotation of the attachment member 50 is suppressed as compared to when the attachment member 50 is formed to be inclined toward the rear wall 55. Thus, it is possible to suppress the attachment member 50 from being removed from the attachment hole 16.

An operator broadens the stay cloth 32 in the holding space 59 through the slits 55s and 52s in a state of bending the stay cloth 32 to create a state in which the stay cloth 32 is inserted into the attachment member 50. Moreover, the corner portion 55a of the rear wall 55 adjacent to a portion in which the slit 55s and the holding space 59 cross each other is formed in a chamfered form so that the stay cloth 32 is not damaged by rubbing against the corner portion 55a when the stay cloth 32 is received in the holding space 59 through the slit 55s.

Moreover, since the rear portions of the rear wall 55 and the flange portion 52 are divided by the slits 55s and 52s, the bending of the end of the rear wall 55 close to the slit 55s toward the front wall 53 is allowed, which will be described in detail later.

When the attachment member 50 is in a natural state in which no force is applied when the attachment member 50 is attached to the attachment hole 16, since the projection 60 is in contact with the inner surface of the attachment hole 16, the insertion of the attachment member 50 is obstructed. As described above, since the rear wall 55 is divided by the slit 55s and the projection 60 is formed in an approximately triangular prism shape, when the attachment member 50 is pushed toward the attachment hole 16, the projection 60 makes contact with the inner surface of the attachment hole 16 and a force directed toward the front wall 53 is applied to the rear wall 55 so that the rear wall 55 is bent. When the rear wall 55 is bent, the periphery of the attachment member 50 has the same size as or the smaller size than the size of the inner surface of the attachment hole 16. Thus, the attachment member 50 can be attached to the attachment hole 16.

A thick portion of the holding portion 51 disposed between the projection 60 and the flange portion 52 close to the flange portion 52 corresponds to a portion that faces an inner surface of an attachment hole described in the embodiments.

As illustrated in FIG. 6, the rear corner portion 50a is formed in a portion in which the rear wall 55 and the horizontal wall 54 cross each other and a portion in which the rear wall 55 and the horizontal wall 56 cross each other. The front corner portion 50b is formed in a portion in which the front wall 53 and the horizontal wall 54 cross each other and a portion in which the front wall 53 and the horizontal wall 56 cross each other. These rear corner portions 50a and front corner portions 50b are formed such that the front corner portion 50b has the larger radius of curvature than that of the rear corner portion 50a and form a misassembly suppressing portion 81 between the corner portions and the inner surface of the attachment hole 16.

Since the rear corner portion 50a and the front corner portion 50b are formed in this manner, the attachment of the attachment member 50 to the attachment hole 16 is maintained stably.

Specifically, a large bending moment is applied to the front corner portion 50b of the front wall 53 which is at a distance about a position in which the inner surface of the attachment hole 16 is sandwiched between the projection 60 and the flange portion 52. Although the stress applied to the front corner portion 50b increases with an increase in the bending moment, since the front corner portion 50b has a larger radius of curvature than the rear corner portion 50a, it is possible to suppress concentration of stress. Due to this, since deformation of the attachment member 50 due to the increased stress can be suppressed, the state of the attachment member 50 attached to the attachment hole 16 is stabilized.

Moreover, the rear corner portion 50a, the front corner portion 50b, the rear wall 55, and the horizontal walls 54 and 56 extend by standing approximately at the right angle (an inclination of approximately 85° to approximately 90°) from the flange portion 52. Due to this, it is possible to mold the holding portion 51 by splitting the mold from two directions without using a core.

Since the attachment member 50 having such a configuration has the rear corner portion 50a and the front corner portion 50b having different radii of curvature, it is possible to prevent an error in assembling with the attachment hole 16 without impairing the satisfactory molding properties obtained by two ways of mold splitting.

In the embodiment, it has been described that an assembly error of the attachment member and the attachment hole is suppressed by forming corner portions having different radii of curvature on the inner surfaces of the attachment member and the attachment hole to which the attachment member is fitted. However, the present invention is not limited to this, and the attachment member may only need to be configured to be fitted into the attachment hole when the attachment member is in one orientation only.

For example, a portion of the attachment member may be formed to protrude in a predetermined cross-sectional shape and a portion of the inner surface of the attachment hole may be formed to be broadened in a cross-sectional shape corresponding to the predetermined cross-sectional shape so that the attachment member is fitted into the attachment hole when the attachment member is only in a predetermined orientation. Conversely, a depression having a predetermined cross-sectional shape may be formed in a portion of the attachment member and a protruding portion having a cross-sectional shape corresponding to the predetermined cross-sectional shape may be formed in a portion of the attachment hole so that the attachment member is fitted into the attachment hole when the attachment member is only in a predetermined orientation.

The other configuration of the present embodiment is the same as that of the first to third embodiments, and description thereof will not be repeated.

Fifth Embodiment

A vehicle seat S as an airbag module-equipped seat according to still another embodiment of the present invention will be described with reference to FIGS. 1, 4 to 8, and 26 to 31.

Figure 26:
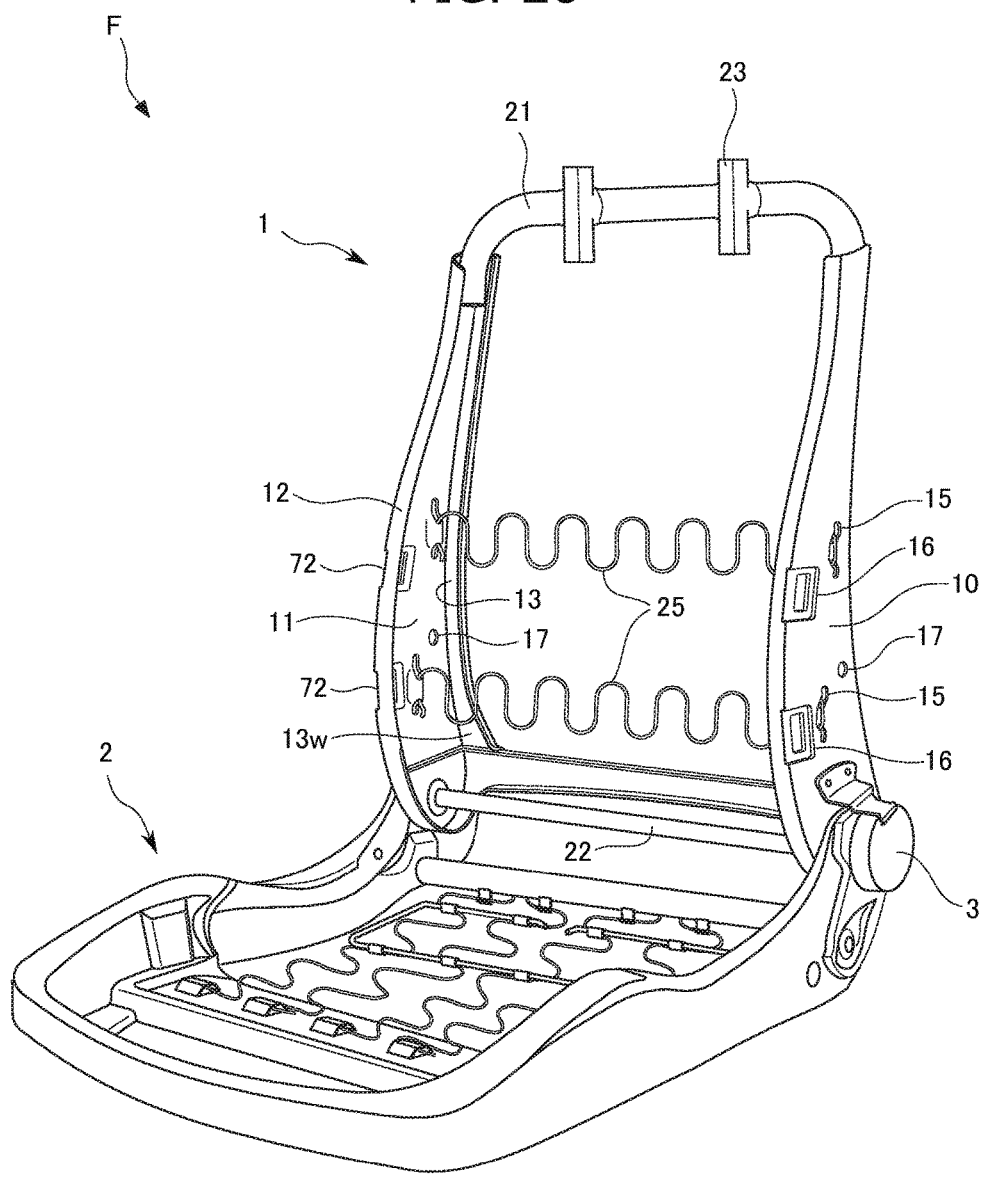
FIG. 26 is a perspective view of a seat frame of a vehicle seat according to an embodiment of the present invention.
Figure 27:
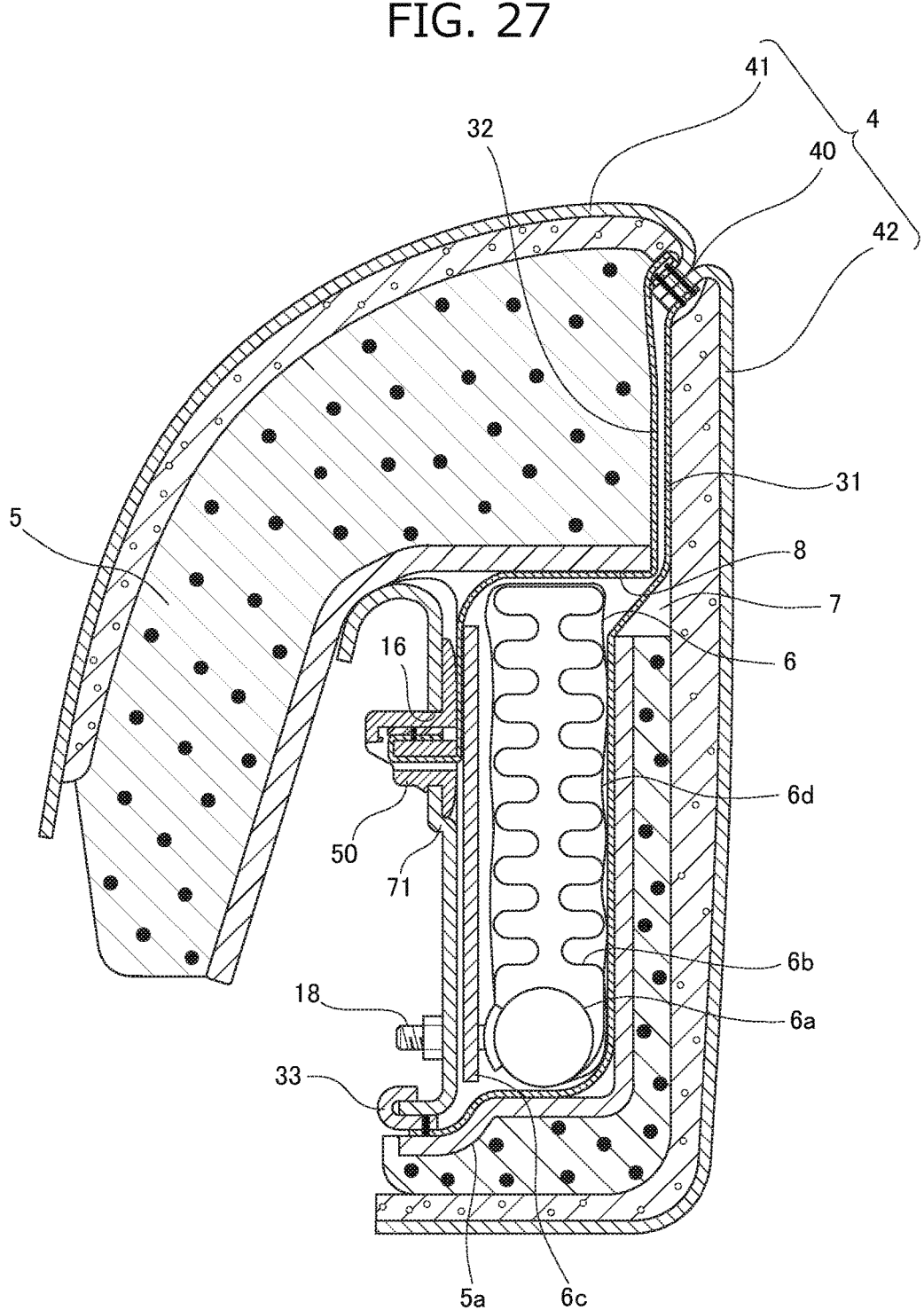
FIG. 27 is a cross-sectional view along line B-B in FIG. 1 and an explanatory diagram illustrating a state in which a stay cloth is connected to a side frame using an attachment member according to an embodiment of the present invention.

In the vehicle seat S as the airbag module-equipped seat according to the present embodiment, the rear edge 13 has a large-width portion 13w that is formed in a lower end of the rear edge 13 and has a large width toward the seat inner side as illustrated in FIG. 26.

As illustrated in FIG. 26, a pair of locking portions 15 is formed on the side plate 11 of each of the right and left side frames 10, the upper locking portion 15 is formed at a position close to the rear edge 13, and the lower locking portion 15 is formed at a position closer to the front edge 12 than the upper locking portion 15.

As illustrated in FIG. 26, a pair of attachment holes 16 is formed at a position of the side plate 11 of each of the right and left side frames 10 and is located between the front edge 12 and the rear edge 13 of the side plate 11 closer to the front edge 12 as a vertically long rectangular hole extending along the front edge 12.

The upper attachment hole 16 is formed at a position located closer to the seat front side and the lower side than the upper locking portion 15 and closer to the seat upper side than the lower locking portion 15. The lower attachment hole 16 is formed at a position located closer to the seat front side than the lower locking portion 15.

Moreover, the attachment holes 16 are formed on the front side of the bolt hole 17, the upper attachment hole 16 is formed more on the upper side than the bolt hole 17 and the lower attachment hole 16 is formed more on the lower side than the bolt hole 17. The bolt hole 17 is disposed at a position interposed between the upper and lower attachment holes 16 in the up and down direction.

As illustrated in FIGS. 26 to 29, a step 71 is formed around the attachment hole 16 of the side plate 11 to surround the attachment hole 16. With this step 71, a recess 72 is formed such that the region in which the attachment hole 16 is formed is depressed deeper toward the inner side in the seat width direction than a module attachment surface 11p of the side plate 11 to which the airbag module 6 is attached.

Figure 28:
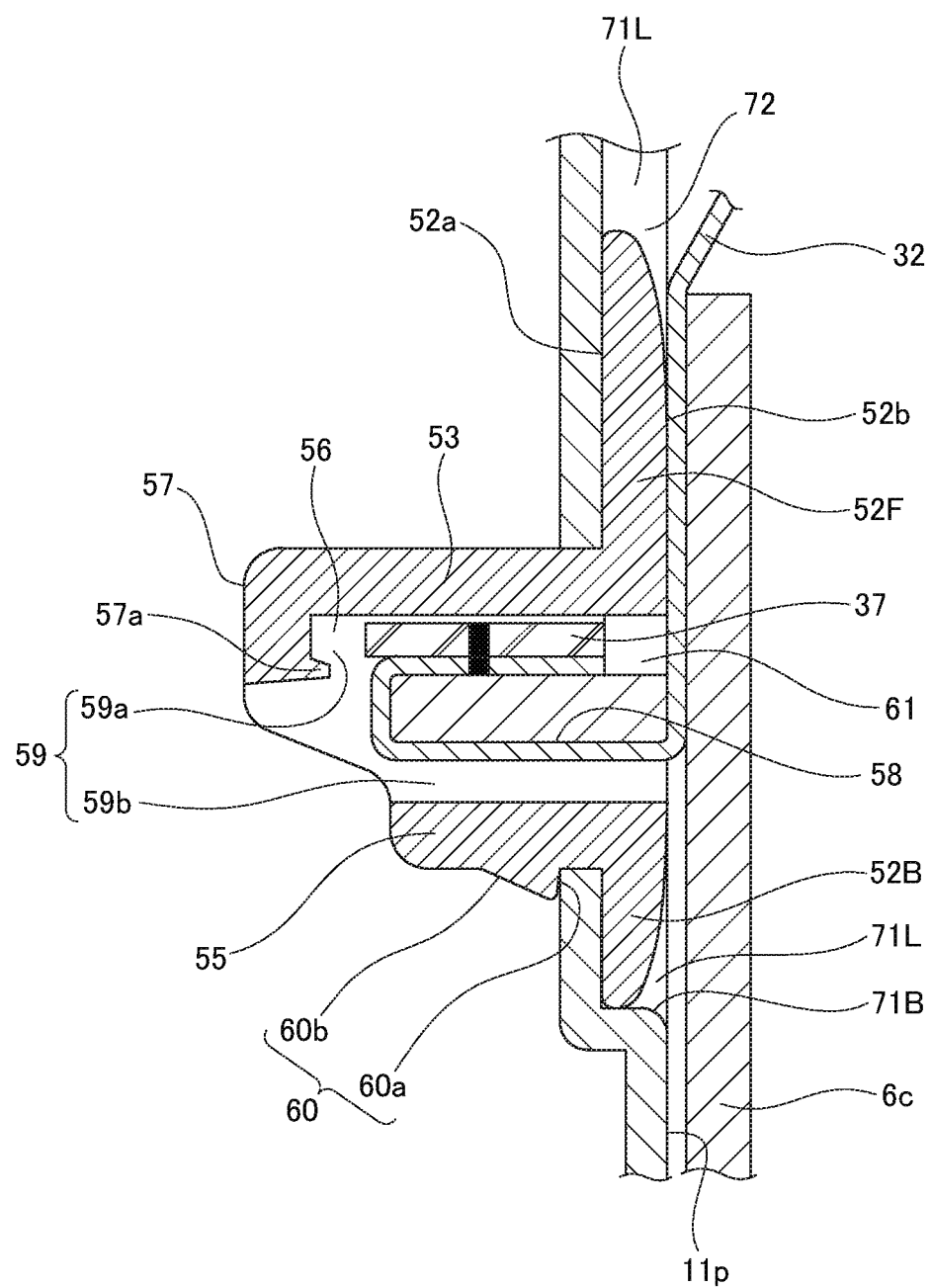
FIG. 28 is an explanatory enlarged cross-sectional view of the periphery of the attachment member illustrated in FIG. 27.

As illustrated in FIG. 28, the step 71 is formed as a step that is bent inward in the seat width direction so that the portion close to the attachment hole 16 is positioned closer to the inner side in the seat width direction than the module attachment surface 11p.

Figure 29:
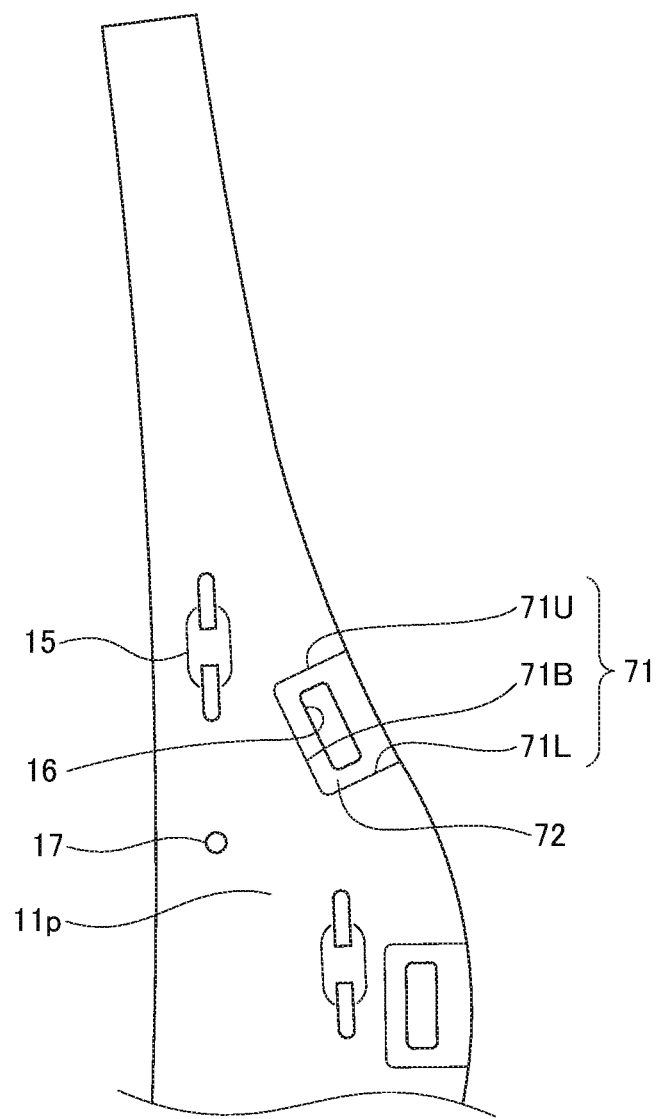
FIG. 29 is an explanatory side view diagram of a side frame according to an embodiment of the present invention.

As illustrated in FIG. 29, the step 71 is formed to extend in an approximately C-shape that includes a pair of linear upper and lower portions 71U and 71L that are approximately perpendicular to the front edge 12 and are approximately parallel to each other and a linear rear portion 71B that connects the ends of the upper and lower portions 71U and 71L on the opposite side of the front edge 12. The ends of the upper and lower portions 71U and 71L close to the front edge 12 extend until the ends cross the front edge 12, and a C-shaped opening sandwiched between the upper and lower portions 71U and 71L is connected to the front edge 12.

Due to this, the recess 72 is formed in such an approximately trapezoidal shape as illustrated in FIG. 29.

Since the upper and lower portions 71U and 71L extend until they cross the front edge 12, the recess 72 extends up to the front edge 12, and as illustrated in FIG. 26, a portion of the front edge 12 that the recess 72 crosses has a notched shape.

The step 71 and the recess 72 are provided to each of the pair of upper and lower attachment holes 16. The pair of upper and lower recesses 72 are formed independently from each other as illustrated in FIGS. 26 and 29. However, the present invention is not limited to this, and the pair of upper and lower recesses 72 may be connected together to be formed as an integrated continuous recess.

The distance between the seat rear-side end of the attachment hole 16 and the rear portion 71B of the step 71, the distance between the seat upper-side end of the attachment hole 16 and the upper portion 71U of the step 71, and the distance between the seat lower-side end of the attachment hole 16 and the lower portion 71L of the step 71 are approximately the same as or slightly longer than the length of a rear portion 52B, an upper portion 52U, and a lower portion 52L on the seat rear, upper, and lower sides of the flange portion 52 of the attachment member 50.

Thus, the rear portion 71B, the upper portion 71U, and the lower portion 71L of the step 71 are in contact with the ends of the rear portion 52B, the upper portion 52U, and the lower portion 52L on the seat rear, upper, and lower sides of the flange portion 52 of the attachment member 50, respectively. The portions may not be in contact with each other but may face at a close distance.

Here, the lengths of the rear portion 52B, the upper portion 52U, and the lower portion 52L mean the length between the outer surface of the rear wall 55 and the distal end of the rear portion 52B, the length between the outer surface of the horizontal wall 54 and the distal end of the upper portion 52U, and the length between the outer surface of the horizontal wall 56 and the distal end of the lower portion 52L, respectively.

Moreover, the distance between the seat front-side end of the attachment hole 16 and the front end of the side plate 11 is larger than the length of the front section 52F on the seat front side of the flange portion 52 of the attachment member 50.

As illustrated in FIG. 29, other member attachment portions (that is, the bolt hole 17, the locking portion 15, and the like) for attaching members other than the attachment member 50 are formed in a region outside the recess 72.

The flange portion 52 is formed in a rectangular frame shape in which the front section 52F, the upper portion 52U, the rear portion 52B, and the lower portion 52L protruding toward the seat front, upper, rear, and lower sides are continuous to each other.

Moreover, the thickness of the flange portion 52 is the same as the height of the step 71 or is smaller than the height of the step 71.

The end of the rear portion 52B of the flange portion 52 is in contact with the rear portion 71B of the step 71 as illustrated in FIG. 28. The end of the upper portion 52U of the flange portion 52 is in contact with the upper portion 71U of the step 71 illustrated in FIG. 29. The end of the lower portion 52L of the flange portion 52 is in contact with the lower portion 71L of the step 71 illustrated in FIG. 29. Due to this, it is possible to suppress an assembly error resulting from misalignment of the up and down and right and left directions of the attachment member 50 in relation to the attachment hole 16.

The respective ends of the rear portion 52B, the upper portion 52U, and the lower portion 52L of the flange portion 52 may not necessarily be in contact with the rear portion 71B, the upper portion 71U, and the lower portion 71L of the step 71 as long as an assembly error resulting from the misalignment of the up and down and right and left directions of the attachment member 50 is suppressed. The respective ends of the rear portion 52B, the upper portion 52U, and the lower portion 52L of the flange portion 52 may be disposed at positions close to the rear portion 71B, the upper portion 71U, and the lower portion 71L of the step 71.

In this case, as illustrated in FIG. 28, the flange portion 52 is received in the recess 72. Moreover, the thickness of the flange portion 52 is the same as the height of the step 71 or smaller than the height of the step 71. Thus, during assembling, as illustrated in FIG. 28, the pressing surface 52b positioned at the outermost end of the flange portion 52 in the seat width direction is positioned on the same surface as the module attachment surface 11p or closer to the inner side in the seat width direction than the module attachment surface 11p.

Figure 30:
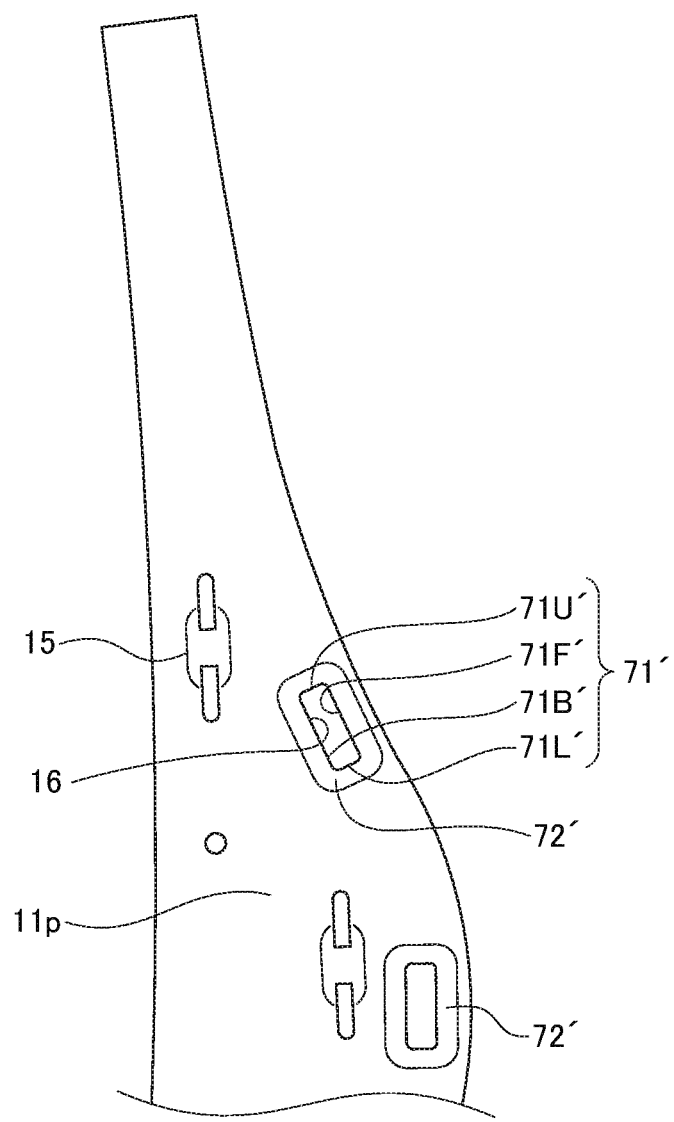
FIG. 30 is an explanatory side view diagram of a side frame according to another embodiment of the present invention.

Moreover, in the present embodiment, the upper portion 71U and the lower portion 71L of the step 71 reach the front edge 12 and the recess 72 is connected to the front edge 12. However, the present invention is not limited to this, and as illustrated in FIG. 30, a recess 72' may be formed in the region of the side plate 11 so as not to reach the front edge 12 and the rear edge 13.

In this case, the distances to the attachment hole 16 from a front section 71F', an upper portion 71U', a rear portion 71B', and a lower portion 71L' of the step 71' are approximately the same as or slightly larger than the lengths of the front section 52F, the upper portion 52U, the rear portion 52B, and the lower portion 52L on the seat front, upper, rear, and lower sides of the flange portion 52 of the attachment member 50, respectively. Thus, an assembly error resulting from a misalignment of the attachment directions of the attachment member 50 can be suppressed.

Figure 31:
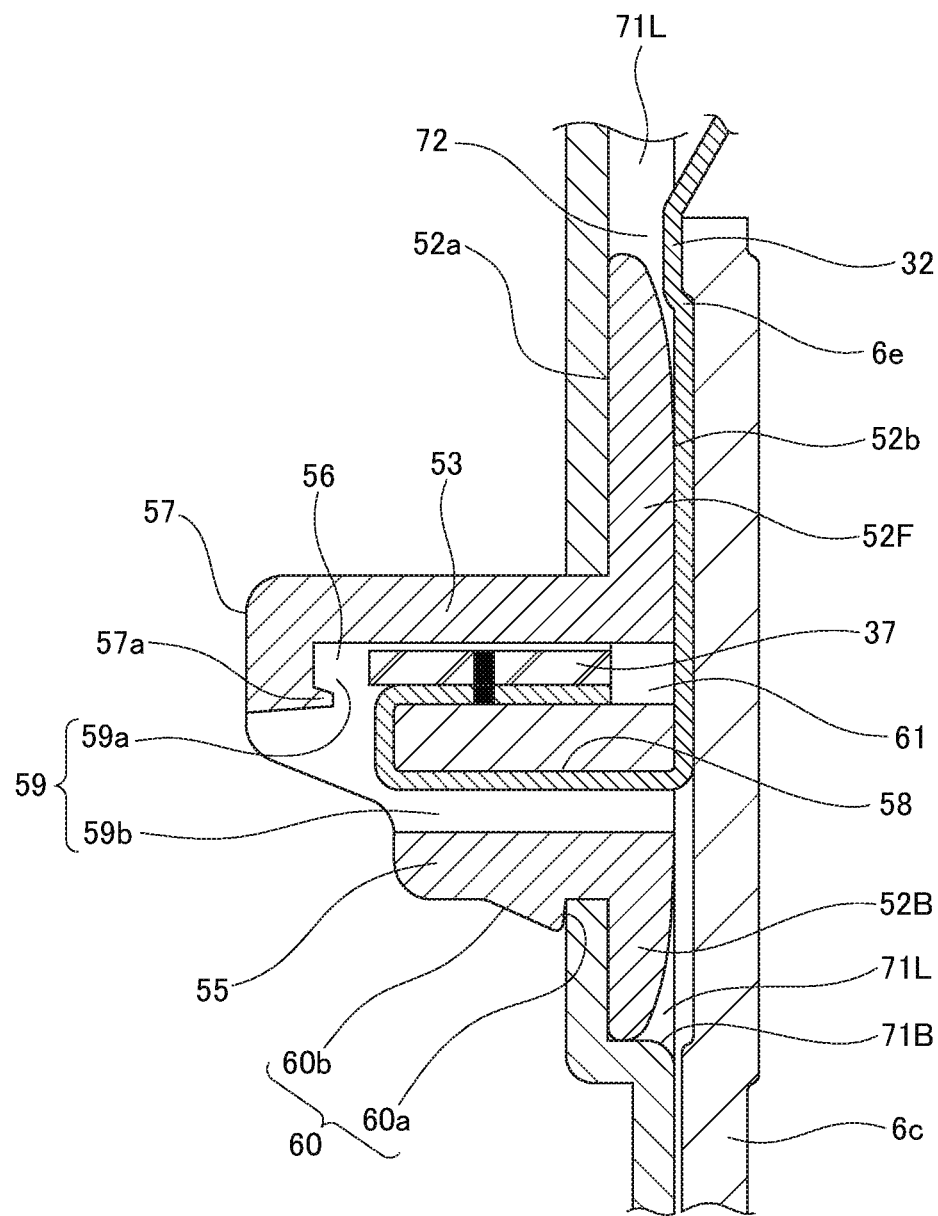
FIG. 31 is an explanatory enlarged cross-sectional view of the periphery of the attachment member illustrated in FIG. 27 according to another embodiment of the present invention.

Moreover, as illustrated in FIG. 31, a recess 6e that is depressed outward in the seat width direction may be formed at a position of the retainer 6c of the airbag module 6 facing the recess 72.

The other configuration of the present embodiment is the same as that of the first to fourth embodiments, and description thereof will not be repeated.

Sixth Embodiment

A vehicle seat S as an airbag module-equipped seat according to still another embodiment of the present invention will be described with reference to FIGS. 1, 5, 8, 9, and 32 to 45.

In the vehicle seat S as the airbag module-equipped seat according to the present embodiment, the cushion pad 5 is a member that forms an outer shape of the seat and is capable of supporting an occupant elastically. The cushion pad 5 is formed by bonding a flat planar member 5L formed of a nonwoven fabric or the like to a rear surface of a foamed molded body 5F of a resin foam such as a polyurethane foam or the like.

Figure 33:
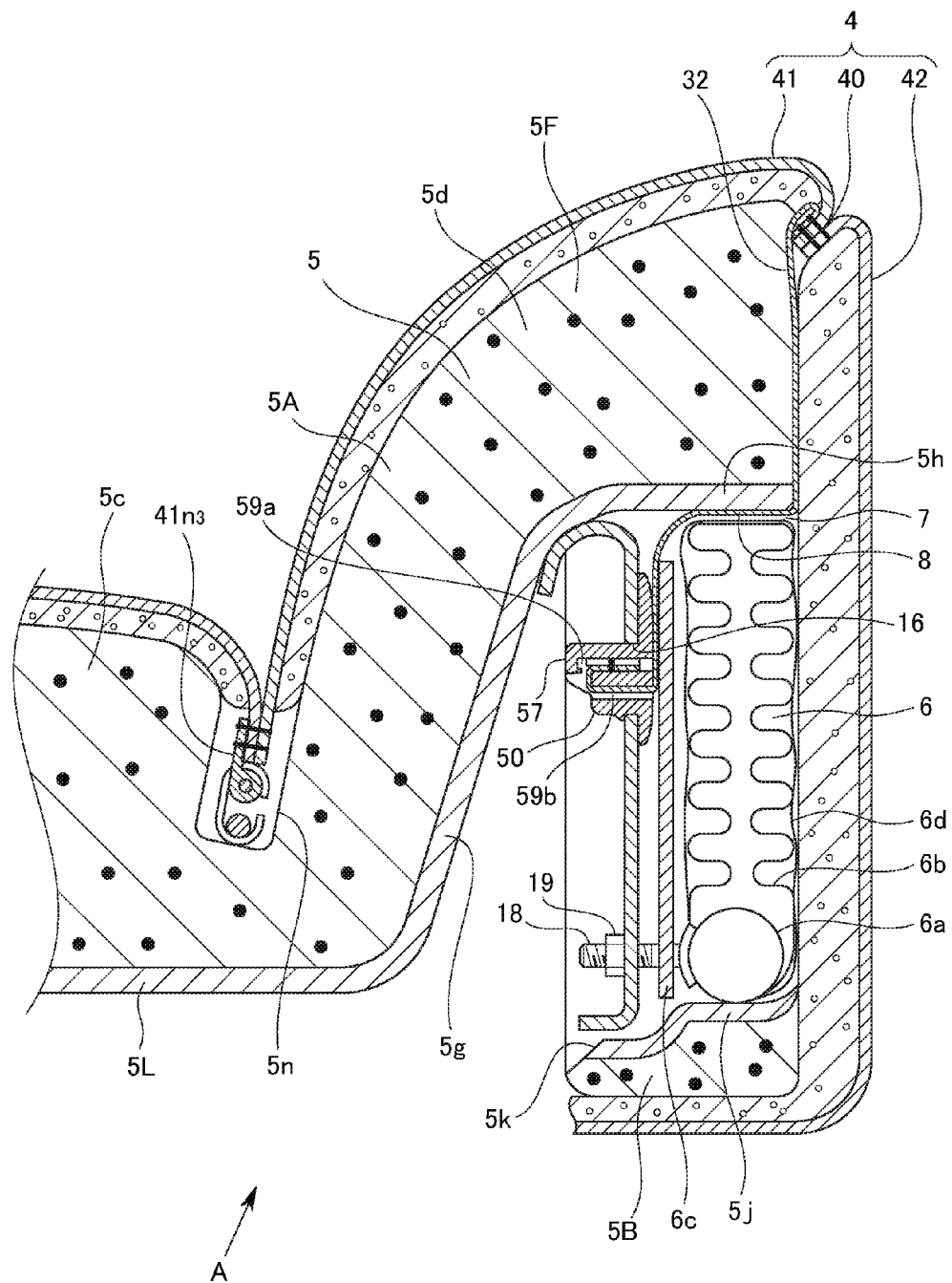
FIG. 33 is a cross-sectional view along line B-B in FIG. 1 and is an explanatory diagram illustrating a state in which a stay cloth is connected to a side frame using an attachment member according to an embodiment of the present invention.
Figure 34:
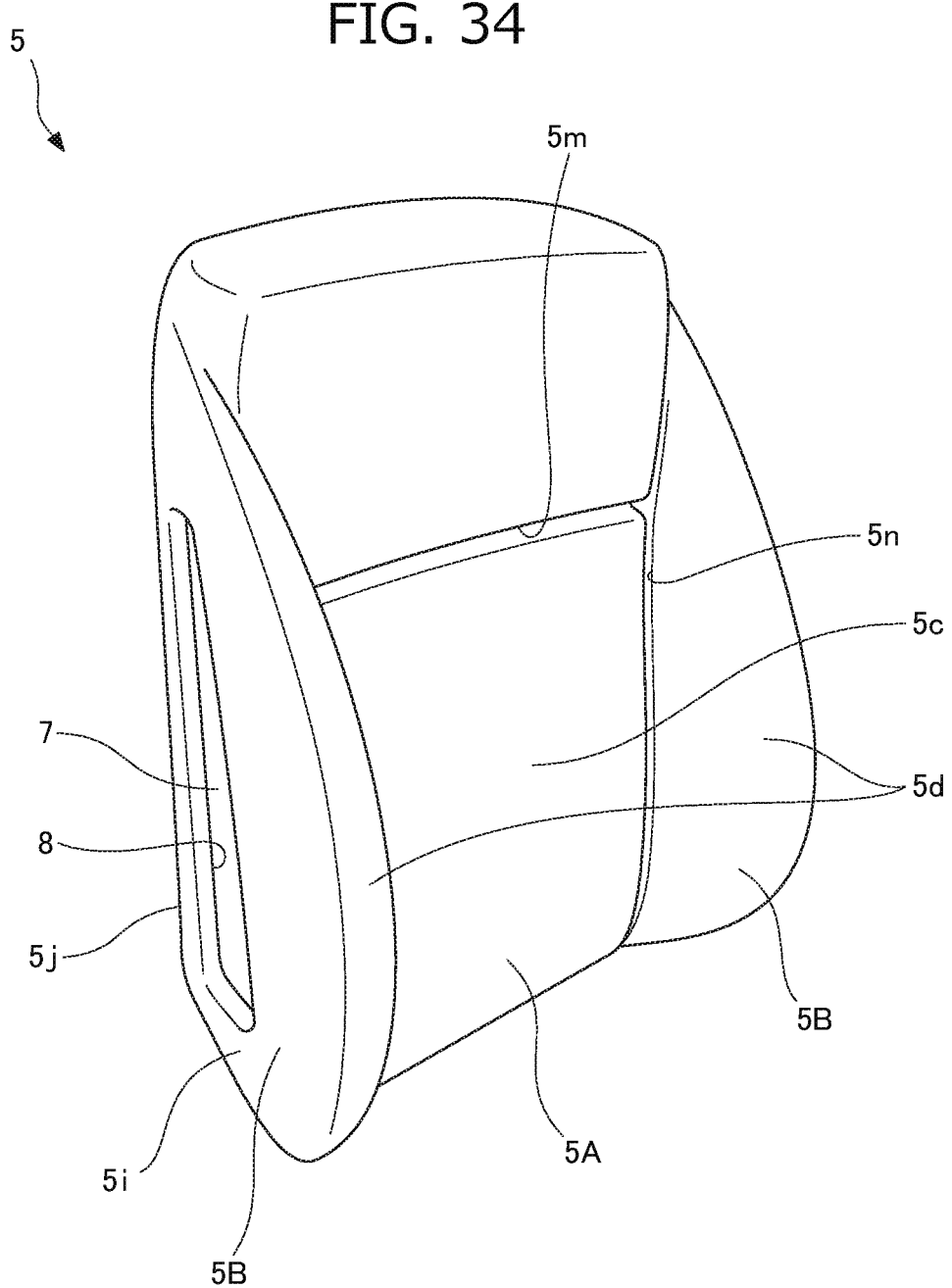
FIG. 34 is an external perspective view of a cushion pad according to an embodiment of the present invention.

As illustrated in FIGS. 33 and 34, the cushion pad 5 includes a front pad portion 5A disposed on the front side of the seat back frame 1 and lateral pad portions 5B disposed on the lateral sides of the side frame 10 to be integrated with the front pad portion 5A. An opening 8 through which the stay cloth 32 is inserted is formed in the lateral pad portion 5B, and this opening 8 forms a space 7 for storing the airbag module 6.

The front pad portion 5A has an approximately planar shape and forms the outer shape of the front surface of the seat back S1 of FIG. 1. The front pad portion 5A includes a seating portion 5c that is positioned at the center in the seat width direction to support the back of the upper body of an occupant and bank portions 5d that are positioned on both sides in the seat width direction of the seating portion 5c to support the sides of the upper body of the occupant.

As illustrated in FIGS. 33 and 34, the bank portion 5d protrudes toward the seat front outer side further than the seating portion 5c so that an end of the bank portion 5d on the opposite side of the seating portion 5c is positioned closer to the seat front side than the end close to the seating portion 5c.

A suspension groove 5m for suspending and connecting a wire 41m attached to the rear surface of the trim cover 4 is formed in a portion disposed above the center of the seating portion 5c along the seat width direction, and a suspension wire (not illustrated) is provided in the suspension groove 5m. Moreover, a suspension groove 5n for suspending and connecting wires 41n1 to 41n3 attached to the rear surface of the trim cover 4 is formed at the boundary between the seating portion 5c and the bank portion 5d along the up and down direction of the seat, and a suspension wire (not illustrated) is provided in the suspension groove 5n.

Figure 39:
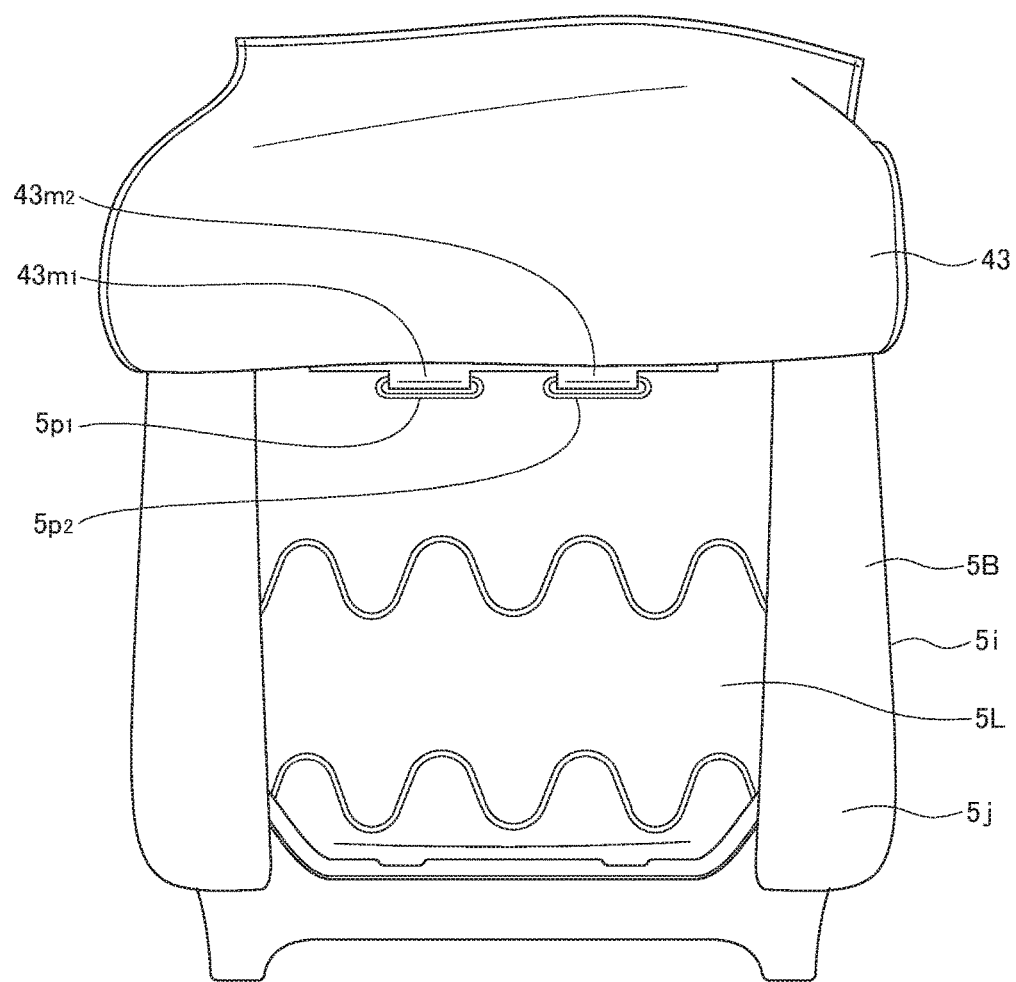
FIG. 39 is an explanatory rear view diagram illustrating a state in which a trim cover is suspended above the back surface side of a cushion pad.

As illustrated in FIGS. 33 and 39, the portion of the planar member 5L that forms the seating portion 5c is configured as an approximately flat surface to make contact with the bridging member 25 provided between the side frames 10.

Moreover, as illustrated in FIG. 39, suspension grooves 5p1 and 5p2 for suspending and connecting wires 43m1 and 43m2 are formed in the back surface of the planar member 5L of the front pad portion 5A of the cushion pad 5, and a suspension wire (not illustrated) is provided in the suspension grooves 5p1 and 5p2.

The suspension grooves 5p1 and 5p2 extend linearly along the seat width direction and are provided discontinuously and independently from each other at a predetermined interval to be placed on the same line.

The suspension grooves 5p1 and 5p2 are formed at positions close to the upper end of the attachment position of the airbag module 6 and close to the upper end of the opening 8 in the up and down direction of the seat. For example, the suspension grooves 5p1 and 5p2 are formed at positions slightly below the upper end of the attachment position of the airbag module 6 and slightly below the upper end of the opening 8.

As illustrated in FIG. 33, the end of the portion of the planar member 5L that forms the bank portion 5d, disposed closer to the center of the seat is continuous to the portion of the planar member 5L that forms the seating portion 5c. The portion of the planar member 5L that forms the bank portion 5d includes a front inclined portion 5g that extends obliquely toward the front outer side from the end close to the seat central side while being bent toward the seat front outer side and a lateral extension portion 5h that extends from the front end of the front inclined portion 5g toward the seat lateral side while being bent toward the seat outer side.

The boundary portion between the front inclined portion 5g and the lateral extension portion 5h are bent to make contact with a seat inner-side end of the front edge 12 of the side frame 10 during assembling.

An outer end in the seat width direction of the bank portion 5d of the front pad portion 5A is bent toward the seat rear side and is continuous to the lateral pad portion 5B that forms the outer shape of the seat lateral section.

The lateral pad portion 5B illustrated in FIGS. 33 and 34 includes a lateral portion 5i that forms the outer shape of the lateral section of the seat back S1 and a rear portion 5j that extends from the seat rear end of the lateral portion 5i toward the seat inner side.

A space 7 formed as an approximately rectangular prism-shaped through-hole that passes through the lateral portion 5i in the seat width direction along the outer shape of the airbag module 6 is formed in the lateral portion 5i. The space 7 is used for storing the airbag module 6 and has an opening 8 that is open toward the outer side in the seat width direction.

Moreover, as illustrated in FIG. 33, the space 7 is also used as a passage through which the stay cloth 32 is pulled from the breaking portion 40 of the trim cover 4 toward the side frame 10.

In the present embodiment, although the front pad portion 5A and the lateral pad portion 5B are formed as a continuous integral form, the present invention is not limited to this, and the front pad portion 5A and the lateral pad portion 5B may be configured as separate members.

As illustrated in FIG. 33, the lateral pad portion 5B is disposed so that the portion of the planar member 5L that forms the rear portion 5j makes contact with the seat rear-side surface of the airbag module 6.

A portion of a seat inner-side end of the rear portion 5j of the lateral pad portion 5B disposed close to the seat front inner side is obliquely notched and has an inclined surface 5k inclined so that the seat inner-side end is positioned on the rear side and the seat outer-side end is positioned on the front side.

Figure 35:
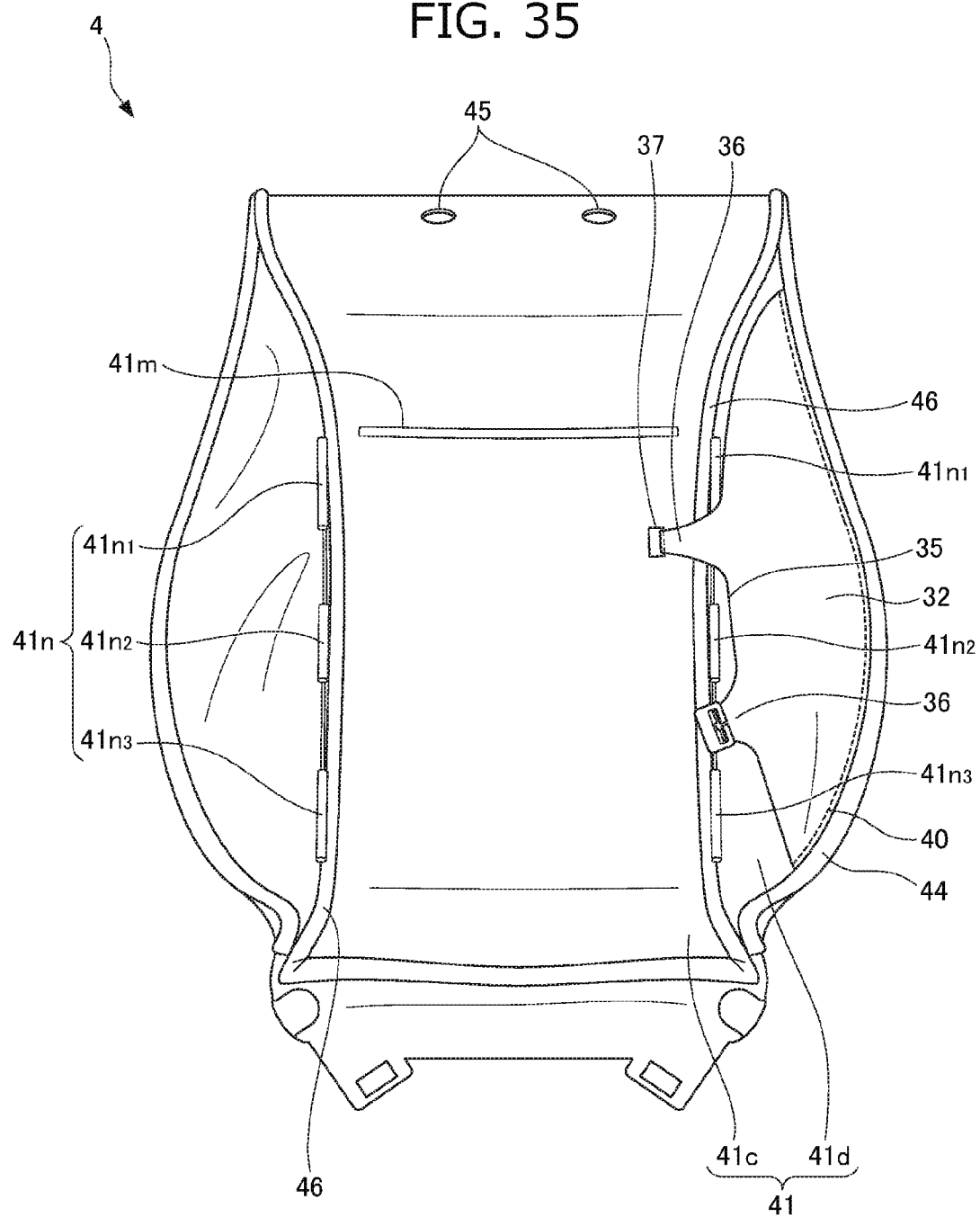
FIG. 35 is an explanatory diagram illustrating the rear surface of a trim cover according to an embodiment of the present invention.

The trim cover 4 is formed of a well-known material, and as illustrated in FIGS. 33 and 35, is sewn in a bag form in which an opening is formed in the seat lower side.

As illustrated in FIG. 35, the trim cover 4 is formed as a bag-shaped member of which the seat upper side is closed and the seat lower side is open. A pair of pillar insertion holes 45 for inserting a headrest pillar (not illustrated) along the seat width direction is formed in the bag portion on the upper side of the trim cover 4.

The front wedge portion 41 includes a seating wedge portion 41c that covers the seating portion 5c and a bank portion wedge portion 41d that covers the bank portion 5d, and the seating wedge portion 41c and the bank portion wedge portion 41d are sewn together at a sewn portion 46.

As illustrated in FIG. 35, the wire 41m is provided on the rear surface of the front wedge portion 41 along the seat width direction at a position of approximately ⅓ of the height of the front pad portion 5A of the cushion pad 5 from the upper end of the front pad portion 5A. The wire 41m is formed of a linear wire and is used for suspension by being connected to a suspension wire (not illustrated) in the suspension groove 5m of the front pad portion 5A by a C-ring.

Moreover, the wires 41n1, 41n2, and 41n3 are provided in a portion of the sewn portion 46 of the seating wedge portion 41c and the bank portion wedge portion 41d that covers the bank portion 5d, disposed closer to the bank portion wedge portion 41d to extend along the sewn portion 46. The wires 41n1, 41n2, and 41n3 are formed of linear wires and are disposed at positions closer to the seat lower side than the wire 41m at an interval to be placed on the same line. The wires 41n1, 41n2, and 41n3 are disposed discontinuously and independently from each other. The wires 41n1, 41n2, and 41n3 are used for suspension by being connected to a suspension wire (not illustrated) in the suspension groove 5n of the front pad portion 5A by a C-ring.

Moreover, a pair of sets of right and left wires 41n1, 41n2, and 41n3 are provided at positions corresponding to the pair of right and left suspension grooves 5n of the front pad portion 5A.

The uppermost wire 41n1 is disposed closer to the seat upper side than the upper attachment hole 16 when the vehicle seat S is assembled and the lowermost wire 41n3 is disposed closer to the seat lower side than the lower attachment hole 16 when the vehicle seat S is assembled.

As illustrated in FIGS. 33 and 35, the sewn portion 44 of the front wedge portion 41 and the lateral wedge portion 42 is disposed at a position facing the protruding apex of the bank portion 5d of FIG. 33, and the breaking portion 40 is formed along the sewn portion 44. In the breaking portion 40, the ends of the front wedge portion 41 and the lateral wedge portion 42 are sewn together so that the ends can be broken with tensile force generated by inflation of the airbag while maintaining strength suitable for general usage.

As illustrated in FIG. 39, suspension wires 43m1 and 43m2 are fixed to the rear surface of the rear wedge portion 43 of the trim cover 4 at a position of approximately ¼ to ⅓ of the height of the rear wedge portion 43 from the upper end of the rear wedge portion 43. The wires 43m1 and 43m2 extend linearly along the seat width direction and are provided discontinuously and independently from each other at a predetermined interval to be placed on the same line.

The wires 43m1 and 43m2 are provided at positions located close to the upper end of the attachment position of the airbag module 6 and close to the upper end of the opening 8. For example, the wires 43m1 and 43m2 are provided at positions slightly below the upper end of the attachment position of the airbag module 6 and slightly below the upper end of the opening 8.

As illustrated in FIG. 35, the stay cloth 32 is sewn together in the breaking portion 40.

As illustrated in FIG. 35, the stay cloth 32 is formed of an approximately almond-shaped or an approximately rugby ball-shaped cloth in which a pair of circular arcs face each other. A pair of attachment portions 36 for attachment of the trim plate 37 that protrudes in a rectangular form is formed on both sides of the side 35 facing the breaking portion 40.

The stay cloth 32 has a different color (having different lightness, saturation, or hue) from the color of a seat inner-side surface of the side plate 11 of the side frame 10. In particular, the stay cloth 32 preferably has a color having different lightness from the color of the seat inner-side surface of the side plate 11. Since the side plate 11 is often formed of a steel plate having the color silver or brownish silver, the stay cloth 32 has the color related to white or the color related to yellow (for example, the color white).

Moreover, the holding portion 51 may have the fluorescent color and may be molded using a resin mixed with a luminous pigment to exhibit an afterglow effect.

In the present embodiment, the inner-side stay cloth 32 only is provided as a guide member for guiding the deployment direction of the airbag 6b. However, an outer-side stay cloth (not illustrated) that extends from the seat rear side toward the seat inner side along a surface of the breaking portion 40 disposed closer to the outer side and the rear side in the seat width direction of the airbag module 6 to be locked at the rear edge 13 of the side frame 10 may also be provided.

The holding portion 51 has a different color (having different lightness, saturation, or hue) from the color of a seat inner-side surface of the side plate 11 of the side frame 10. In particular, the holding portion 51 preferably has a color having different lightness from the color of the seat inner-side surface of the side plate 11. Since the side plate 11 is often formed of a steel plate having the color silver or brownish silver, the holding portion 51 has the color related to white or the color related to yellow (for example, the color white).

Moreover, the holding portion 51 may have the fluorescent color and may be molded using a resin mixed with a luminous pigment to exhibit an afterglow effect.

Figure 36:
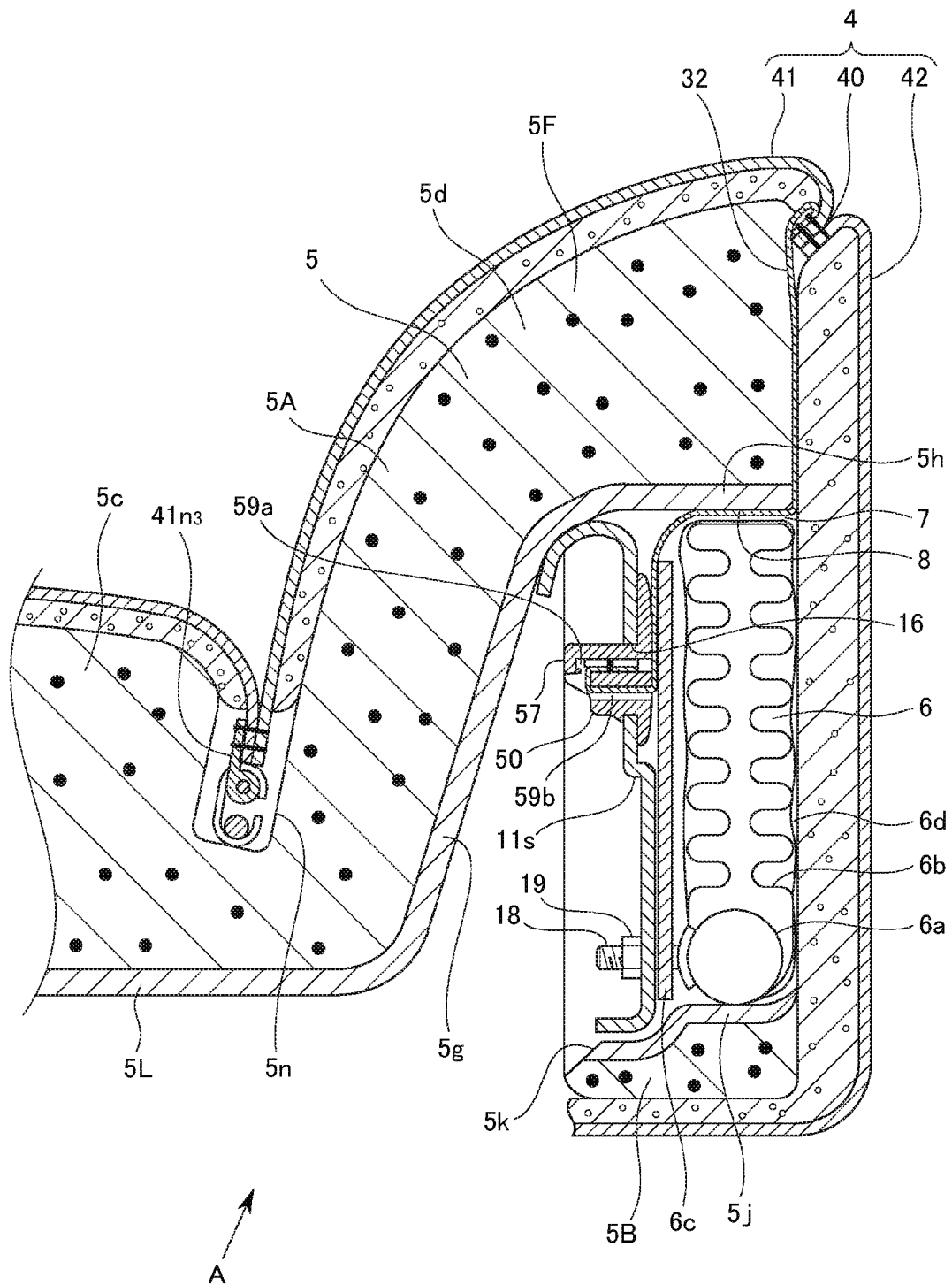
FIG. 36 is a cross-sectional view along line A-A in FIG. 1 and is an explanatory diagram illustrating a state in which an attachment member is attached to a side frame according to another embodiment of the present invention.

In the present embodiment, an example of the side frame 10 having the side plate 11 having a flat plate shape has been described. However, the present invention is not limited to this, and for example, as illustrated in FIG. 36, the side plate 11 may have a step 11s as a convex portion provided to surround the seat upper, lower, and rear sides of the attachment hole 16.

The step 11s is formed as a step provided such that only the periphery of the attachment hole 16 protrudes toward the seat inner side and is formed continuously in an approximately C-shape that surrounds the seat upper, lower, and rear sides of the attachment hole 16.

The step 11s is not limited to the approximately C-shape that surrounds the seat upper, lower, and rear sides of the attachment hole 16 but may extend linearly or in a curved form in the up and down direction of the seat.

Since the step 11s is provided in this manner, the attachment member 50 can be disposed deeper on the inner side in the seat width direction and can be easily observed from the back surface side of the seat.

Next, the procedure of a method of assembling the seat back S1 of the vehicle seat S as the airbag module-equipped seat of the present embodiment will be described.

As illustrated in FIG. 35, the stay cloth 32 is sewn in advance to the trim cover 4 in the breaking portion 40 of the sewn portion 44 between the front wedge portion 41 and the lateral wedge portion 42 on the vehicle door side, and the trim plates 37 are fixed to two attachment portions 36 formed in the stay cloth 32.

First, the pair of trim plates 37 are attached to the attachment member 50.

The connection between the trim plate 37 and the attachment member 50 is performed in the following procedure.

As illustrated in FIG. 35, the attachment portion 36 is formed in a strip form. One of the two sides of the strip-shaped portion of the attachment portion 36 is inserted into the slits 55s and 52s so that the attachment portion 36 is inserted into the rear space 59b. As a result, a state in which the half of the attachment portion 36 is inserted into the half region of the rear space 59b of FIG. 5 divided by the slits 55s and 52s is created. In this case, the trim plate 37 is positioned close to the rear wall 55 and the end of the attachment portion 36 is positioned close to the front wall 53.

The other one of the two sides of the strip-shaped portion of the attachment portion 36 is also inserted into the rear space 59b through the slits 55s and 52s so that the attachment portion 36 passes through the rear space 59b of FIG. 5.

Subsequently, the trim plate 37 is inverted by 180°, the end of the attachment portion 36 is bent toward the front space 59a of FIG. 5, the trim plate 37 is inserted into the front space 59a from the gap between the partition wall 58 and the top wall 57, and the trim plate 37 is pushed until the distal end of the trim plate 37 makes contact with the bridge portion 61. In this way, connection of the stay cloth 32 and the attachment member 50 is completed.

Figure 32:
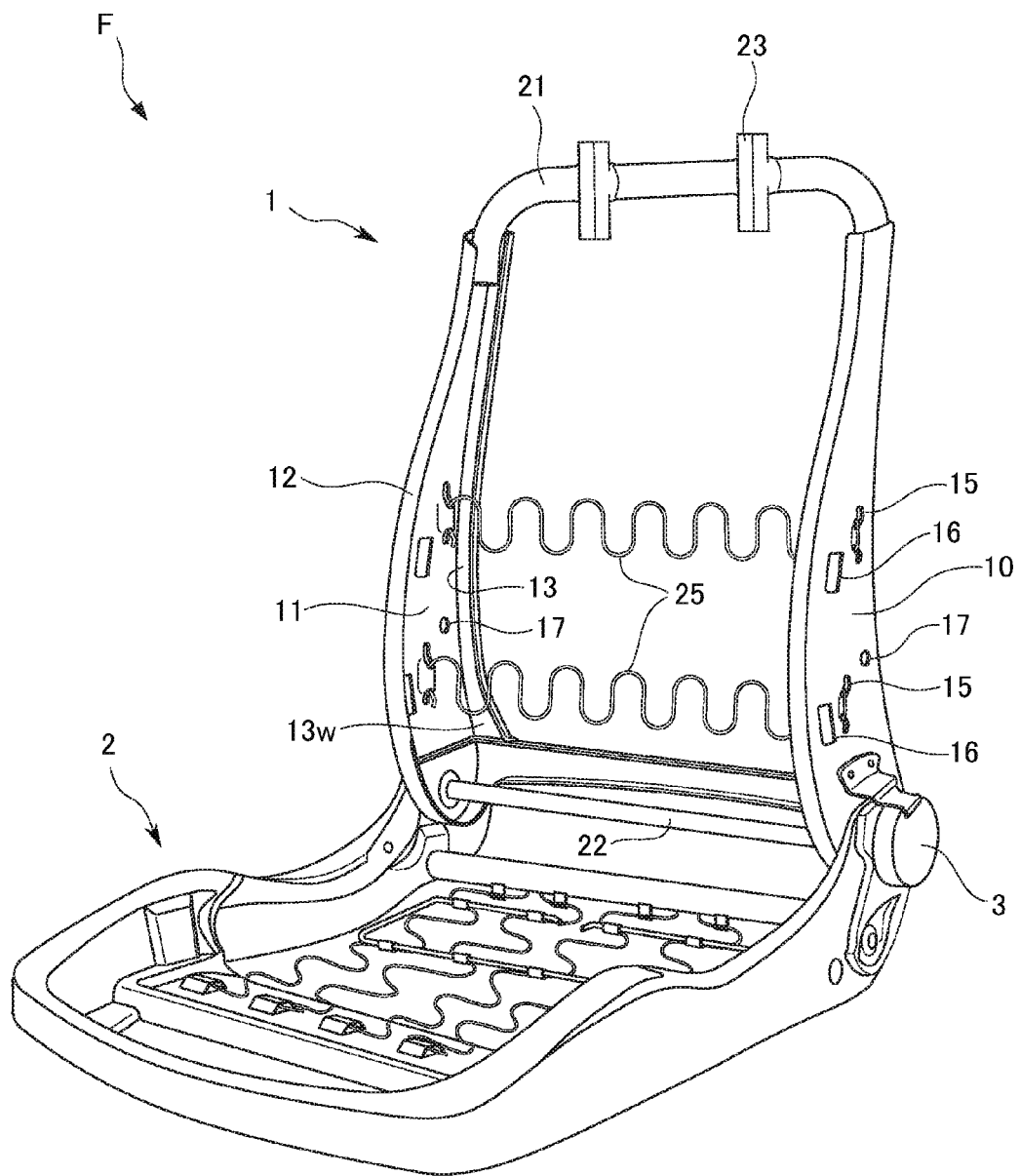
FIG. 32 is a perspective view of a seat frame of an airbag module-equipped seat according to an embodiment of the present invention.

As illustrated in FIG. 32, the bridging members 25 are arranged in the seat back frame 1. Subsequently, the front pad portion 5A is disposed on the front surface of the seat back frame 1 and the bridging members 25, and the cushion pad 5 is attached to the seat back frame 1 so that the rear portion 5j of the lateral pad portion 5B makes contact with the rear edge 13 of the side frame 10.

Next, the procedure of covering the trim cover 4 with the cushion pad 5 will be described.

An upper covering procedure of covering the upper portion of the cushion pad 5 with the upper portion of the trim cover 4 is performed.

Figure 37:
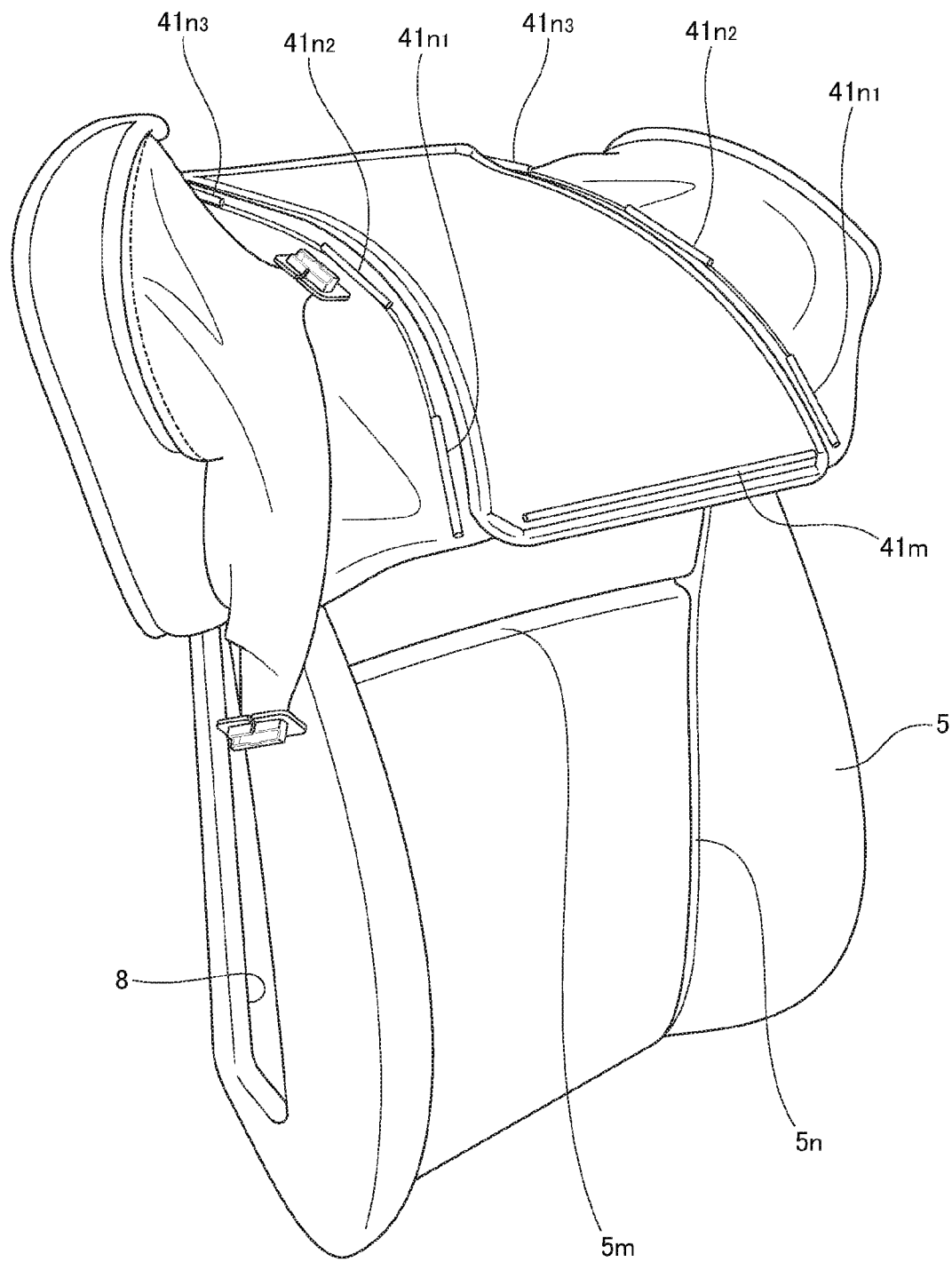
FIG. 37 is an explanatory perspective view diagram illustrating a state in which an upper end of a trim cover according to an embodiment of the present invention is put on an upper end surface of a cushion pad.

In the upper covering procedure, the trim cover 4 is turned inside out as illustrated in FIG. 35 and covers the cushion pad 5 from the upper end side as illustrated in FIG. 37.

FIG. 35 illustrates a state in which the upper end of the trim cover 4 is put on the upper end surface of the cushion pad.

Figure 41:
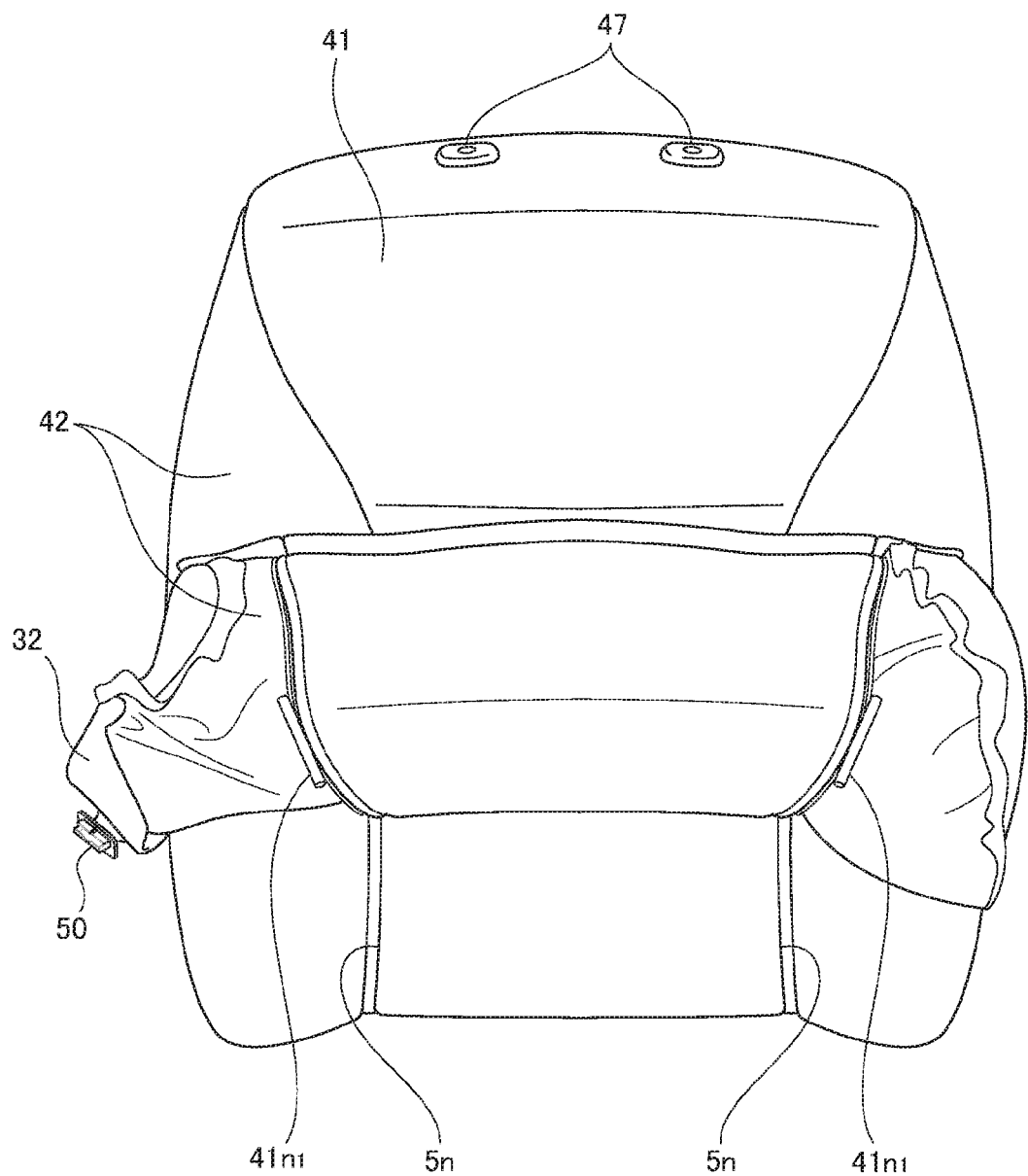
FIG. 41 is an explanatory front view illustrating a state in which a trim cover covers up to the central portion of a side frame.

As illustrated in FIG. 35, the upper end of the trim cover 4 is put on the upper end surface of the cushion pad. The pillar insertion holes 45 formed in the upper portion of the trim cover 4 are aligned with the headrest pillar holes (not illustrated) formed in the upper end surface of the cushion pad 5. In this state, pillar guides 47 for the headrest pillar illustrated in FIG. 41 are fitted into the pillar insertion holes 45 and the holes (not illustrated) on the upper end surface of the cushion pad 5. In this way, the upper portion of the trim cover 4 is aligned and fixed to the cushion pad 5.

Figure 38:
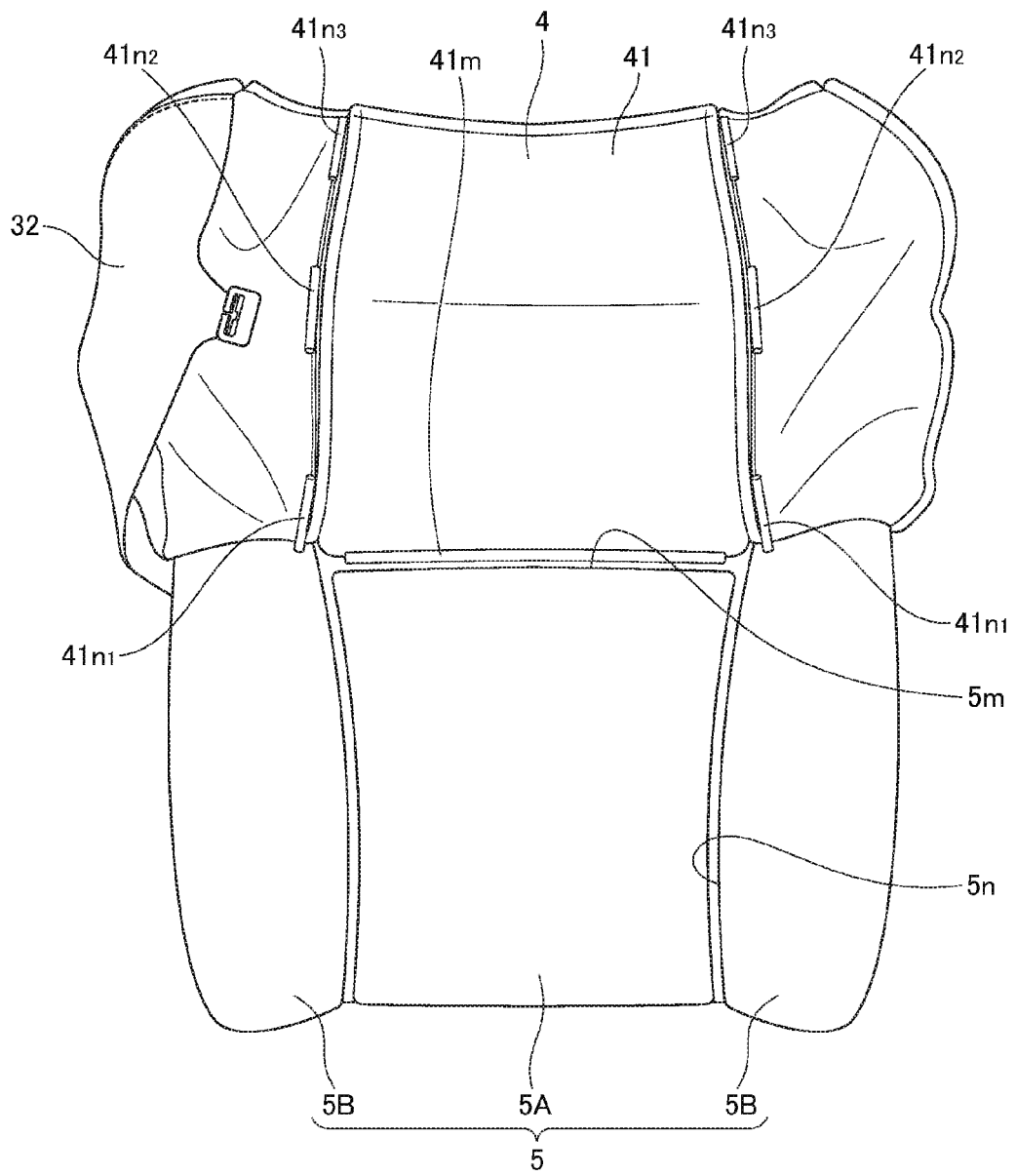
FIG. 38 is an explanatory front view diagram illustrating a state in which a trim cover is suspended above the front surface side of a cushion pad.

Subsequently, as illustrated in FIG. 38, the trim cover 4 is pulled downward so that a portion of the trim cover 4 disposed above the wire 41m is covered with the cushion pad 5. The wire 41m is connected to a suspension wire (not illustrated) provided in the suspension groove 5m by a C-ring (not illustrated) to create a suspended state.

Moreover, as illustrated in FIG. 39, on the back surface side of the seat, the back surface of the cushion pad 5 and the trim cover 4 are connected to create a suspended state.

On the back surface side of the seat, the wires 43m1 and 43m2 are connected to suspension wires (not illustrated) provided in the suspension grooves 5p1 and 5p2, respectively, by a C-ring (not illustrated) to create a suspended state.

The trim cover 4 is pulled further downward and the right and left wires 41n1 provided on the uppermost side among the wires 41n1, 41n2, and 41n3 are connected to wires (not illustrated) provided in the right and left suspension grooves 5n to create a suspended state.

Figure 40:
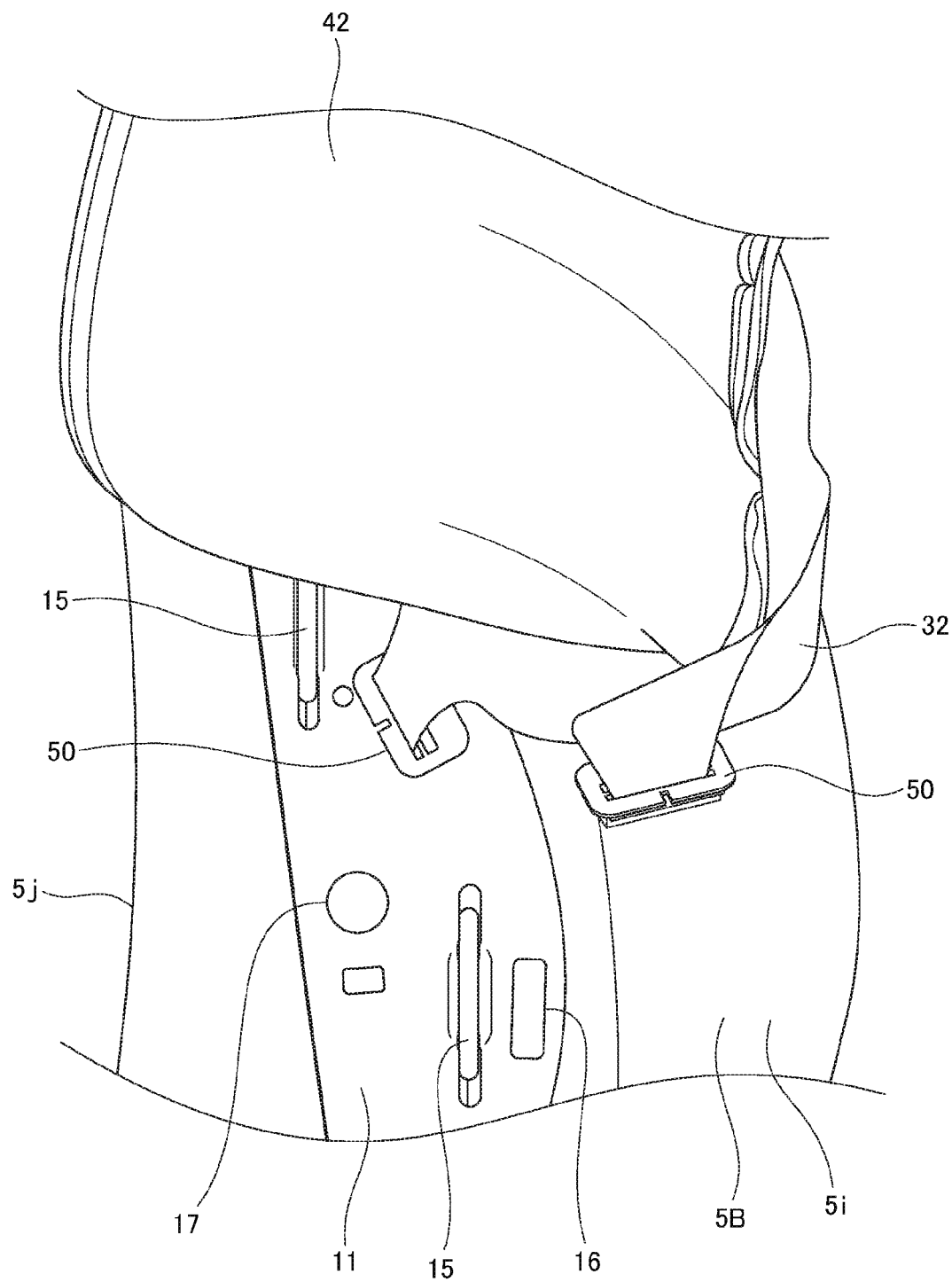
FIG. 40 is an explanatory side view diagram illustrating a state in which an attachment member is attached to a position above a side frame.

In this case, as illustrated in FIG. 40, the position of the lower end of the trim cover 4 is slightly above the upper attachment hole 16.

When the suspended state is created on the front surface side and the back surface side of the seat at the position near the upper end of the opening 8, a larger portion of the opening 8 excluding the upper end is exposed from the trim cover 4 as illustrated in FIG. 40. In this case, the upper and lower attachment holes 16 are also exposed from the trim cover 4.

In this way, the upper covering procedure is completed.

Next, a guide member connecting procedure of connecting the stay cloth 32 to the side frame 10 is performed.

In the guide member connecting procedure, first, an upper locking procedure is performed to fit the upper attachment member 50 to the upper attachment hole 16 so that the upper portion of the end of the stay cloth 32 is connected to the side frame 10 as illustrated in FIG. 40.

Subsequently, a center covering procedure is performed to pull the trim cover 4 further downward to the position illustrated in FIG. 41 to connect the right and left wires 41n2 provided at the center among the wires 41n1, 41n2, and 41n3 to wires (not illustrated) provided in the right and left suspension groove 5n to create a suspended state.

Figure 42:
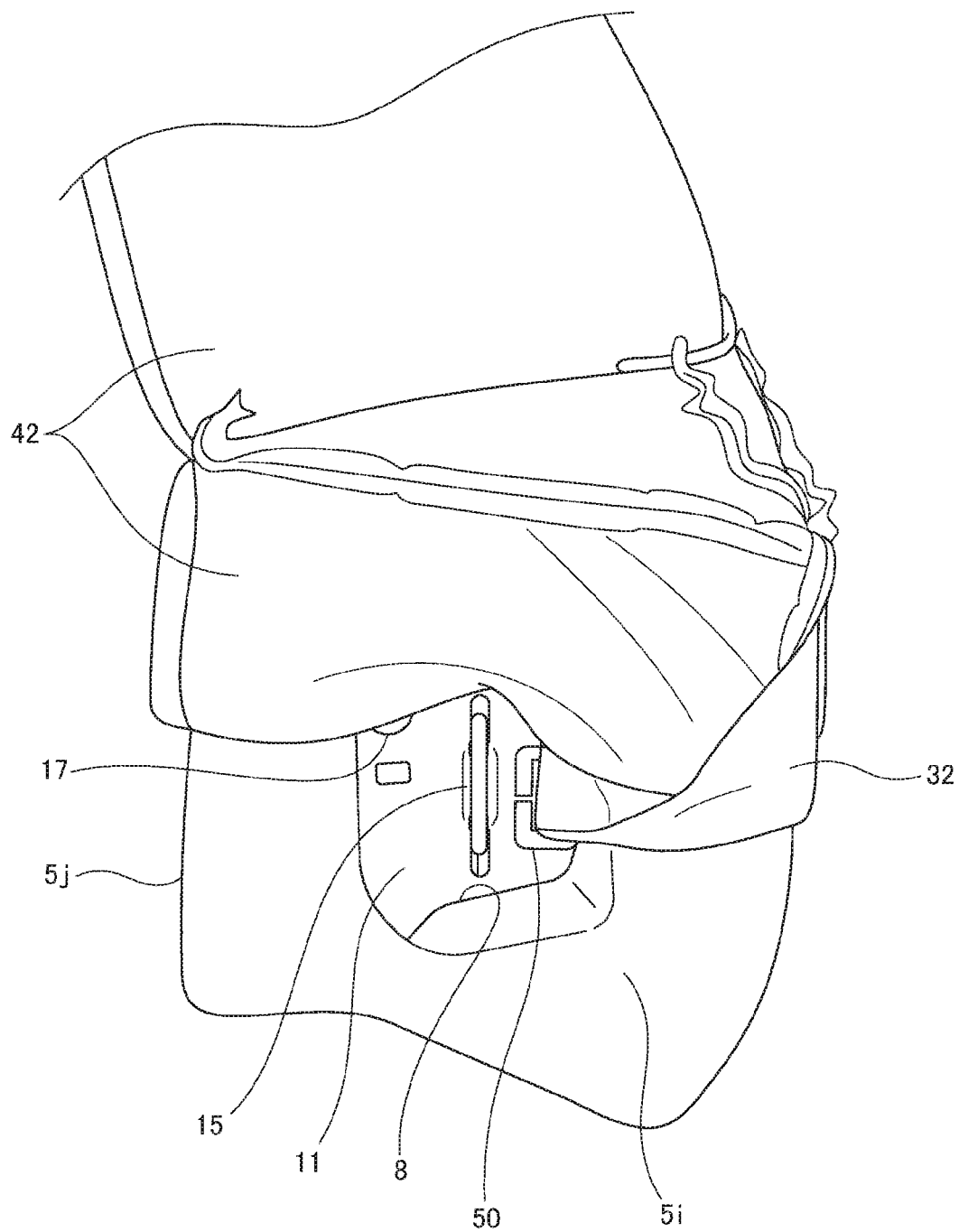
FIG. 42 is an explanatory side view illustrating a state in which a trim cover covers up to the central portion of a side frame.

In this case, as illustrated in FIGS. 41 and 42, the position of the lower end of the trim cover 4 is slightly above the lower attachment hole 16. The lower attachment hole 16 is exposed from the trim cover 4 and the lowest wire 41n3 is not yet in a suspended state.

Subsequently, as illustrated in FIG. 42, the lower attachment member 50 is fitted into the lower attachment hole 16 and the lower portion of the end of the stay cloth 32 is connected to the side frame 10.

After that, an airbag module attachment procedure is performed to attach the airbag module 6 to the side frame 10.

Figure 43:
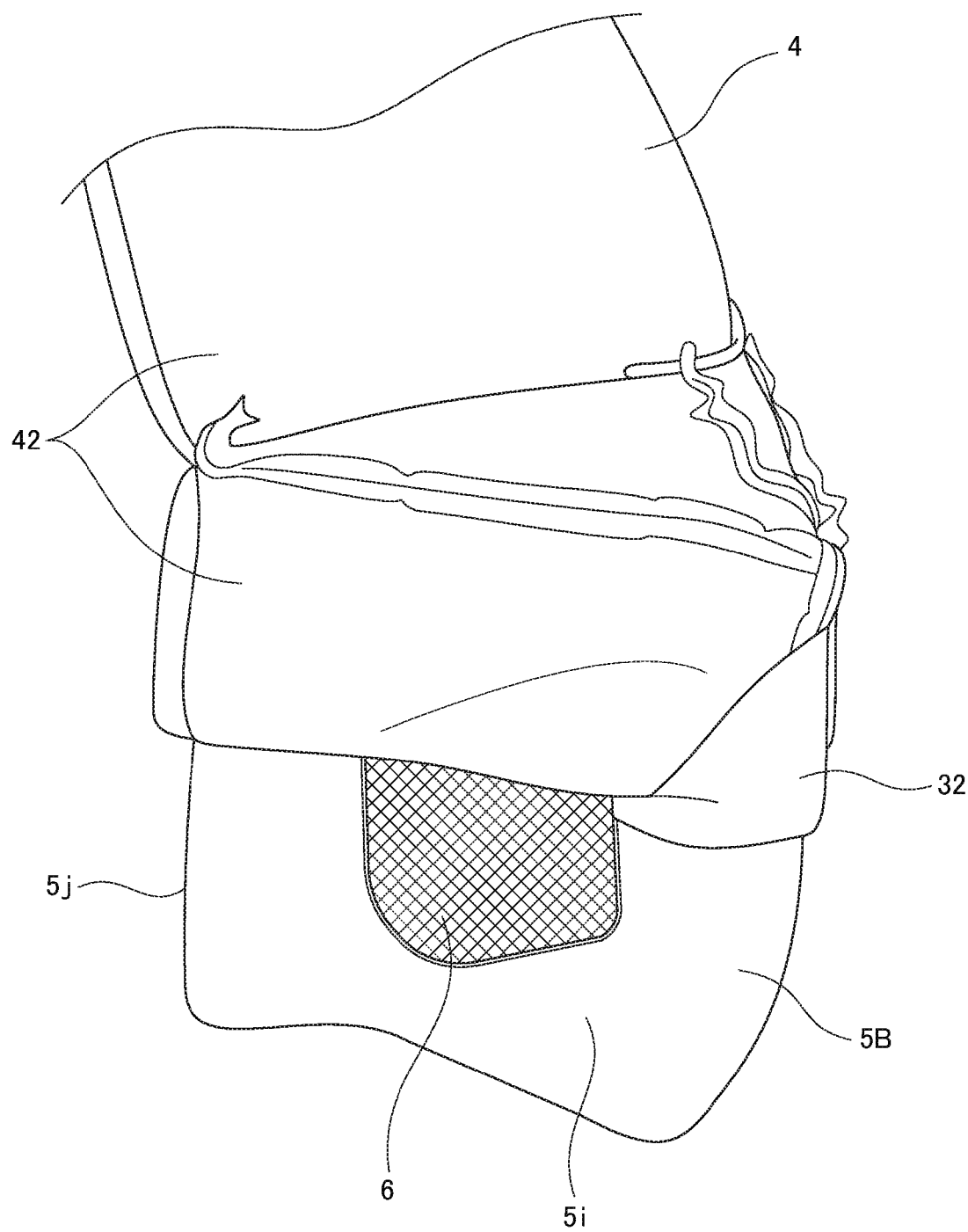
FIG. 43 is an explanatory side view illustrating a state in which an airbag module is disposed in a space formed in a lateral portion of a cushion pad.

In this procedure, the airbag module 6 is inserted, from the upper end side of the seat, into a region surrounded by the edge of a portion of the opening 8 exposed from the trim cover 4 and the lower end of a portion of the lateral wedge portion 42 of the trim cover 4 covering the lateral portion 5i of the lateral pad portion 5B at that point in time as illustrated in FIG. 42. The airbag module 6 is slid toward the seat upper side so that the airbag module 6 is disposed in the space 7 as illustrated in FIG. 43. In this case, the bolt 18 attached in advance to the airbag module 6 is inserted through the bolt hole 17.

Subsequently, a procedure of fixing the airbag module 6 to the side frame 10 is performed by fastening the bolt 18 with the nut 19 from the seat inner side of the side plate 11.

In this procedure, before the nut 19 is fastened, the attachment state of the stay cloth 32 and the attachment member 50 is observed with the naked eyes.

Figure 44:
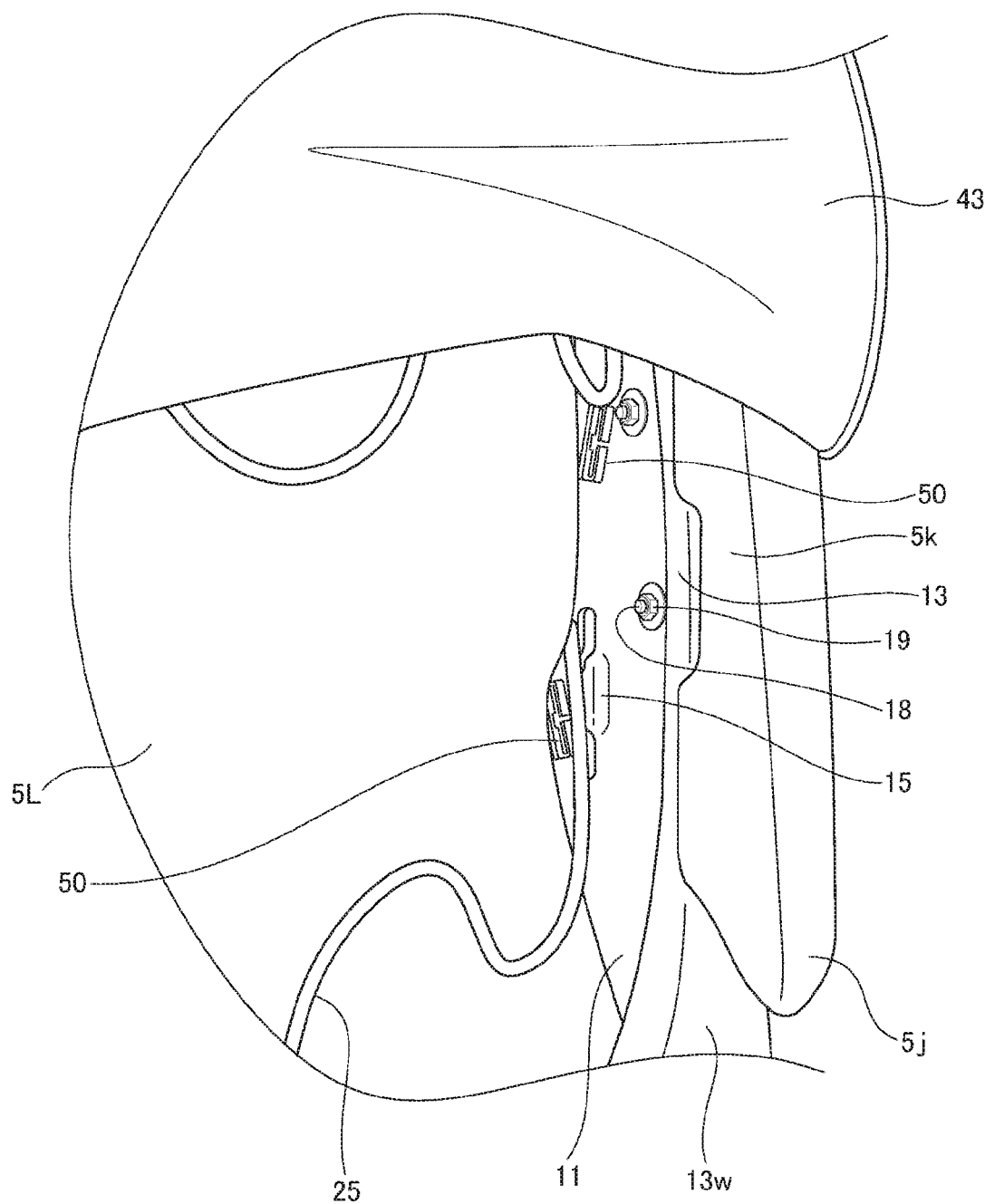
FIG. 44 is an explanatory perspective view diagram illustrating a state in which an attachment portion of an attachment member is seen from a back surface side of a seat during attachment of an airbag module.

In a stage in which the airbag module 6 is inserted into the space 7 formed by the opening 8 and the side plate 11 of the side frame 10, when seen in the direction indicated by arrow A in FIG. 33 from the back surface side of the seat S, a rear lower-side portion of the seat inner-side surface of the side plate 11 of the side frame 10 is exposed from the rear wedge portion 43 and appears as illustrated in FIG. 44.

The upper and lower attachment holes 16 are provided at positions close to the bolt hole 17, located below the side plate 11 and above the large-width portion 13w. Thus, in a state in which the seat back frame 1 and the cushion pad 5 are covered with the trim cover 4 up to the position at which the center wire 41n2 is suspended, the attachment member and the stay cloth can be observed easily with the naked eyes from the back surface side of the seat.

Moreover, since the attachment member 50 and the stay cloth 32 are white which is a color different from that of the side plate 11, whether the attachment member 50 is attached to the upper and lower attachment holes 16 in a state in which the end of the stay cloth 32 is connected can be checked easily with the naked eyes.

Moreover, as illustrated in FIG. 33, since the seat inner-side end of the rear portion 5j of the lateral pad portion 5B has the inclined surface 5k, the region surrounded by the side plate 11 and the planar member 5L on the back surface of the front pad portion 5A can be easily observed from the back surface of the seat.

Moreover, as illustrated in FIG. 44, since the inclined surface 5k has an abrupt slope only in the portion near the attachment hole 16 and the bolt 18, the attachment state of the attachment member 50 and the stay cloth 32 and the bolt 18 can be easily observed from the back surface.

Since the holding portion 51 and the stay cloth 32 have colors different from the color of the seat inner-side surface of the side plate 11, a narrow region surrounded by the side plate 11 and the planar member 5L on the back surface of the front pad portion 5A can be easily observed.

If the attachment member 50 and the stay cloth 32 are attached appropriately, the bolt 18 is fastened with the nut 19 to complete the procedure of fixing the airbag module 6 to the side frame 10.

Subsequently, the trim cover 4 is pulled further downward to connect the right and left wire 41n3 provided on the lowermost side among the wires 41n1, 41n2, and 41n3 to wires (not illustrated) provided in the right and left suspension grooves 5n to create a suspended state. After that, a lower surface treatment is performed to obtain the seat back S1 illustrated in FIG. 1 to complete the procedure of a method of assembling the seat back S1 of the vehicle seat S.

In the embodiment, although an example in which the slit-less trim cover 4 having no slit is used has been described, the present invention is not limited to this. For example, as illustrated in FIG. 45, a slit 43s' may be formed along the sewn portion between a lateral wedge portion 42' and a rear wedge portion 43' on the side on which the airbag module 6 is mounted.

Figure 45:
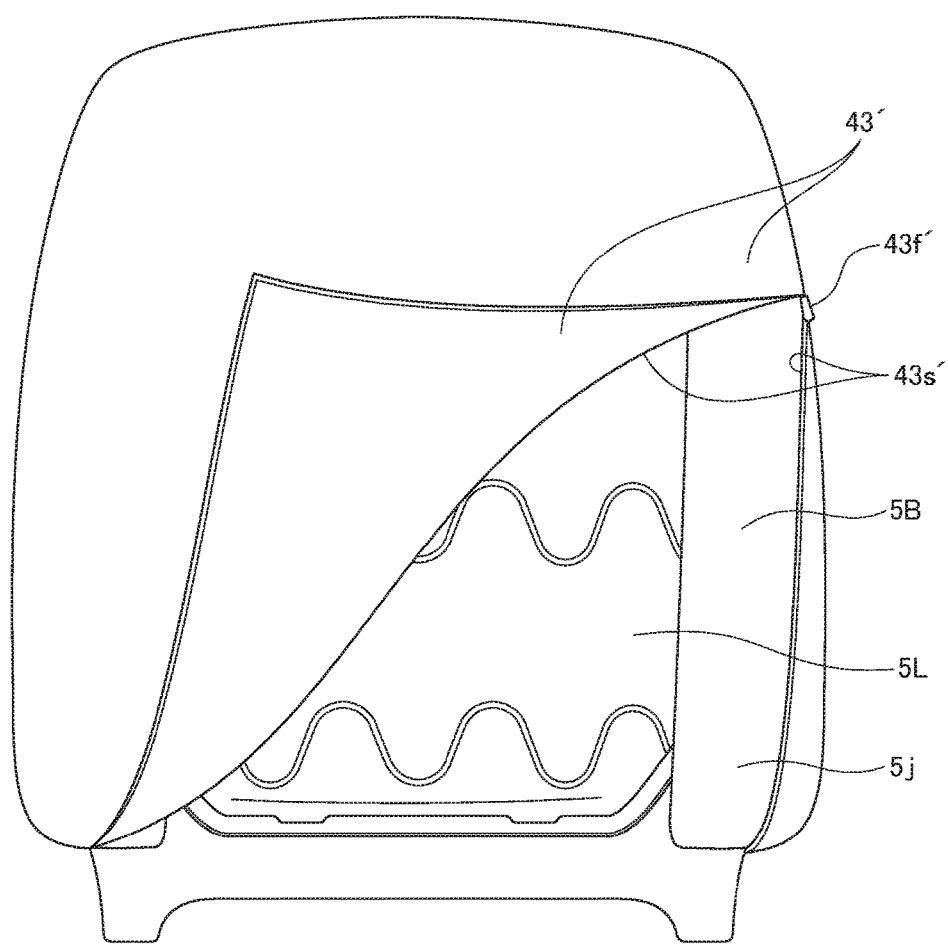
FIG. 45 is a rear view diagram that illustrates an example in which a trim cover has a slit and is an explanatory diagram illustrating a state in which a seat back is seen from a back surface side of a seat.

In the example of FIG. 45, the slit 43s' is formed in a portion of the sewn portion between the lateral wedge portion 42' and the rear wedge portion 43' extending from the lower end to a position of approximately ⅔ of the height in the up and down direction of the seat. A fastener 43f is provided along the slit 43s' so that the slit 43s' can be opened and closed by the fastener 43f.

The other configuration of FIG. 45 is the same as that of FIGS. 1, 5, 8, 9, 32 to 35, and 37 to 44, and description thereof will not be repeated.

The other configuration of the present embodiment is the same as that of the first to fifth embodiments, and description thereof will not be repeated.

TABLE OF REFERENCE NUMERALS

S vehicle seat
S1 seat back
S2 seating portion
S3 headrest
F seat frame
1 seat back frame
2 seating frame
3 reclining mechanism
4 trim cover
5, 5a cushion pad
6 airbag module
  6a inflator
  6b airbag
  6c retainer
  6d wrapping material
7 space
8 opening
10 side frame
11 side plate
12 front edge
13 rear edge
15, 75 locking portion
16 attachment hole
18 bolt
21 upper frame
22 lower frame
23 pillar supporting portion
25 bridging member
31, 32 stay cloth
33 locking hook
35 side
36 attachment portion 37 trim plate
40 breaking portion
41 front wedge portion
42 lateral wedge portion
43 rear wedge portion
44 sewn portion
50, 70 attachment member
51, 78 holding portion
    51a cylindrical body
52, 72a, 72b flange portion, protruding portion
    52a contacting surface
    52b pressing surface
    52c curved surface
    52s, 55s slit
53 front wall, restricting portion
54 horizontal wall, restricting portion, upper wall, lower wall
55 rear wall, restricting portion
56 horizontal wall, restricting portion, upper wall, lower wall
57 top wall
    57a projection, stopper projection
    60, 75a, 76 projection
58 partition wall
59 holding space
    59a front space, second space
    59a1 opening of second space
    59b rear space, first space
    59b1, 59b2 opening of first space
    59c passage
    60a, 60b surface
61 bridge portion, connecting portion
72b flange portion
73 holding wall
74 contacting wall
    74a inner bulging portion
75a, 76 projection
77 hinge portion

The invention claimed is:

1. A vehicle seat comprising:
a frame;
a trim cover that covers the frame and a cushion pad placed on the frame;
a stay cloth that is attached to a breaking portion of the trim cover at a first end of the stay cloth; and
an attachment member that connects the stay cloth to the frame;
wherein:
the attachment member comprises
a holding portion that holds a second end of the stay cloth in a detachable manner, and
a planar protruding portion that protrudes from an end of the holding portion;
the holding portion comprises a restricting portion that is configured to be connected to an attachment hole provided in the frame to restrict movement of the attachment member from the attachment hole; and
at least a portion of the planar protruding portion is disposed between the frame and the stay cloth.

2. The vehicle seat according to claim 1, wherein:
the restricting portion comprises at least an upper wall and a lower wall that form an upper side and a lower side of the holding portion, respectively, when the attachment member is attached to the frame, and that make contact with an inner surface of the attachment hole.

3. The vehicle seat according to claim 1, wherein:
the restricting portion is formed by a continuous wall that makes contact with an inner surface of the attachment hole; and
the continuous wall forms a holding space therein in which the second end of the stay cloth is held.

4. The vehicle seat according to claim 3, wherein:
the continuous wall comprises a slit that penetrates the continuous wall.

5. The vehicle seat according to claim 4, wherein:
projections are provided on both sides of the slit on an outer surface of the continuous wall and at a position separated by a predetermined distance from the planar protruding portion.

6. The vehicle seat according to claim 3, wherein:
a partition wall that partitions the holding space into a plurality of divided spaces is provided on an inner surface of the continuous wall; and
the plurality of divided spaces communicate with each other to form a continuous passage for the stay cloth.

7. The vehicle seat according to claim 6, wherein:
the continuous wall forms a cylindrical body having a first end portion and a second end portion opposite to the first end portion;
the planar protruding portion protrudes from the first end portion of the cylindrical body to an outside of the cylindrical body at a given angle relative to the cylindrical body;
the partition wall faces a side wall surface of the cylindrical body and divides the holding space into a first space and a second space, the first space comprising a portion of the continuous wall in which a slit is formed and the second space communicating with the first space;
the first space comprises openings through which the stay cloth passes at the first end portion and the second end portion of the cylindrical body; and
the second space comprises at the second end portion of the cylindrical body:
the passage for the stay cloth that communicates with the first space,
an opening through which the stay cloth passes, and
a stopper projection that is disposed adjacent to the opening of the second space to suppress the stay cloth from being pulled out.

8. The vehicle seat according to claim 7, wherein:
the continuous wall comprises a front wall that faces the partition wall across the second space; and
the attachment member comprises a connecting portion that connects the partition wall and the front wall on a first end portion side of the cylindrical body.

9. The vehicle seat according to claim 1, wherein:
the frame is a side frame that extends along a side portion of the vehicle seat; and
the stay cloth is a guide member that guides the deployment direction of an airbag module attached to the side frame.

10. The vehicle seat according to claim 1, wherein:
the frame comprises a pair of side frames;
the vehicle seat further comprises a bridging member between the side frames; and
the attachment hole is arranged below the bridging member.

11. The vehicle seat according to claim 1, wherein:
the frame comprises a side plate, a front edge that extends inwardly from a front end of the side plate, and a rear edge that extends inwardly from a rear end of the side plate; and the attachment hole is provided in a portion of the side plate close to the front edge.

12. An attachment member for connecting a stay cloth to a frame, the attachment member comprising:
a holding portion that is configured to hold an end of the stay cloth in a detachable manner; and
a planar protruding portion that protrudes from an end of the holding portion;
wherein:
the holding portion comprises a restricting portion that is configured to be connected to an attachment hole provided in the frame to restrict movement of the attachment member from the attachment hole.

13. The attachment member according to claim 12, wherein:
the restricting portion comprises at least an upper wall and a lower wall that form an upper side and a lower side of the holding portion, respectively, when the attachment member is attached to the frame, and that is configured to make contact with an inner surface of the attachment hole.

14. The attachment member according to claim 12, wherein:
the restricting portion is formed by a continuous wall that is configured to make contact with an inner surface of the attachment hole; and
the continuous wall forms a holding space therein in which the end of the stay cloth is held.

15. The attachment member according to claim 14, wherein:
the continuous wall comprises a slit that penetrates the continuous wall.

16. The attachment member according to claim 15, wherein:
projections are provided on both sides of the slit on an outer surface of the continuous wall and at a position separated by a predetermined distance from the planar protruding portion.

17. The attachment member according to claim 14, wherein:
a partition wall that partitions the holding space into a plurality of divided spaces is provided on an inner surface of the continuous wall; and
the plurality of divided spaces communicate with each other to form a continuous passage for the stay cloth.

18. The attachment member according to claim 17, wherein:
the continuous wall forms a cylindrical body having a first end portion and a second end portion opposite to the first end portion;
the planar protruding portion protrudes from the first end portion of the cylindrical body to an outside at a given angle relative to the cylindrical body;
the partition wall faces a side wall surface of the cylindrical body and divides the holding space into a first space and a second space, the first space comprising a portion of the continuous wall in which a slit is formed and the second space communicating with the first space;
the first space comprises openings through which the stay cloth passes at the first end portion and the second end portion of the cylindrical body; and
the second space comprises at the second end portion of the cylindrical body:
the passage for the stay cloth that communicates with the first space,
an opening through which the stay cloth passes, and
a stopper projection that is disposed adjacent to the opening of the second space to suppress the stay cloth from being pulled out.

19. The attachment member according to claim 18, wherein:
the continuous wall comprises a front wall that faces the partition wall across the second space; and
the attachment member comprises a connecting portion that connects the partition wall and the front wall on a first end portion side of the cylindrical body.

* * * * *